(12) United States Patent
Matsumoto et al.

(10) Patent No.: US 7,321,470 B2
(45) Date of Patent: Jan. 22, 2008

(54) CAMERA

(75) Inventors: Naoki Matsumoto, Hachioji (JP);
Hitoshi Yoshida, Hachioji (JP); Akira Futami, Higashikurume (JP);
Toshifumi Nakano, Sagamihara (JP);
Tsuyoshi Kawai, Hachioji (JP)

(73) Assignee: Olympus Corporation, Tokyo (JP)

(*) Notice: Subject to any disclaimer, the term of this patent is extended or adjusted under 35 U.S.C. 154(b) by 26 days.

(21) Appl. No.: 11/100,922

(22) Filed: Apr. 7, 2005

(65) Prior Publication Data

US 2005/0168834 A1     Aug. 4, 2005

Related U.S. Application Data

(63) Continuation of application No. PCT/JP03/12827, filed on Oct. 7, 2003.

(30) Foreign Application Priority Data

| Oct. 8, 2002 | (JP) | ............................. 2002-295256 |
| Oct. 8, 2002 | (JP) | ............................. 2002-295257 |
| Oct. 8, 2002 | (JP) | ............................. 2002-295258 |
| Oct. 24, 2002 | (JP) | ............................. 2002-310076 |
| Nov. 22, 2002 | (JP) | ............................. 2002-339717 |

(51) Int. Cl.
*G02B 7/02* (2006.01)

(52) U.S. Cl. ........................ 359/694; 359/821; 359/822

(58) Field of Classification Search ................ 359/694, 359/811, 813, 814, 817, 819, 821, 822, 823, 359/826
See application file for complete search history.

(56) References Cited

U.S. PATENT DOCUMENTS 6,333,823 B1 * 12/2001 Ozaki et al. ................. 359/690
6,334,718 B1 * 1/2002 Akiba et al. ................. 396/448
6,724,546 B2 * 4/2004 Nishimae et al. ........... 359/740
6,927,798 B2 * 8/2005 Kaneda ....................... 348/363
2004/0169764 A1 * 9/2004 Ishii et al. ................... 348/340
2006/0158742 A1 * 7/2006 Mihara ........................ 359/676

FOREIGN PATENT DOCUMENTS

| JP | 05-134159 | 5/1993 |
| JP | 06-242491 | 9/1994 |
| JP | 11-084209 | 3/1999 |
| JP | 11-196303 | 7/1999 |
| JP | 2000-010165 | 1/2000 |
| JP | 2000-250091 | 2/2000 |
| JP | 2000-310803 | 11/2000 |
| JP | 2003-255433 | 9/2003 |

OTHER PUBLICATIONS

Notification of Office Action 3 pgs. and copy of English Translation of Office Action (4 pgs.).

* cited by examiner

*Primary Examiner*—Timothy Thompson
(74) *Attorney, Agent, or Firm*—Volpe and Koenig, P.C.

(57) ABSTRACT

A camera having a lens barrel housed therein includes a reflection optical member for reflecting a light beam incident along a first optical axis (O1) from a subject so as to reflect the light beam toward a second optical axis (O2) intersecting the first optical axis; a light-quantity adjusting member for adjusting the quantity of incident light from the subject; and a drive source for displacing the light-quantity adjusting member, in which by displacing the light-quantity adjusting member, the quantity of the incident light from the subject can be adjusted, and the light-quantity adjusting member is displaced in a direction substantially perpendicular to an optical axial plane inclusive of the first optical axis and the second optical axis so as to adjust the light-quantity.

25 Claims, 46 Drawing Sheets

CAMERA

CROSS REFERENCE TO RELATED APPLICATION

This application is a continuation application of PCT Application No. PCT/JP03/12827 filed in Japan on Oct. 7, 2003 and claims benefit of Japanese Applications No. 2002-295256 filed in Japan on Oct. 8, 2002, No. 2002-295257 filed in Japan on Oct. 8, 2002, No. 2002-295258 filed in Japan on Oct. 8, 2002, No. 2002-310076 filed in Japan on Oct. 24, 2002, and No. 2002-339717 filed in Japan on Nov. 22, 2002, the entire contents of each of which are incorporated herein by their reference.

BACKGROUND OF THE INVENTION

1. Field of the Invention

The present invention relates to cameras, and in particular relates to the structure of a lens barrel of the camera and the arrangement of electric members in the lens barrel of the camera.

2. Description of the Related Art

Cameras have been widely used in practice in which a subject image formed based on a light beam incident on a photographing optical system composed of a plurality of lens groups is formed on subject-image obtaining means, such as an image pickup element of a charge coupled device (CCD) or a light-receiving plane of a photosensitive material such as a picture film, so as to obtain desired subject image information or subject images.

In such cameras, further miniaturization of the camera, especially in the thickness direction, has been required. To this end, compactification of the lens barrel including the photographing optical system has been indispensable.

With regard to the lens barrel used in such cameras, the miniaturization is proposed by applying a so-called bending optical system thereto, in which a reflection member such as a reflection mirror is arranged on a photographing light path including a plurality of lens groups so as to bend a photographing optical axis in a predetermined direction, for example.

The lens barrel described above generally houses therein a light-quantity adjusting device, such as a shutter and a diaphragm, for adjusting the light quantity corresponding to subject brightness and a lens drive mechanism for focusing and variable magnification.

A lens barrel incorporating the bending optical system is proposed in Japanese Unexamined Patent Application Publication No. 11-84209, wherein a subject beam is taken in by a prism and a photographing optical axis is bent by the prism so as to make the subject beam incident on an optical system composed of a plurality of lens groups. The optical axis incident on the prism designates a first optical axis and a bent optical axis passing thorough the plurality of lens groups denotes a second optical axis.

In the lens barrel mentioned above, the diaphragm unit is arranged between the plurality of lens groups, and a diaphragm blade of the diaphragm unit is displaced by a diaphragm drive source in a direction parallel to the first optical axis so as to adjust the light quantity. Furthermore, by zoom/focus motors, focusing drive and variable magnification drive in the second optical direction are carried out. The diaphragm drive source and the zoom/focus motors are arranged at corners of a rectangular parallelepiped with the first optical axis as its center. Electrical members are attached to fixed members and connection FPCs need not to move within the lens barrel, so that a structure for preventing an FPC (flexible printed circuit board) from entering an optical path is not necessary.

A lens barrel is disclosed in Japanese Unexamined Patent Application Publication No. 6-242491, in the lens barrel a shutter drive source is arranged on a frame member of the lens barrel, and on the frame member a lens frame thereby driven for focusing in the optical axial direction with respect to the frame member and a shutter device moving integrally with the lens frame are arranged. In this lens barrel, since the drive source is not arranged on the movable lens frame, a connection flexible printed circuit board (referred to as a FPC below) for the drive source does not need to be attached on the movable lens frame. Also, the connection FPC need not move within the lens barrel, eliminating a structure preventing the FPC from entering an optical path. Thus, in this conventional lens barrel, a structure around the lens frame is simplified, resulting in reduction in size.

In a lens barrel disclosed in Japanese Unexamined Patent Application Publication No. 5-134159, a shutter-drive FPC is connected to a shutter unit moving back-and-forth along the optical axis together with a lens frame. The shutter-drive FPC is structured in a specific shape so as to become deformed such that it does not enter a photographing optical path following shutter movement.

An electronic camera (electronic image pickup apparatus) disclosed in Japanese Unexamined Patent Application Publication No. 11-196303 includes a lens barrel housed therein and having a so-called bending optical system in which a subject beam along a first optical axis taken in by a prism is bent in a second optical axial direction orthogonal to the first optical axis so as to make the subject beam incident on an optical system composed of a plurality of lens groups. In this electronic camera, an electric circuit board having a notch extending over both lateral sides of the lens barrel is arranged. Furthermore, in the rear of the electric circuit board and the lens barrel, an LCD display unit is arranged, reducing the camera in size and thickness.

Moreover, an electronic camera disclosed in Japanese Unexamined Patent Application Publication No. 2000-10165 includes a lens barrel housed therein and having a so-called bending optical system, wherein a subject beam along a first optical axis taken in by a prism is bent in a second optical axial direction orthogonal to the first optical axis so as to make the subject beam incident on an optical system composed of a plurality of lens groups. In this electronic camera, an electric circuit board having a notch extending over both lateral sides of the lens barrel is arrange. In the rear of the electric circuit board and on the left of the lens barrel, a power supply battery is arranged while in the rear of the lens barrel and on the right of the electric circuit board, an LCD display unit is arranged, reducing the camera in size and thickness.

SUMMARY OF THE INVENTION

The present invention provides a camera capable of reducing the thickness of a lens barrel so as to be further miniaturized in size designed in consideration of the drive direction of a light-quantity adjusting device as well as the arrangement of drive sources for a light-quantity adjusting device and lenses.

In one camera according to the present invention including a lens barrel housed therein, the lens barrel includes a reflection optical member for reflecting a light beam incident along a first optical axis from a subject so as to reflect the light beam along a second optical axis intersecting the first optical axis; a light-quantity adjusting member for adjusting the quantity of incident light from the subject; and a drive source for displacing the light-quantity adjusting member, wherein by displacing the light-quantity adjusting member, the quantity of the incident light from the subject can be adjusted, in more detail, the light-quantity adjusting member is displaced in a direction substantially perpendicular to an optical axial plane inclusive of the first optical axis and the second optical axis so as to adjust the light-quantity.

In another camera according to the present invention including a lens barrel housed therein, the lens barrel includes: a plurality of lens groups; a frame member; a holding frame for movably holding one of the plurality of lens groups with respect to the frame member; a sector arranged movably in an optical axial direction of the plurality of lens groups and integrally with the holding frame, the sector being movable between a position masking an opening of the lens groups and a position opening the opening; a drive source disposed in the frame member for driving the sector; a drive power transmission member driven by drive power from the drive source for driving the sector so as to open and close; and a shaft extended from the drive power transmission member to be able to drive the sector regardless of the position of the holding frame in the optical axial direction, wherein the shaft includes a hollow shape.

In another camera according to the present invention including a lens barrel housed therein, the lens barrel includes: a reflection optical member for reflecting a light beam incident along a first optical axis from a subject so as to reflect the light beam toward a second optical axis intersecting the first optical axis; a first holding frame for holding the reflection optical member; a plurality of lens groups arranged along the second optical axis; a second holding frame for movably holding one of the plurality of lens groups along the second optical axis; a frame member for movably containing the second holding frame and for fixing the first holding frame thereto; a motor unit arranged on one side of the second holding frame for driving the second holding frame as a drive source, the motor unit being fixed inside a first external wall of the frame member formed substantially in parallel with an optical axial plane formed by the first optical axis and the second optical axis; and detecting means for detecting the position of the second holding frame, the detecting means being arranged on a second external wall of the frame member formed adjacent to the first external wall in a direction substantially perpendicular to the optical axial plane, so that the second holding frame is driven by the motor unit along the second optical axis back-and-forth.

Another camera according to the present invention includes a display unit, a lens barrel and an image pickup element. The display unit includes: a liquid crystal display board arranged on the back face of the camera; a light-guide plate arranged to cover the substantially entire surface of the liquid crystal display board and having uneven thicknesses such that one end is thick while the other end is thinner; an illumination light-source arranged adjacent to the thick end of the light-guide plate. The lens barrel is a substantially rectangular parallelepiped contour and includes an optical system including a reflection optical member arranged in close vicinity to the light-guide plate for reflecting a light beam incident along a first optical axis from a subject so as to reflect the subject beam toward a second optical axis intersecting the first optical axis and a plurality of lens groups. The image pickup element has an image pickup element arranged at one end of the lens barrel in the second optical axial direction on a plane orthogonal to the second optical axis for picking up images formed by the optical system, wherein the thinner end of the light-guide plate is arranged adjacent to the image pickup element.

Another camera according to the present invention includes a lens barrel structured to have a substantially rectangular parallelepiped contour; a plurality of drive sources arranged along a substantially straight line region in the longitudinal direction of the lens barrel; and an electrical substrate unit disposed on one side of the lens barrel adjacent thereto and having a plurality of electrical substrates superimposed one on another in the thickness direction of the lens barrel, wherein the plurality of drive sources are arranged at one end of the lens barrel adjacent to the electrical substrate unit, and are connected to the electrical substrate unit.

Other features and advantages of the present invention will be apparent from the following description.

BRIEF OF DESCRIPTION OF THE DRAWINGS

Figure 29:
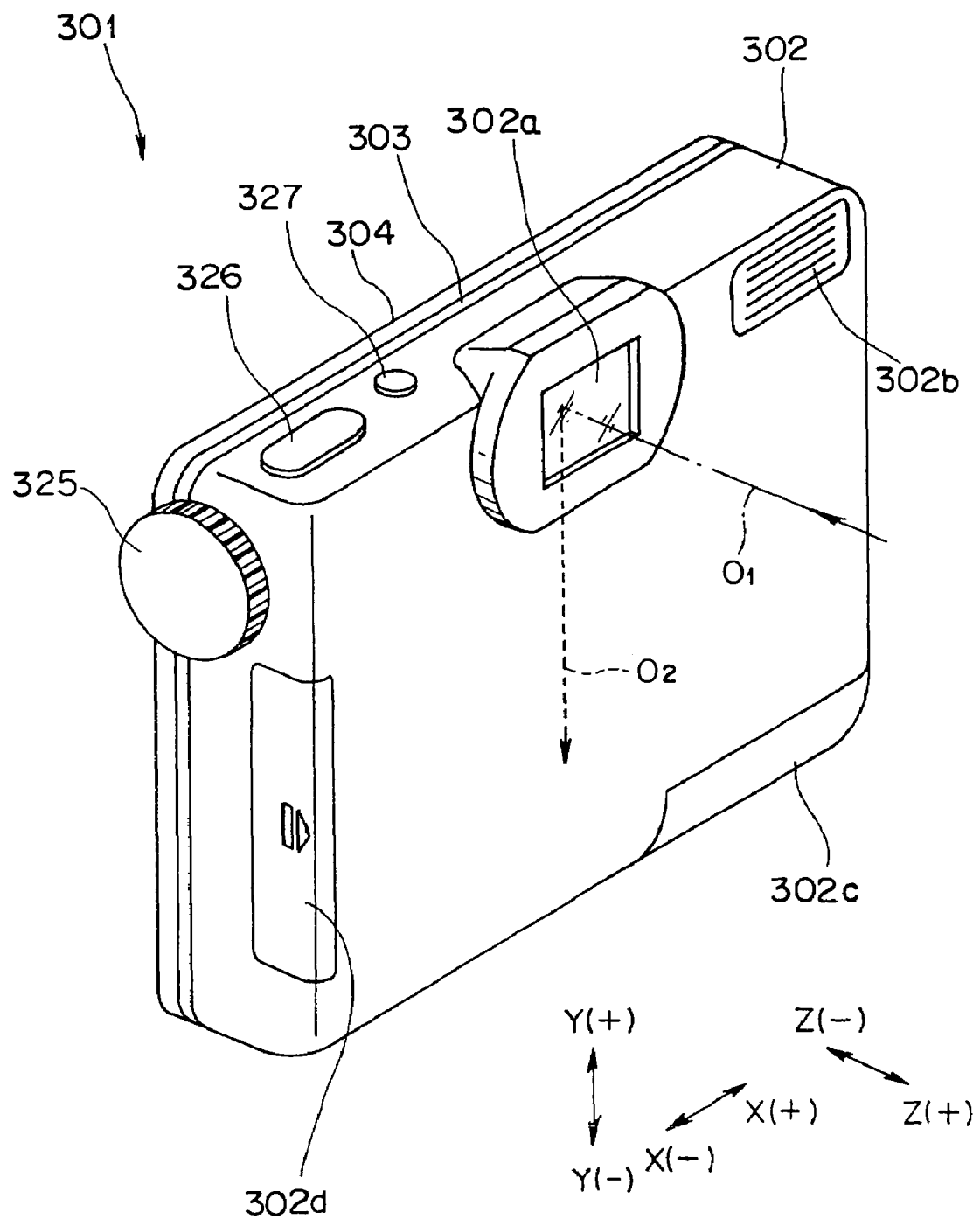
FIG. 29 is an external perspective view of an electronic camera according to a third embodiment of the present invention viewed from the front.
Figure 33:
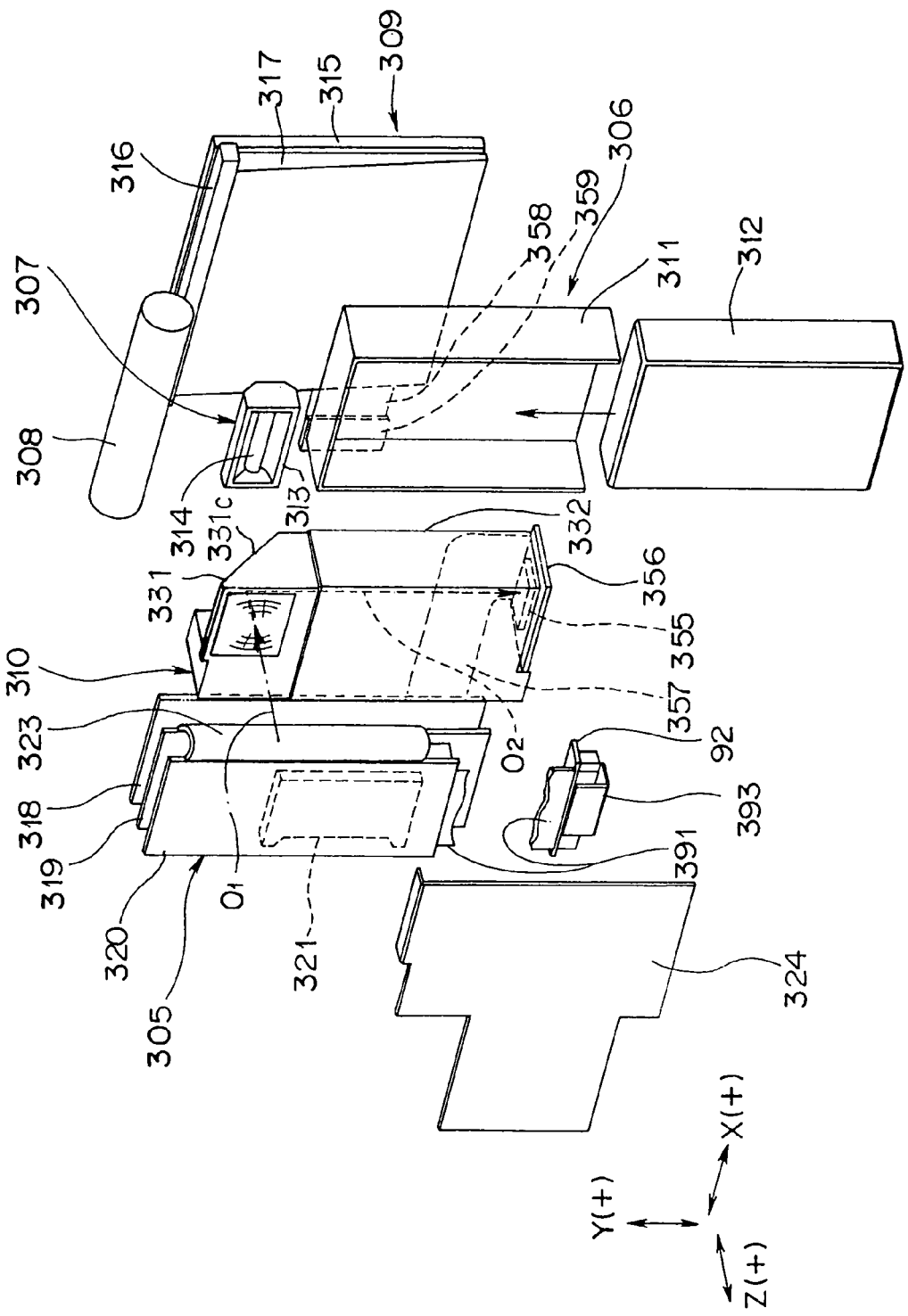

FIG. 33 includes exploded perspective views of component units accommodated in the electronic camera shown in FIG. 29.

Figure 34:
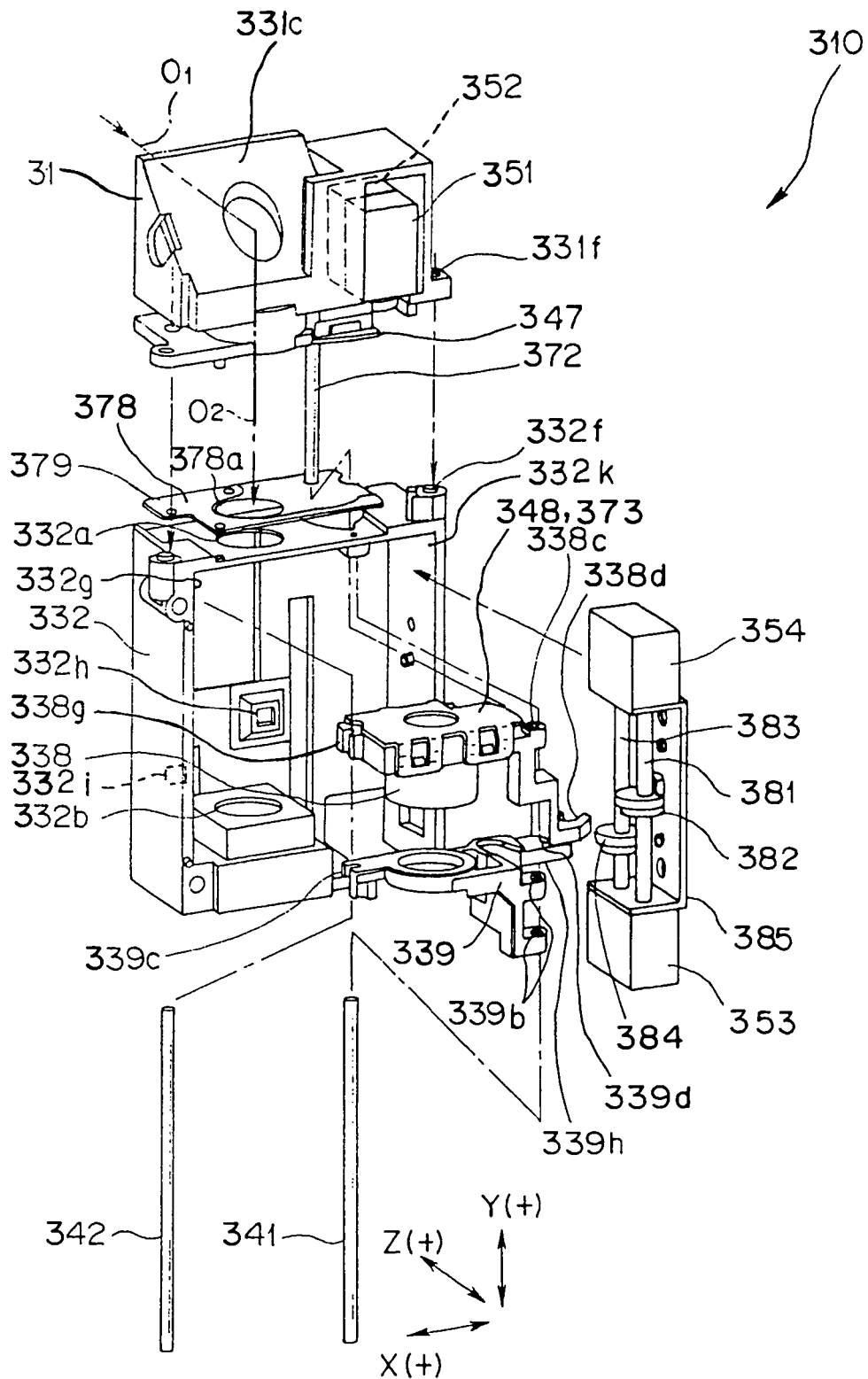

FIG. 34 is an exploded perspective view of the lens barrel of the electronic camera shown in FIG. 29 viewed from the rear.

Figure 35:
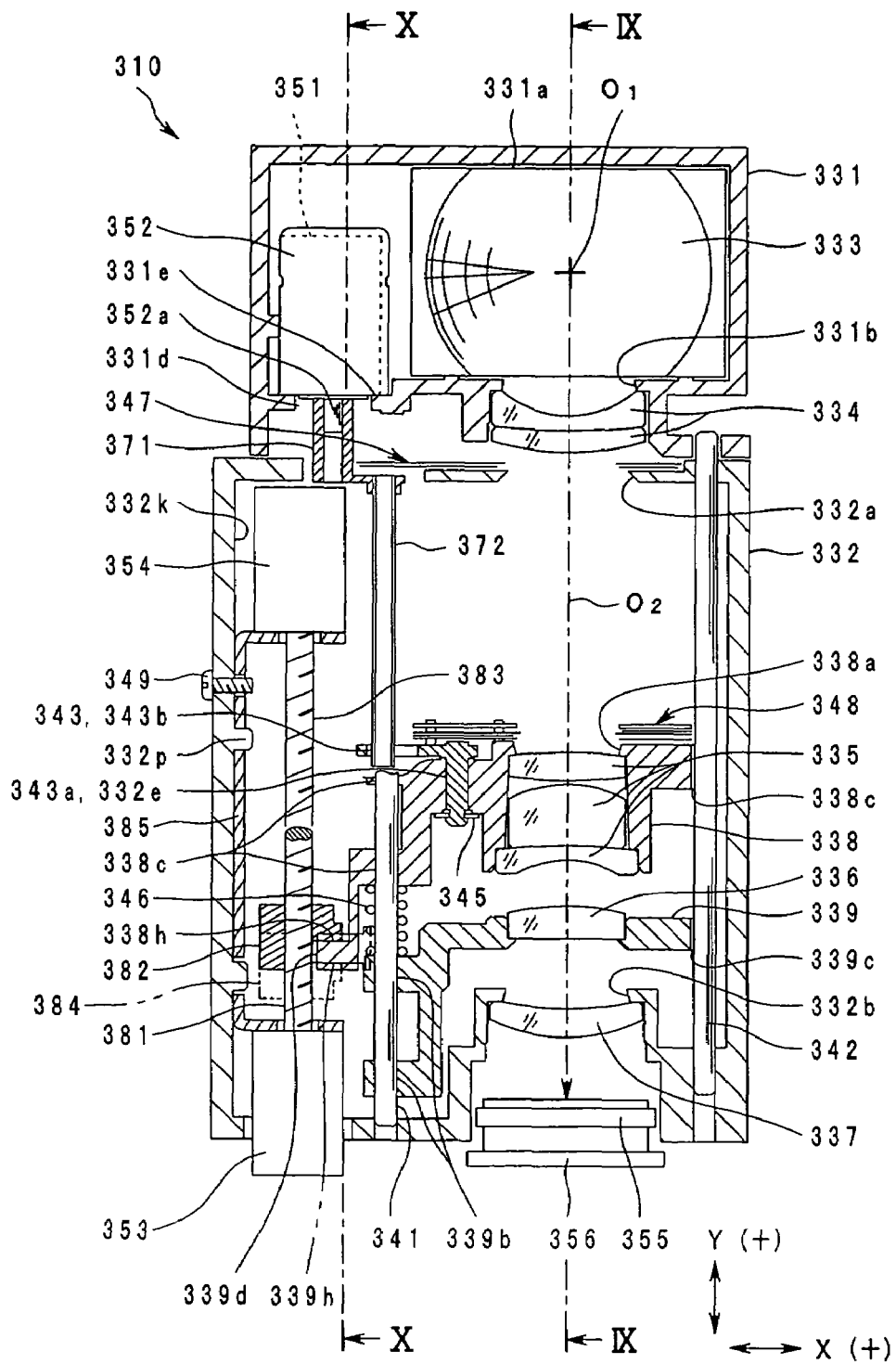

FIG. 35 is a longitudinal sectional view of the lens barrel shown in FIG. 29 in a wide-angle state viewed from the front.

Figure 36:
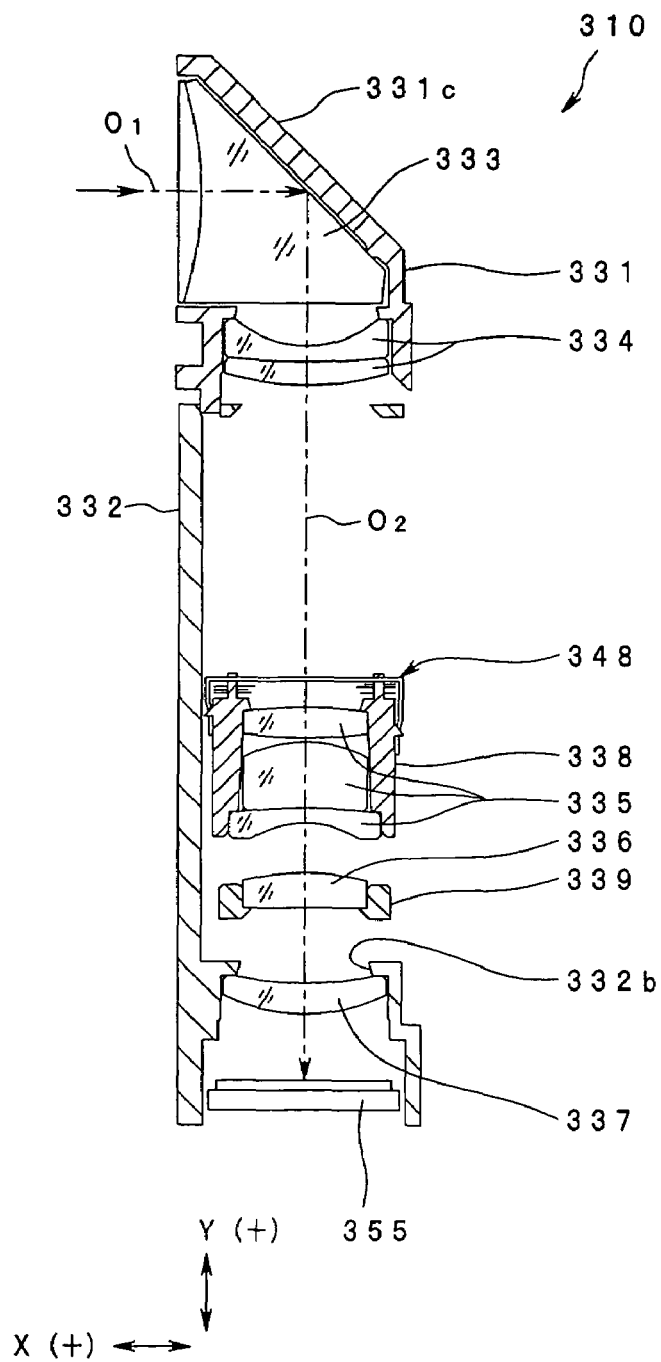

FIG. 36 is a sectional view at the line IX-IX of FIG. 35.

Figure 37:
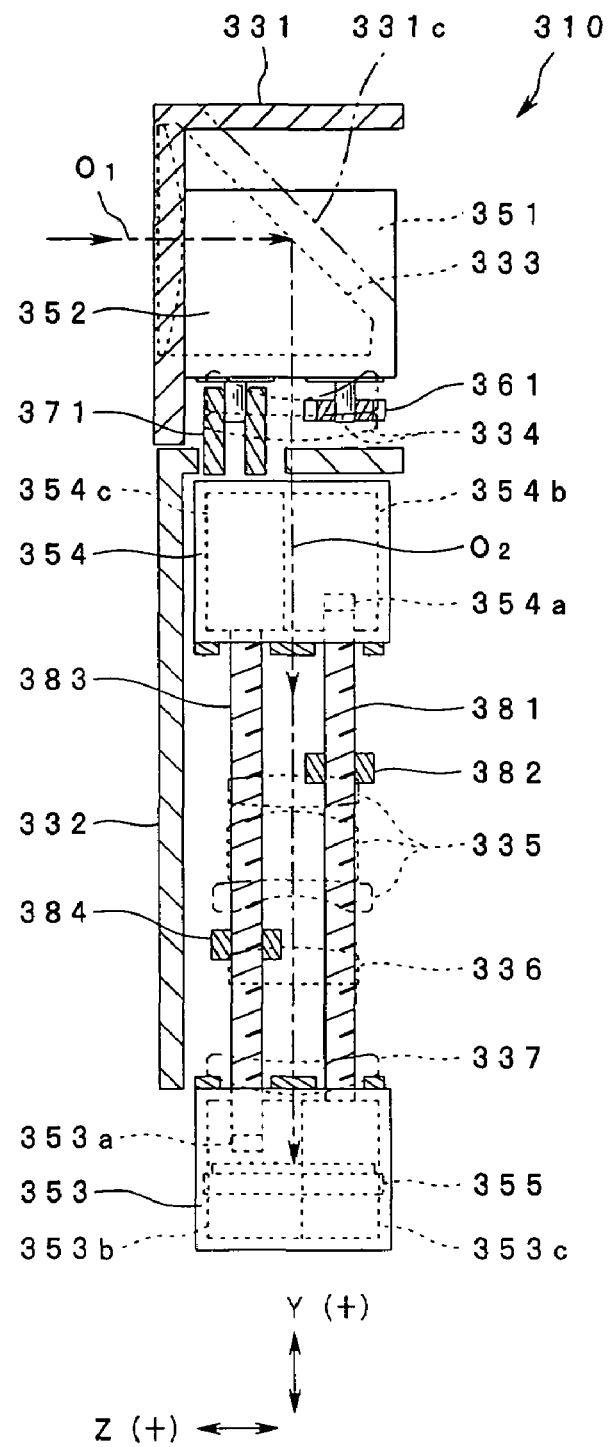

FIG. 37 is a sectional view at the line X-X of FIG. 35.

Figure 38:
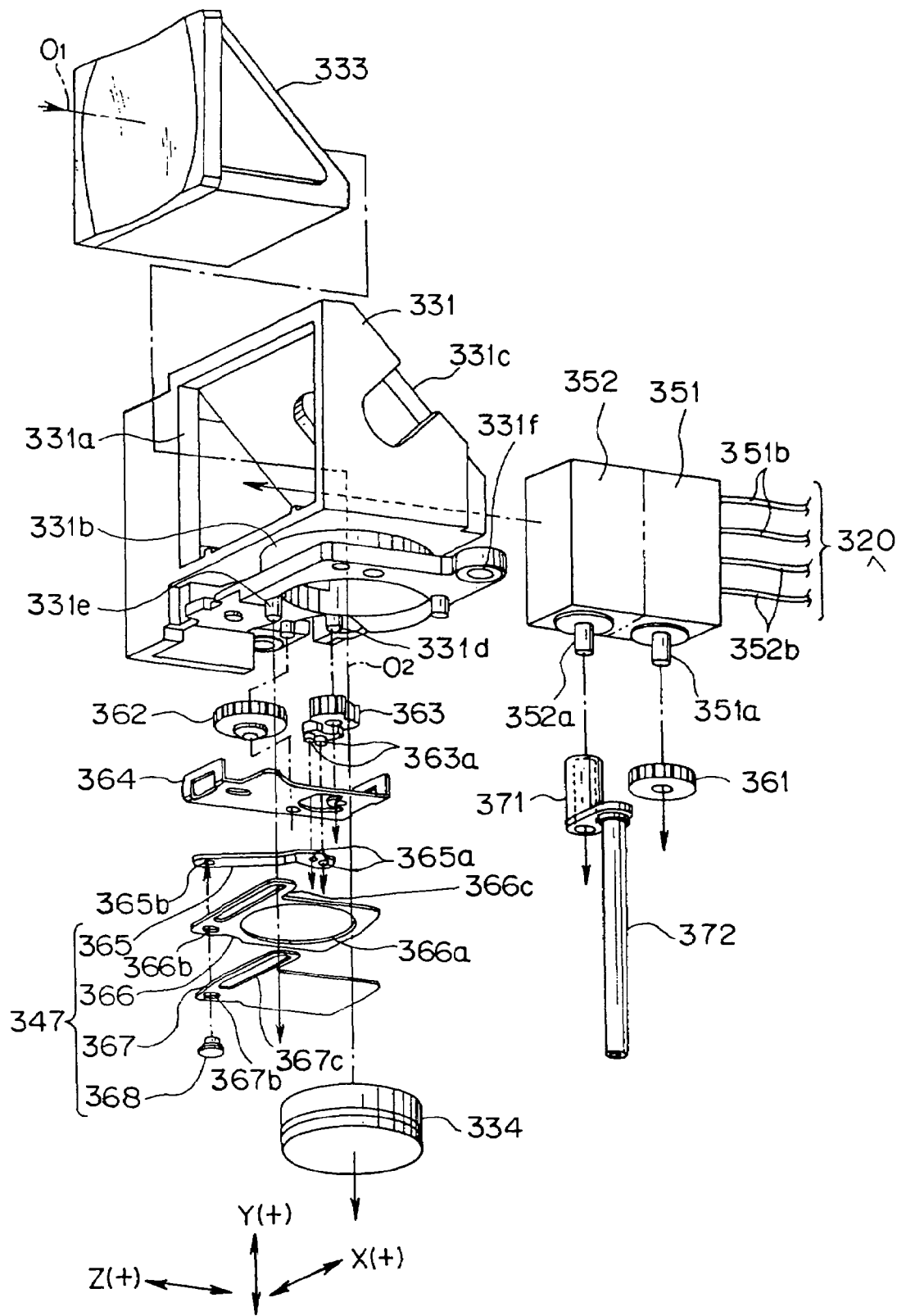

FIG. 38 is an exploded perspective view of the vicinity of a first group frame (ND filter unit) of the lens barrel of the electronic camera shown in FIG. 29.

Figure 39:
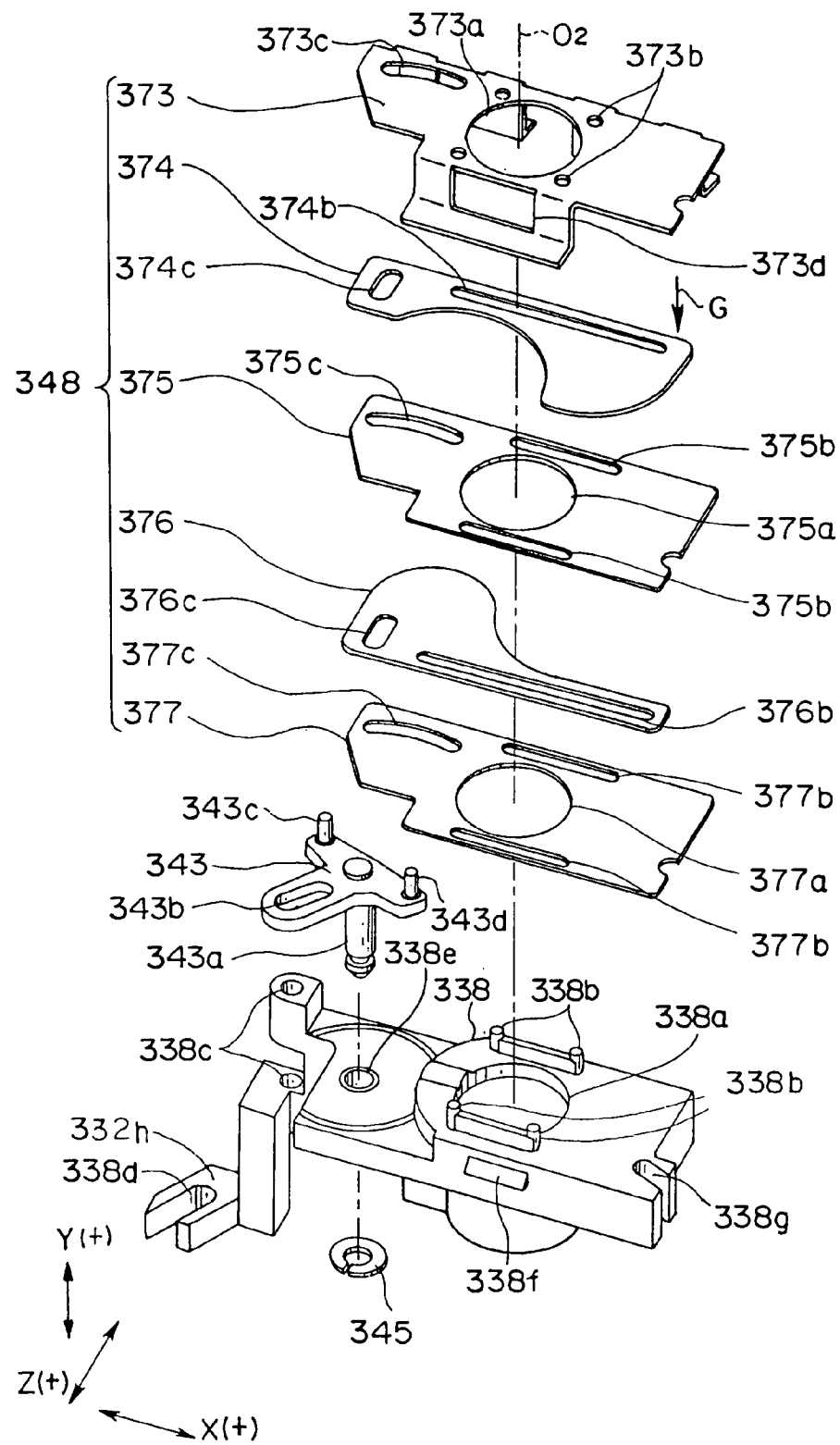

FIG. 39 is an exploded perspective view of the vicinity of a second group frame (shutter unit) of the lens barrel of the electronic camera shown in FIG. 29.

Figure 40A:
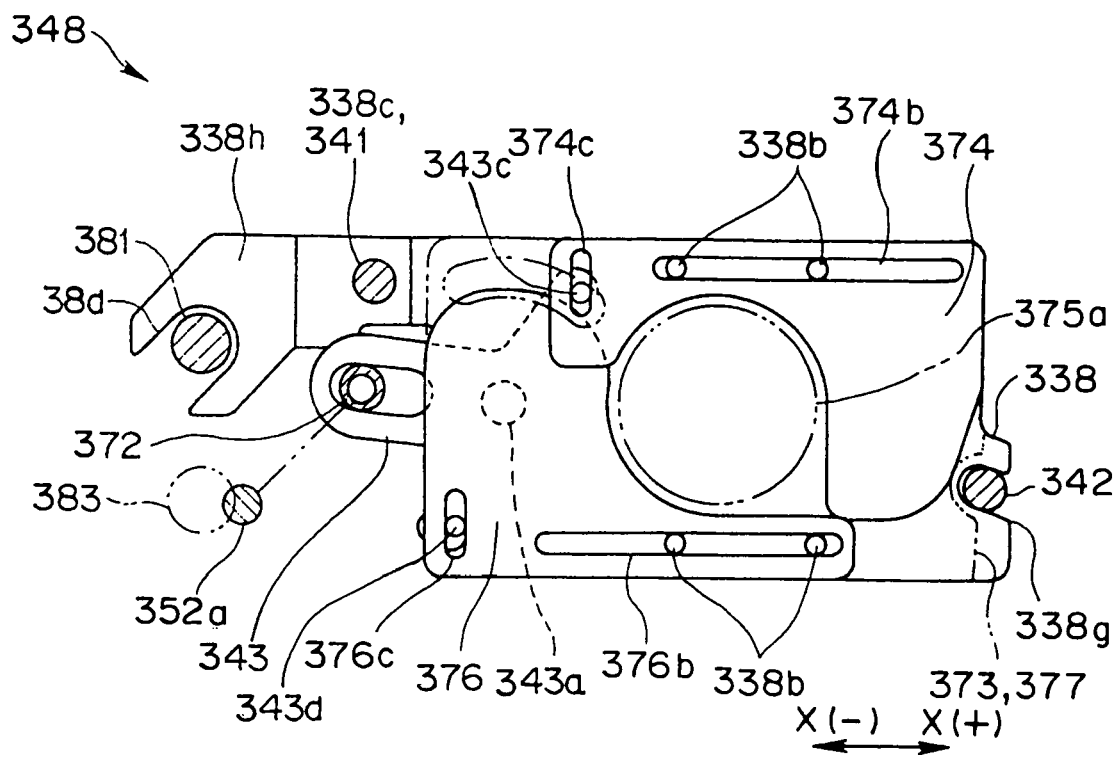
Figure 40B:
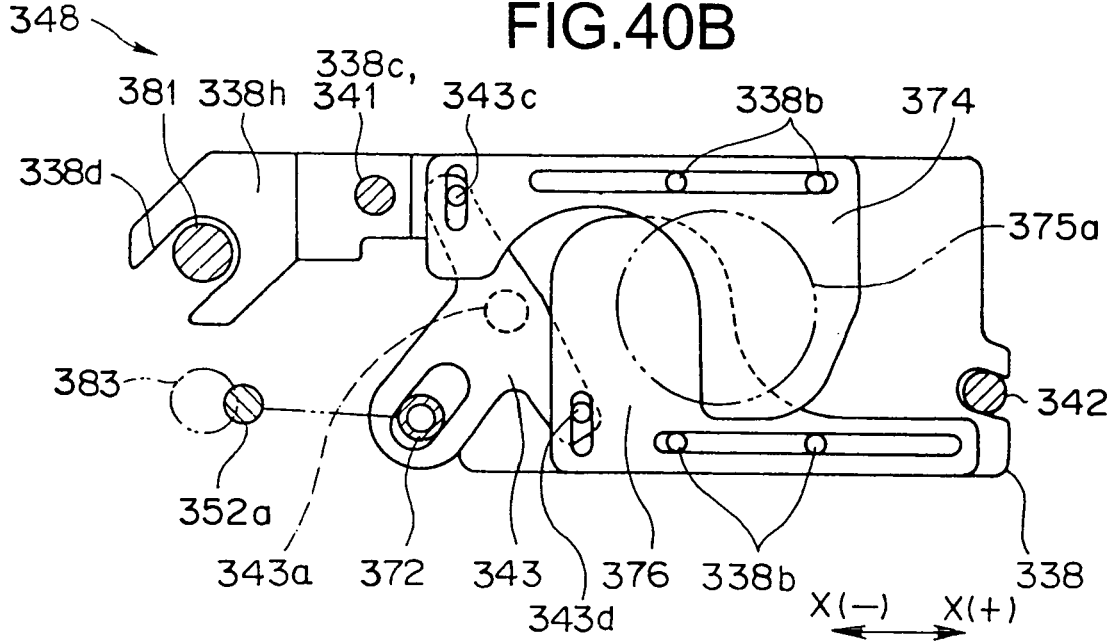

FIG. 40A is a drawing viewed in the direction indicated by arrow G of FIG. 39 showing a shutter open state; and FIG. 40B is a drawing viewed in the direction indicated by arrow G of FIG. 39 showing a shutter close state.

Figure 41:
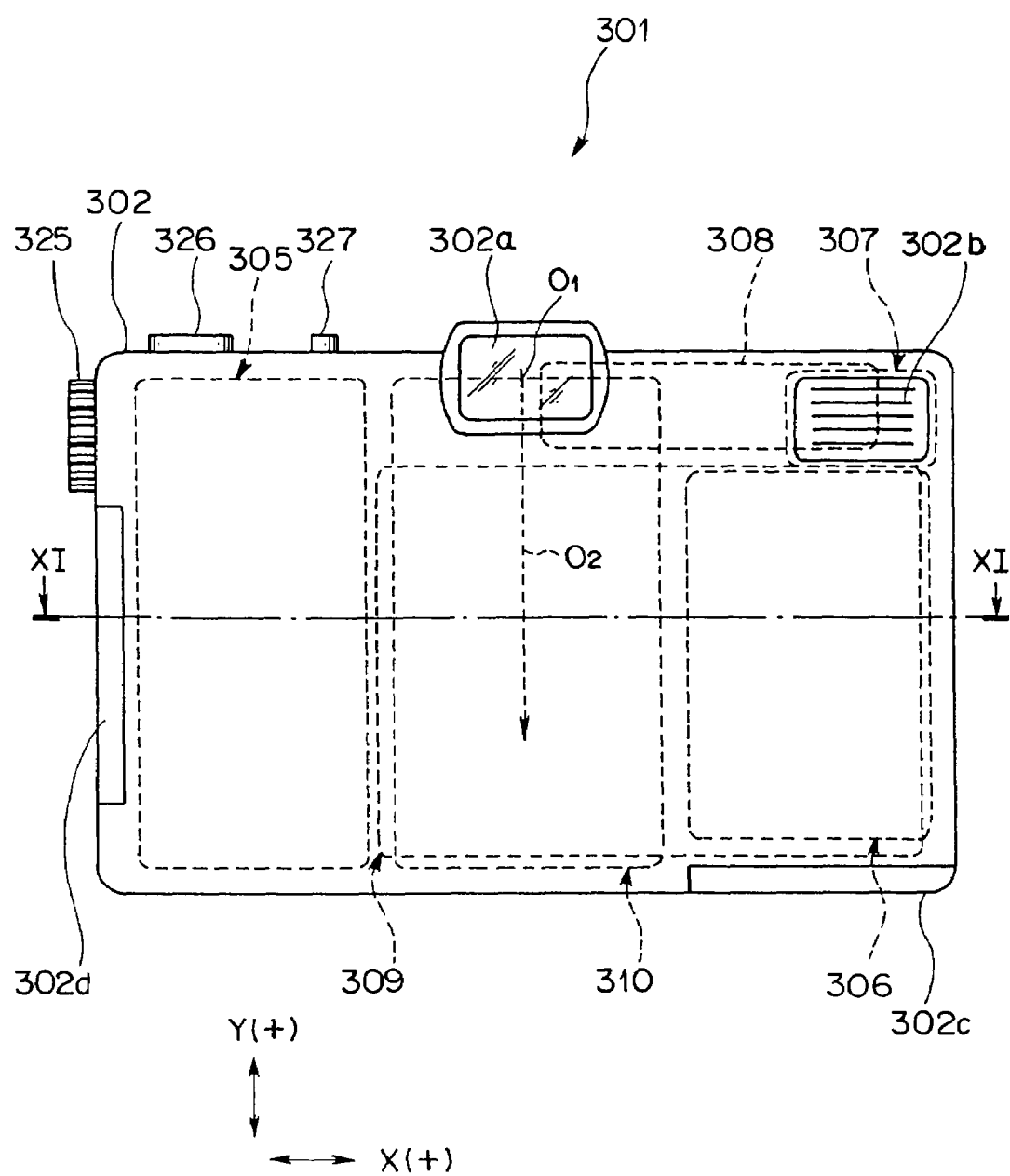

FIG. 41 is a front view of the electronic camera shown in FIG. 29 showing arrangement of component units accommodated therein with broken lines.

Figure 42:
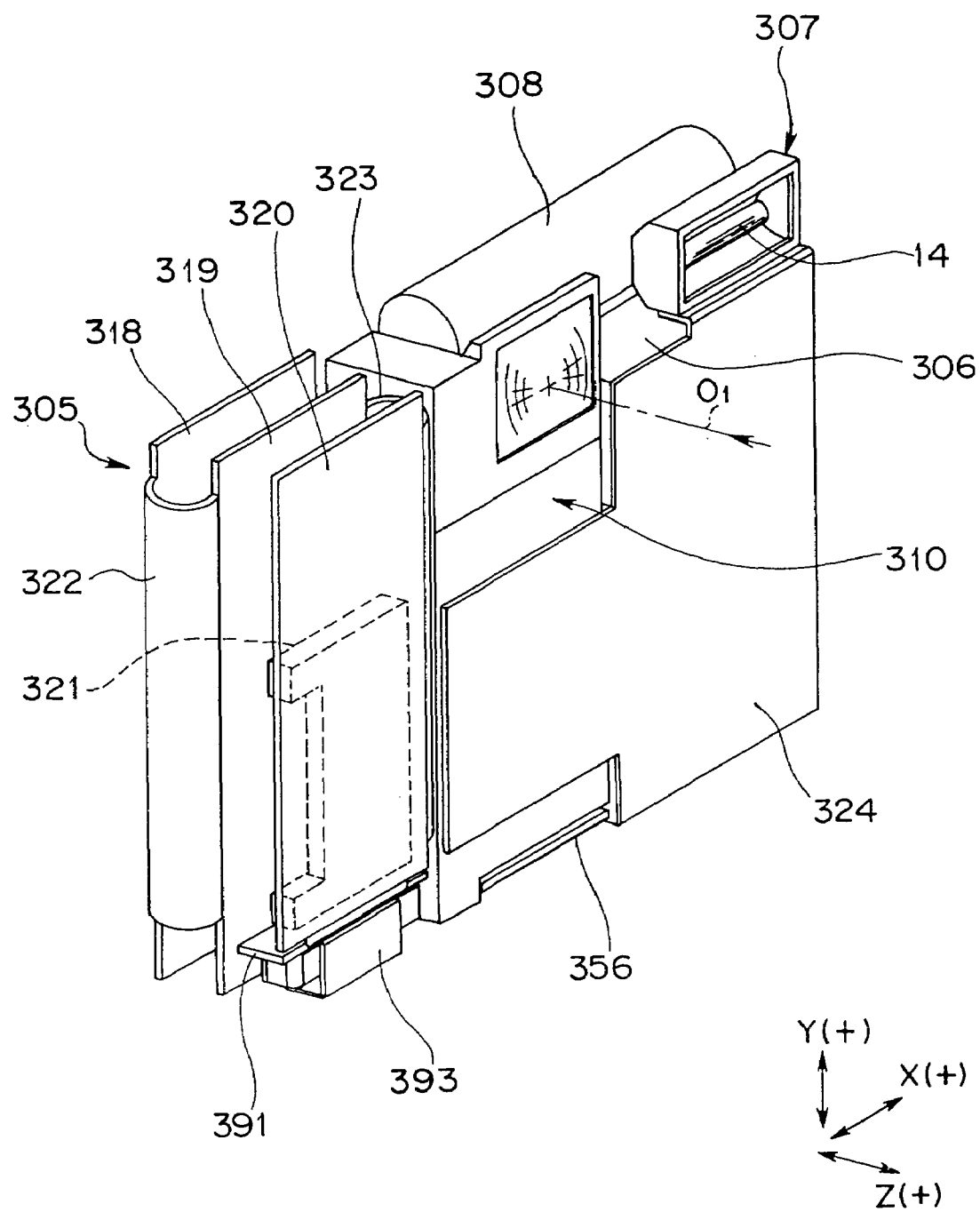

FIG. 42 is a drawing of a blocking up state of the component units accommodated in the electronic camera shown in FIG. 29 viewed from the left front.

Figure 43:
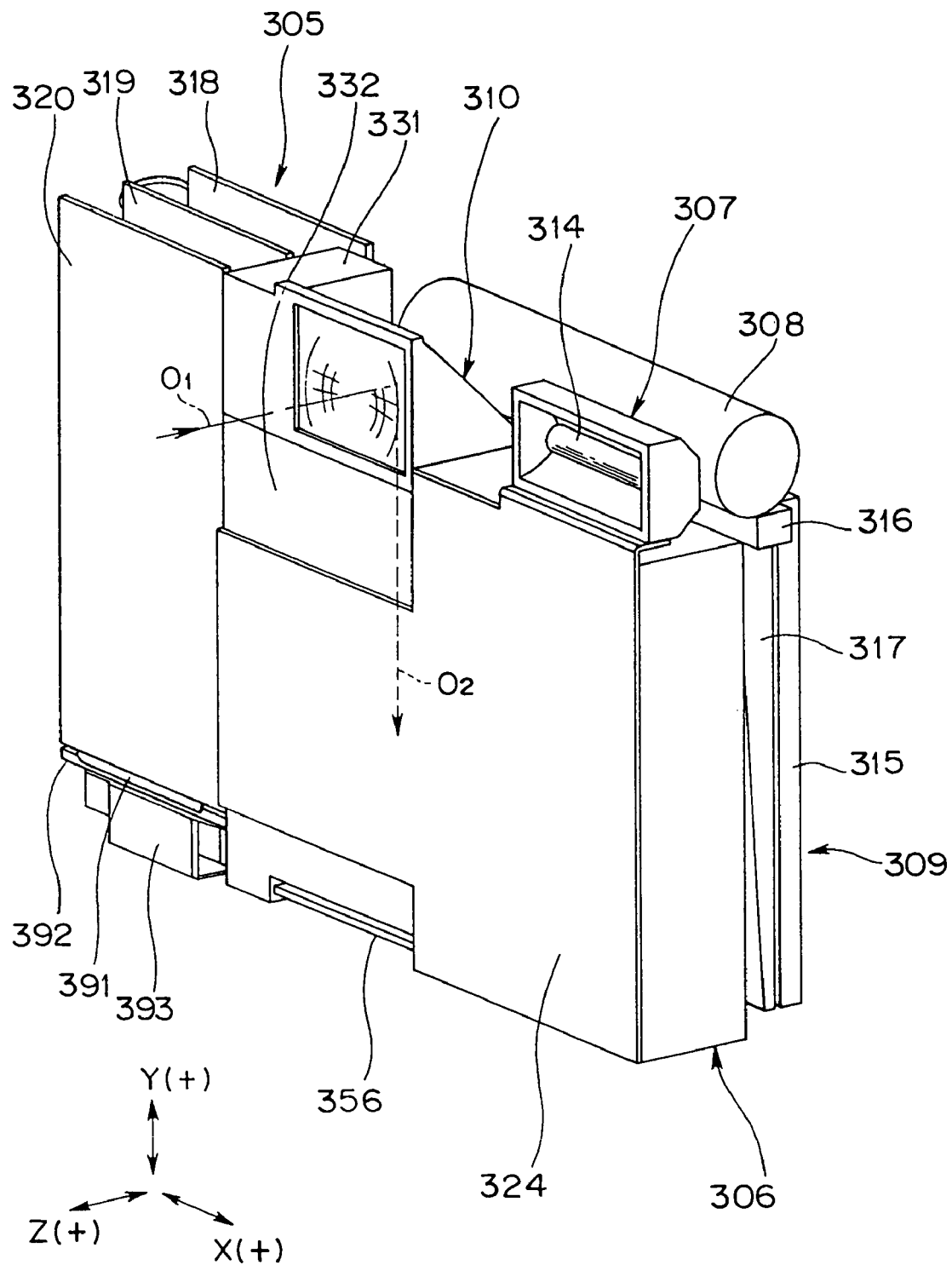

FIG. 43 is a drawing of a blocking up state of the component units accommodated in the electronic camera shown in FIG. 29 viewed from the right front.

Figure 44:
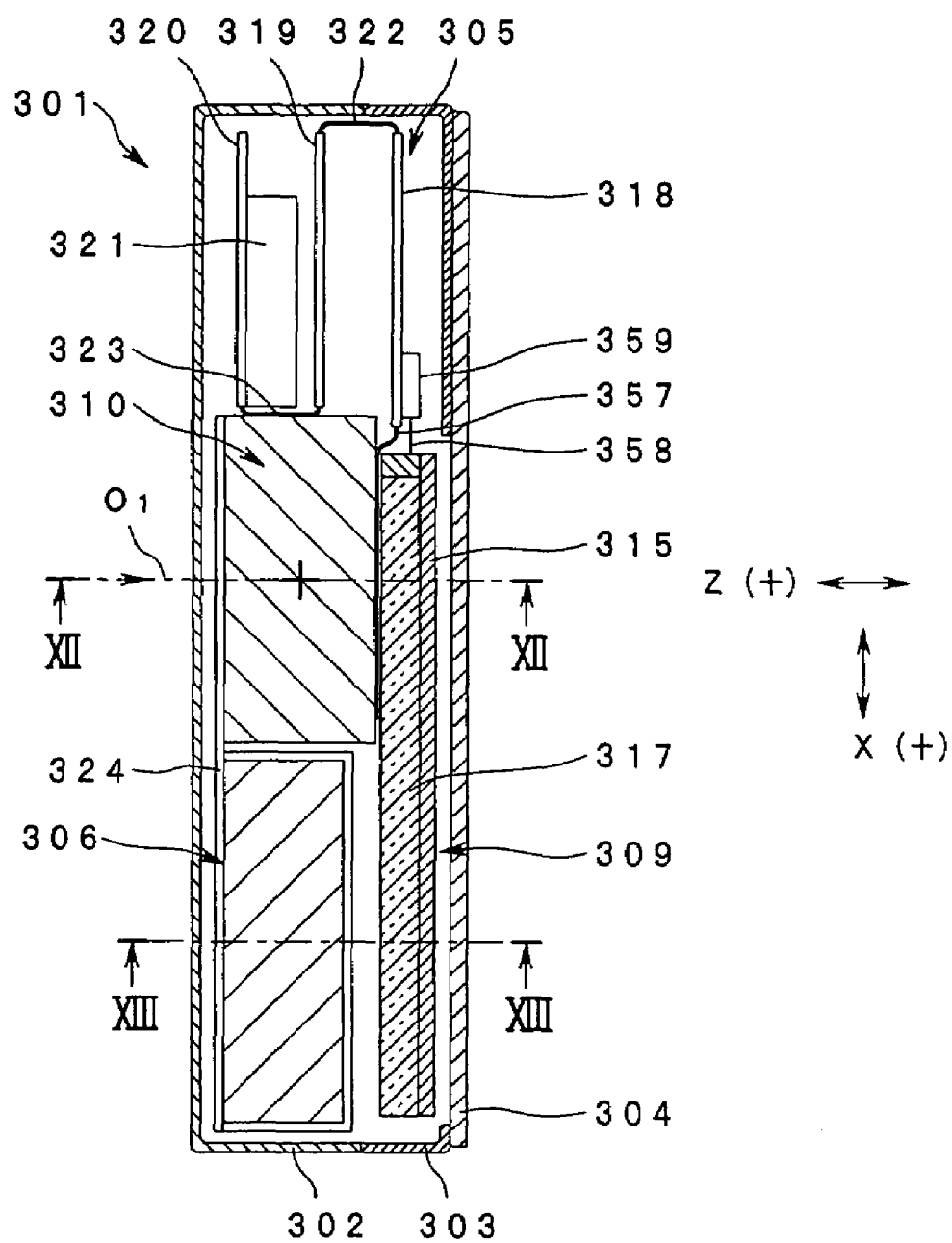

FIG. 44 is a sectional view at the line XI-XI of FIG. 41.

Figure 45:
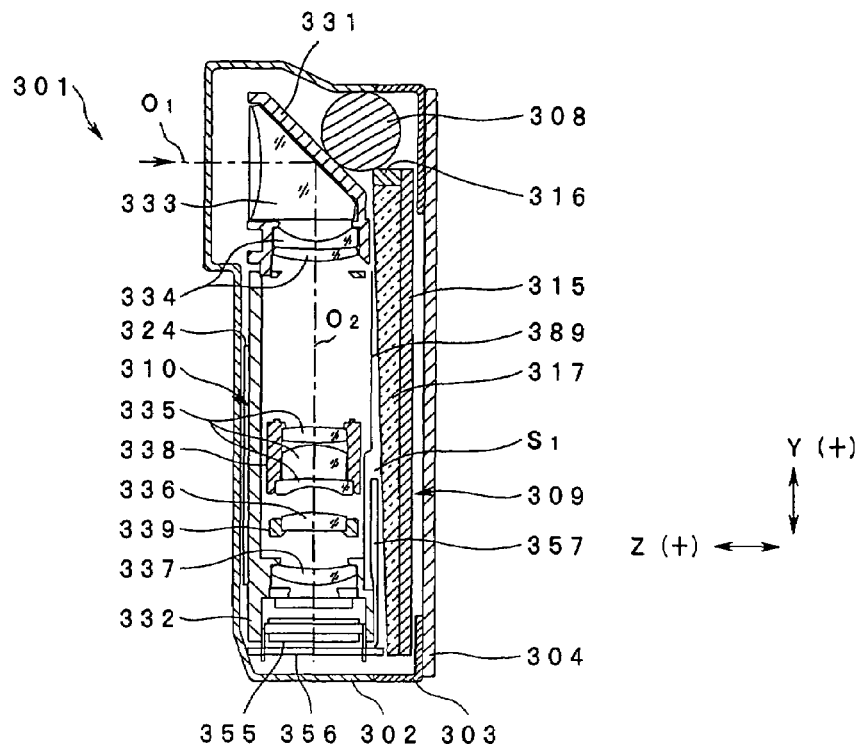

FIG. 45 is a sectional view at the line XII-XII of FIG. 44.

Figure 46:
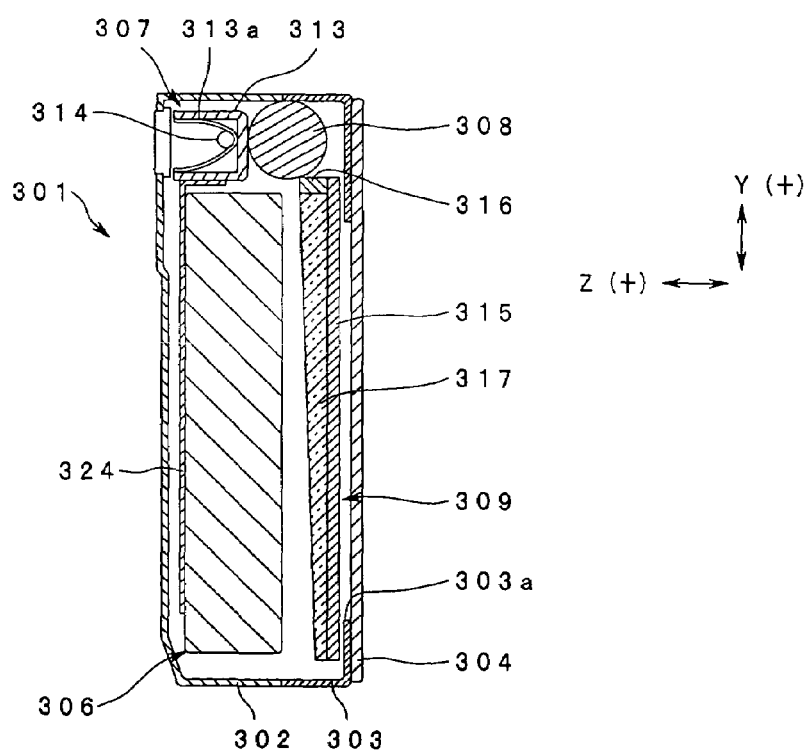

FIG. 46 is a sectional view at the line XIII-XIII of FIG. 44.

Figure 47:
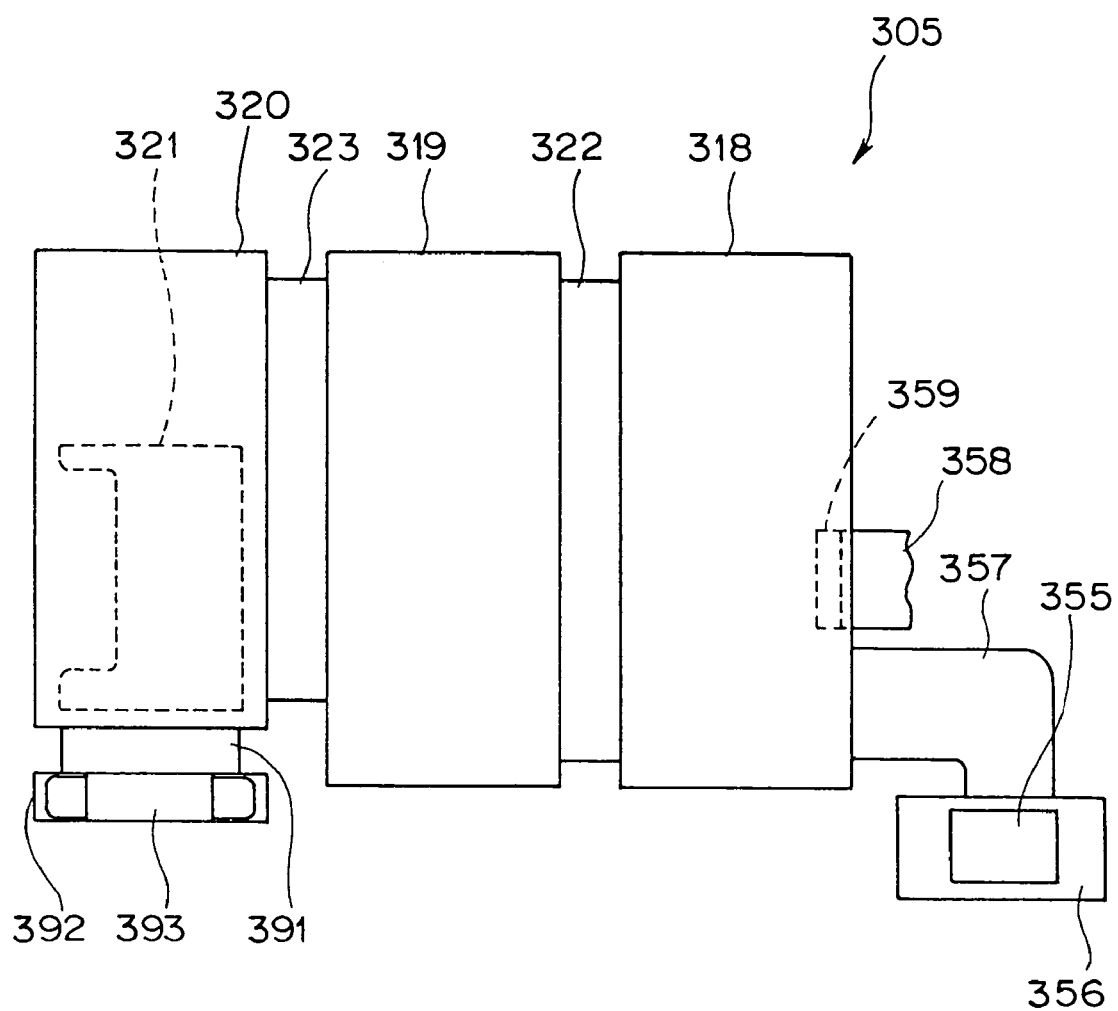

FIG. 47 is a development of an electrical substrate unit built in the electronic camera shown in FIG. 29.

Figure 48:
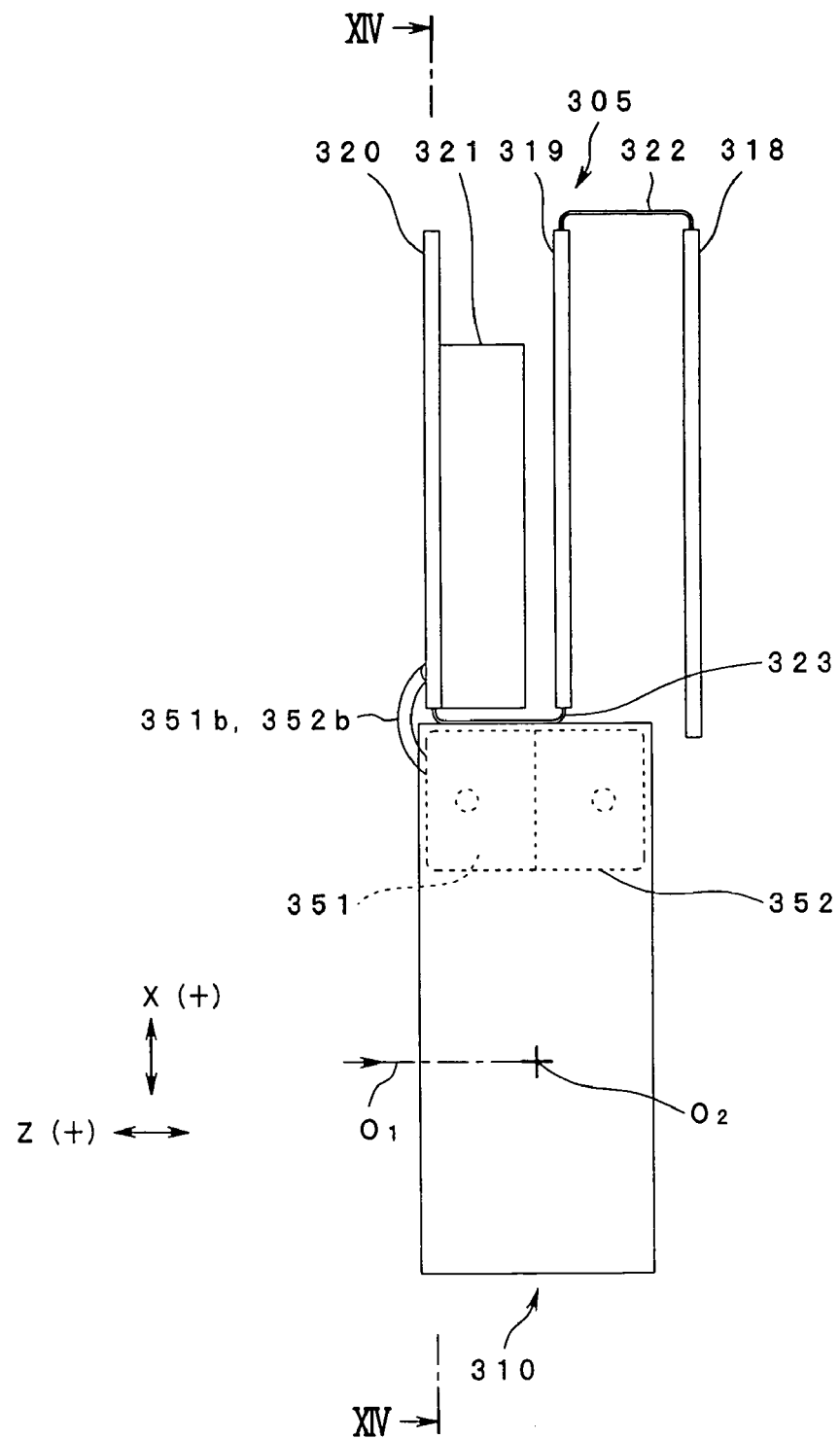

FIG. 48 shows the accommodated arrangement of the lens barrel and the electrical substrate unit on XI-XI section of FIG. 41.

Figure 49:
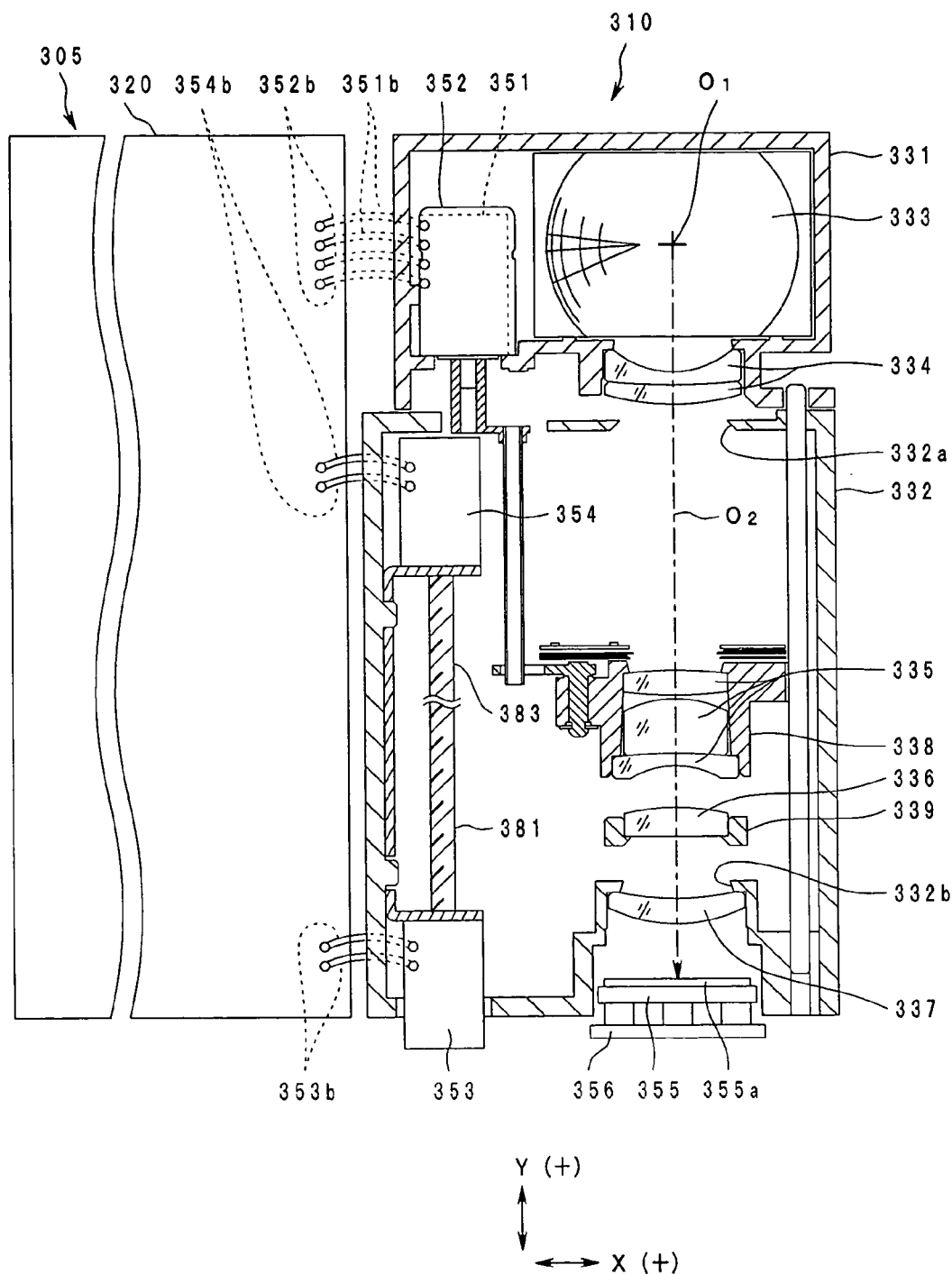

FIG. 49 is a sectional view at the line XIV-XIV of FIG. 48.

DETAIL DESCRIPTION OF THE PREFERRED EMBODIMENT

Embodiments according to the present invention will be described below with reference to the drawings.

Figure 1:
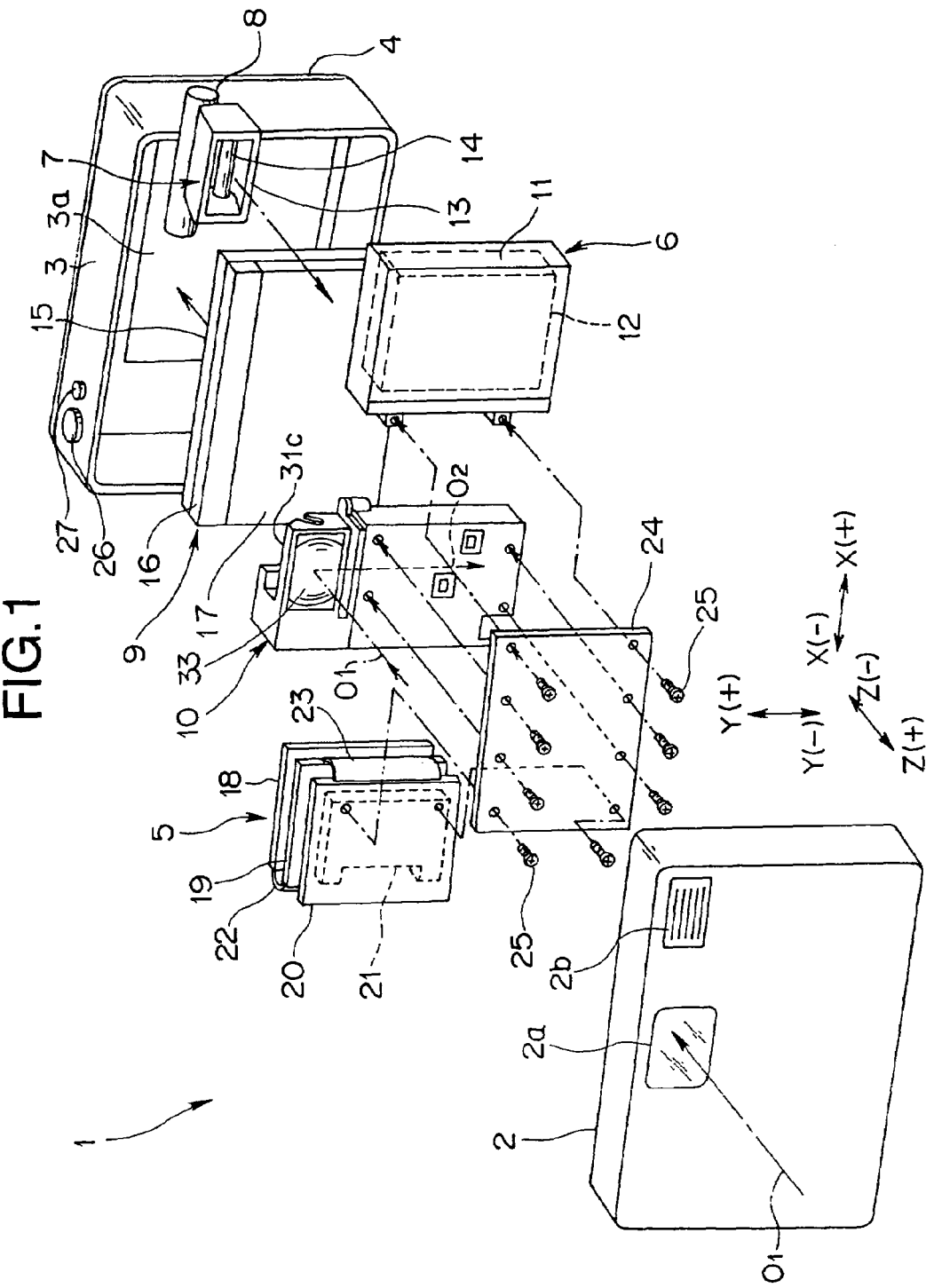
FIG. 1 is an exploded perspective view of an electronic camera having a lens barrel housed therein according to a first embodiment of the present invention.

FIG. 1 is an exploded perspective view of an electronic camera (camera) housing a lens barrel therein according to a first embodiment of the present invention.

In the following description, as shown in FIG. 1, a direction along a first optical axis O1, which is an incident direction of a subject beam, denotes a Z-direction, a direction Z (+) adjacent to a subject of an electronic camera denotes a front, and a back direction Z (−) of a camera denotes a rear. An up-and-down direction perpendicular to the Z-direction represents a Y-direction; a direction Y (+) the up-direction; and a direction Y (−) the down direction. A lateral direction perpendicular to the Z-direction represents an X-direction; when viewing the camera from the subject, the right direction is defined as an X (+); the left direction is defined as an X (−). These directional definitions will also be applied to other embodiments.

As shown in FIG. 1, an electronic camera 1 according to the first embodiment is a so-called digital camera, and includes a front cover 2 and a rear cover 3, which are armoring members. A unit accommodated within the front cover 2 and the rear cover 3 includes a lens barrel 10, an electrical substrate unit 5, a power supply unit 6, a stroboscope unit 7, a capacitor 8 for charging a stroboscope, an LCD (liquid crystal display) unit 9, which is a display unit, and a base frame 24.

The front cover 2 is provided with a shooting window 2a for taking in a subject beam therein and a stroboscopic emission window 2b, which are arranged on the front surface of the front cover 2.

The rear cover 3 is provided with a two-step release button 26, a power supply button 27 for turning power on/off, which are arranged on the top surface of the rear cover 3, and an LCD opening 3a arranged on the rear surface. On the rear surface of the rear cover 3, a transparent plate 4, which is a transparent member, is fixed so as to cover the LCD opening 3a.

With the lens barrel 10 being mounted on the camera, the lens barrel 10 has a substantially rectangular parallelepiped contour of which front surface is arranged along an X-Y plane, a longitudinal axis is aligned along the Y-direction, and a thickness in the Z-direction is comparatively thin. In an upper portion of the lens barrel 10, a prism 33 is accommodated, which is a reflection optical member forming a bending optical system for taking in a subject beam proceeding along the first optical axis O1 (Z-direction) therein. On the upper rear surface of the lens barrel, an inclined surface 31c (FIG. 3) is formed.

In the lens barrel 10, the taken subject beam along the first optical axis O1 is reflected by the prism 33 in a direction of a second optical axis O2, and the image is formed on an image-forming plane of a CCD (charge coupled device) 55, which is an image pickup element, via a taking lens system, which will be described later, so as to be converted to an image signal of a subject image. The detail of this will be described later.

The electrical substrate unit 5 includes three printed circuit boards 18, 19, and 20 arranged at one side of the lens barrel 10 and having control elements of an electric circuit, which will be described later, of the electronic camera mounted thereon. A recording media slot 21 is mounted inside the printed circuit board 20. The printed circuit boards 18, 19, and 20 are connected together by flexible printed circuits 22 and 23 (referred to as FPCs below), and accommodated along the direction of the optical axis O1 in three piles.

The power supply unit 6 is arranged at another side of the lens barrel 10, and is composed of a battery case 11 and a camera power battery 12 inserted into the battery case 11. The power supply unit 6 has a rectangular parallelepiped shape having a plane extended along an X-Y plane and a thickness in the Z-direction comparatively thin.

The stroboscope unit 7 is composed of a stroboscope body 13 and a stroboscopic emission tube 14 supported inside a reflector of the stroboscope body 13.

The LCD unit 9 includes an LCD display board 15, which is a liquid crystal display board having a display plane arranged along the X-Y plane, an illumination light source 16 arranged at an upper position of the LCD display board 15 and extending in the X-direction, and a light-guide plate 17 substantially covering a non-display plane of the LCD display board 15. The light-guide plate 17 is a member with uneven thicknesses in the Y-direction such that an upper portion adjacent to the light source is thick while a lower portion is thinner.

The accommodation state of these units in the front and rear covers 2 and 3 is described. First, at the center of the base frame 24 made of a metallic plate and having a plane extending along the X-Y plane, the front surface (a second outer wall 32*j*) of the lens barrel 10 is abutted and fixed with screws 25. On the left surface of the base frame 24, in a state neighboring the lens barrel 10, the printed circuit 20 of the electrical substrate unit 5 is fixed to the base frame 24 with the screws 25 together with the media slot 21. Furthermore, on the right surface of the base frame 24, in a state neighboring the lens barrel 10, the power supply unit 6 is fixed to the base frame 24 with the screws 25, so that the lens barrel 10, the electrical substrate unit 5, and the power supply unit 6 are integrated together. Moreover, the stroboscope unit 7 is fixed on the top of the power supply unit 6, and the capacitor 8 for charging a stroboscope is fixed in a state that the capacitor 8 approaches the rear of the upper inclined surface 31*c* of the lens barrel 10 from the rear of the stroboscope unit 7.

On the other hand, the LCD unit 9 is arranged and fixed inside the rear cover 3 in a state that a screen of the LCD display board 15 is opposed to the opening 3*a*.

The base frame 24 having the lens barrel 10, the electrical substrate unit 5, and the power supply unit 6 attached thereto is accommodated between the front cover 2 and the rear cover 3 in a clamped state therebetween, so that the electronic camera 1 is completed by joining the front cover 2 and the rear cover 3 together so as to fix them.

In the accommodation state mentioned above, an incident opening of the prism 33 of the lens barrel 10 is arranged so as to face the shooting window 2*a* of the front cover 2, and an emission part of the stroboscope unit 7 is arranged behind the stroboscopic emission window 2*b*. Furthermore, the LCD unit 9 is positioned so as to oppose the LCD opening 3*a* of the rear cover 3 in a state overlapping with the power supply unit 6 and the lens barrel 10.

Also, in the accommodation state mentioned above, the combined total thickness of the lens barrel 10, the power supply unit 6, and the LCD unit 9 in the Z-direction is substantially the same as the thickness (an occupied space) of the electrical substrate unit 5 in the Z-direction. The height of the lens barrel 10 in the Y-direction is substantially the same as that of the LCD unit 9.

Figure 2:
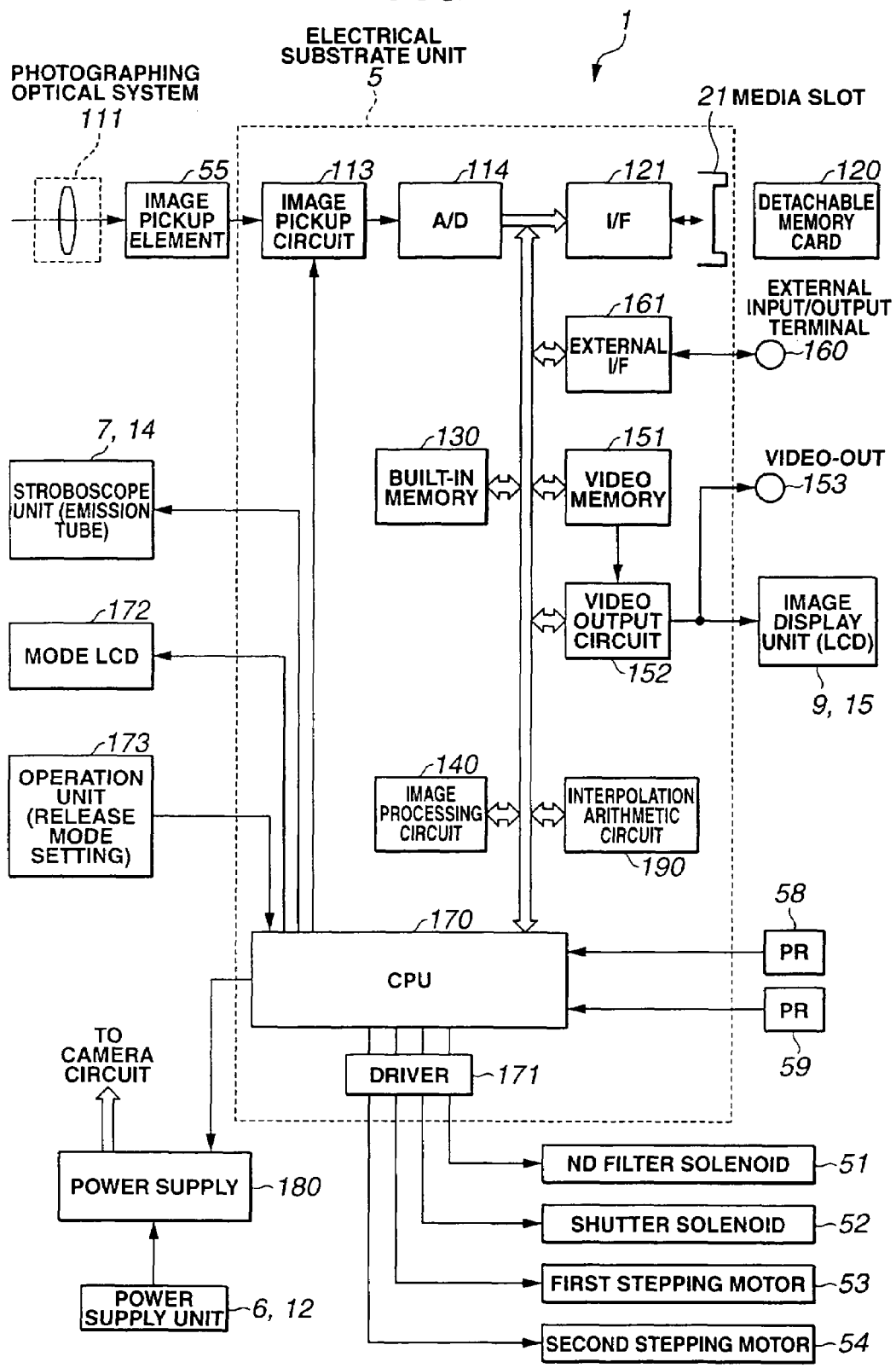
FIG. 2 is a block diagram of an electric circuit of the electronic camera shown in FIG. 1.

An electrical circuit of the electronic camera 1 according to the first embodiment will now be described with reference to the block diagram of FIG. 2.

The electronic camera 1 according to the first embodiment is provided with a CPU (central processing unit) 170 built therein as controlling means, and the entire control elements of the electronic camera 1 are controlled by the CPU 170.

First, a subject image passing through a photographing optical system 111 is converted into an electric signal at the CCD 55 under the control of the CPU 170. The electric signal converted by the CCD 55 is converted into a digital image signal by an A/D conversion circuit 114 after being converted into an analogue image signal by an image pickup circuit 113. Then, this digital image signal is stored in a recording media card (memory card) 120 as a recording medium such as a flash memory card and a smart memory card which are detachable as an external memory via an interface (I/F) 121. The recording media card 120 is detachably attached to the media slot 21. The photographing optical system 111 includes the prism, first to fourth group lenses, an ND (neutral density) filter, and a shutter of the lens barrel 10, which will be described later.

The electric circuit of the electronic camera 1 is provided with a built-in memory 130 with a high processing speed and an image processing circuit 140. The built-in memory 130 is incorporated in a random access memory (RAM), for example, and used in an operation memory in each image processing or in a high-speed buffer of temporary image storing means. The image processing circuit 140 executes the conversion to RGB signals, the conversion of the number of pixels, and compression/decompression of data, based on the image data digitized by the A/D conversion circuit 114.

Furthermore, the aforementioned LCD display board 15 for displaying images (liquid crystal display) is mounted on the electronic camera 1, and on the LCD display board 15, confirmation images stored in the memory card 120 and subject images to be pictured are displayed. The images displayed on the LCD display board 15 are images of the image information from the built-in memory 130, which are displayed by converting them into video images after they are once entered in a video memory 151. A video output circuit 152 also can produce video images on an external display via a video-output external terminal 153.

The CPU 170 captures a photographing start signal due to operation of the release button 26, performs picking-up of images by the CCD 55, and establishes a photographing mode by operating a mode setting button (not shown) by the taken-in setting signals of various modes of an operation unit 173. This established mode is displayed on an LCD 172. On the basis of the control by the CPU 170, in the case of insufficient quantity of light during picking up the image of a subject, the stroboscopic emission tube 14 of the stroboscope unit 7 is turned on so as to shoot the subject with the stroboscope.

Moreover, to the CPU 170, first and second stepping motors 53 and 54, which are drive sources for focus-driving and zoom-driving of the photographing optical system, are connected via a driver 171 therebetween, so that lenses are driven by these motors.

Also, to the CPU 170, an ND filter solenoid 51, which is a subject light-quantity adjustment device, for driving an ND filter unit, and a shutter solenoid 52 for driving a shutter unit are connected with the driver 171 therebetween, so that the light-quantity adjustment is executed.

To the CPU 170, photo reflectors (referred to as PRs below) 58 and 59, which are detecting units for detecting a reset position in the back-and-forth movement of the photographing optical system, are also connected, so that the reset position of the photographing optical system 111 is detected during reset driving.

An external interface (external I/F) 161 is connected to an external input-output terminal 160 so as to perform data I/O operations to and from an external instrument. To the external input-output terminal 160, a personal computer or the like is connected, for example, so as to forward images stored in the memory card 120 to the personal computer or the like. Alternatively, image data are entered therein from the personal computer or the like.

To control elements of the electronic camera 1, electric power is supplied from the battery 12 of the power supply unit 6 via a power supply 180 for driving the elements. The battery 12 is chargeable under the control of the power supply 180.

The structure of the lens barrel 10 will now be described in detail with reference to FIGS. 3 to 13.

Figure 3:
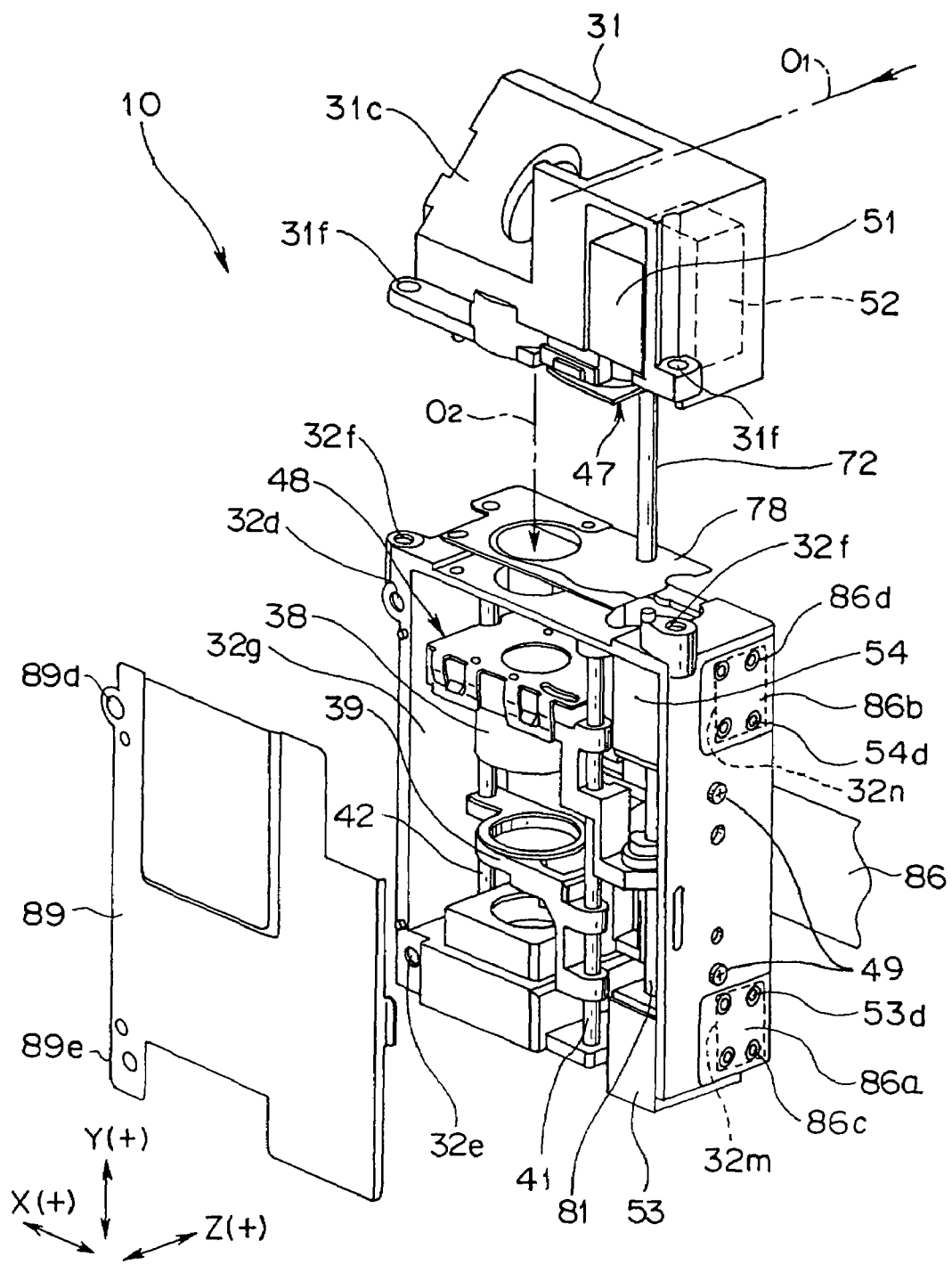
FIG. 3 is an exploded perspective view of the lens barrel of the electronic camera shown in FIG. 1 viewed from the rear.
Figure 4:
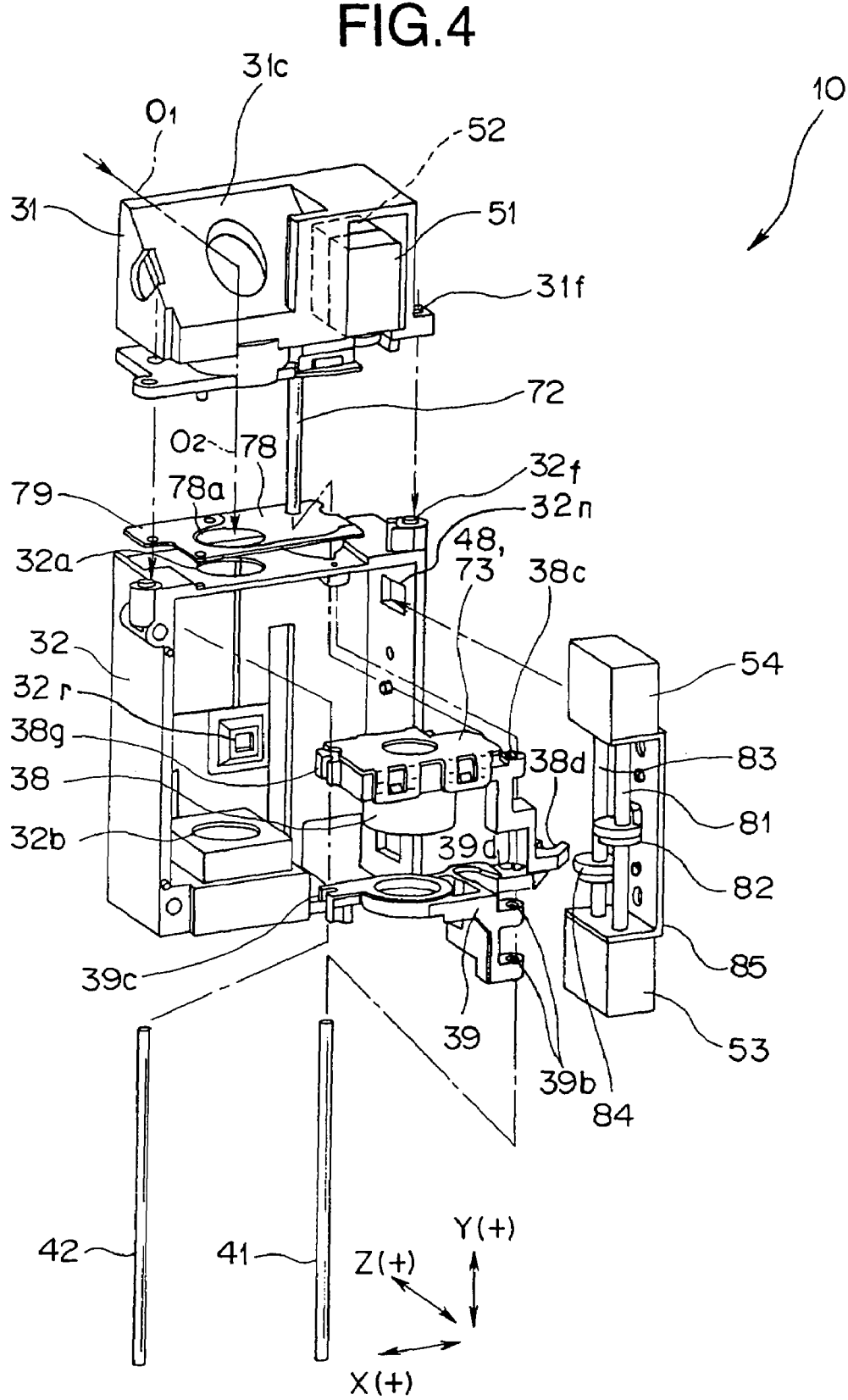
FIG. 4 is an exploded perspective view of the lens barrel of the electronic camera shown in FIG. 1 viewed from the rear.
Figure 5:
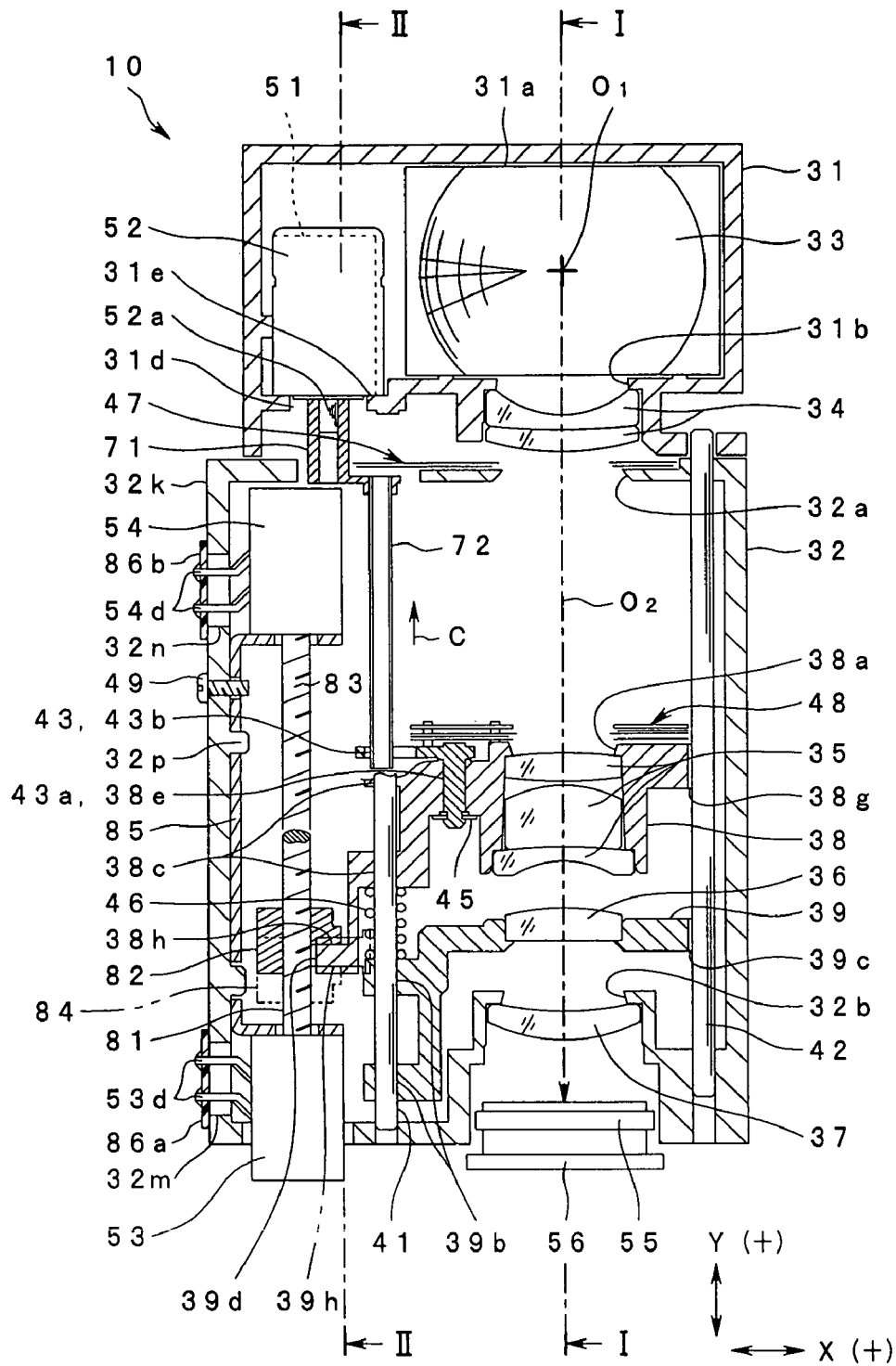
FIG. 5 is a longitudinal sectional view of the lens barrel shown in FIG. 3 in a wide-angle state viewed from the front.
Figure 6:
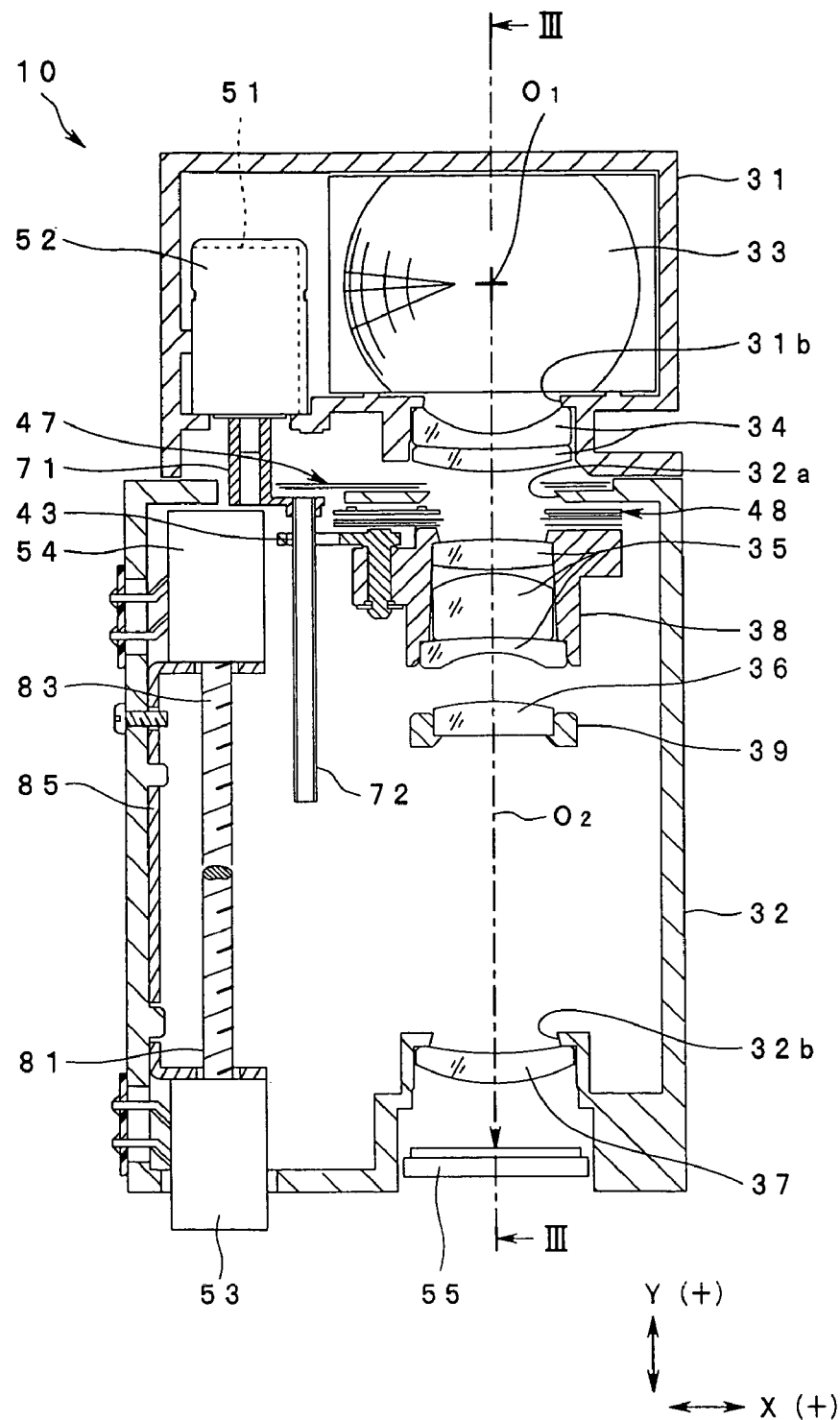
FIG. 6 is a longitudinal sectional view of the lens barrel shown in FIG. 3 in a telescopic state viewed from the front.
Figure 7:
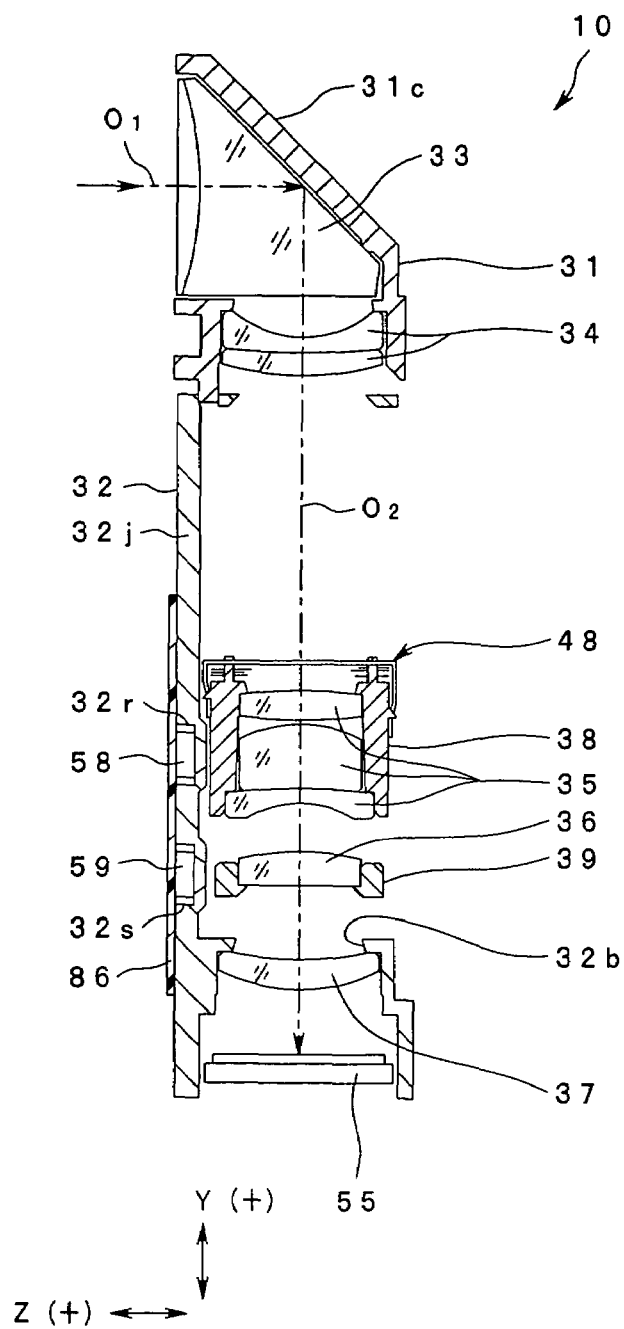
FIG. 7 is a sectional view at the line I-I of FIG. 5.
Figure 8:
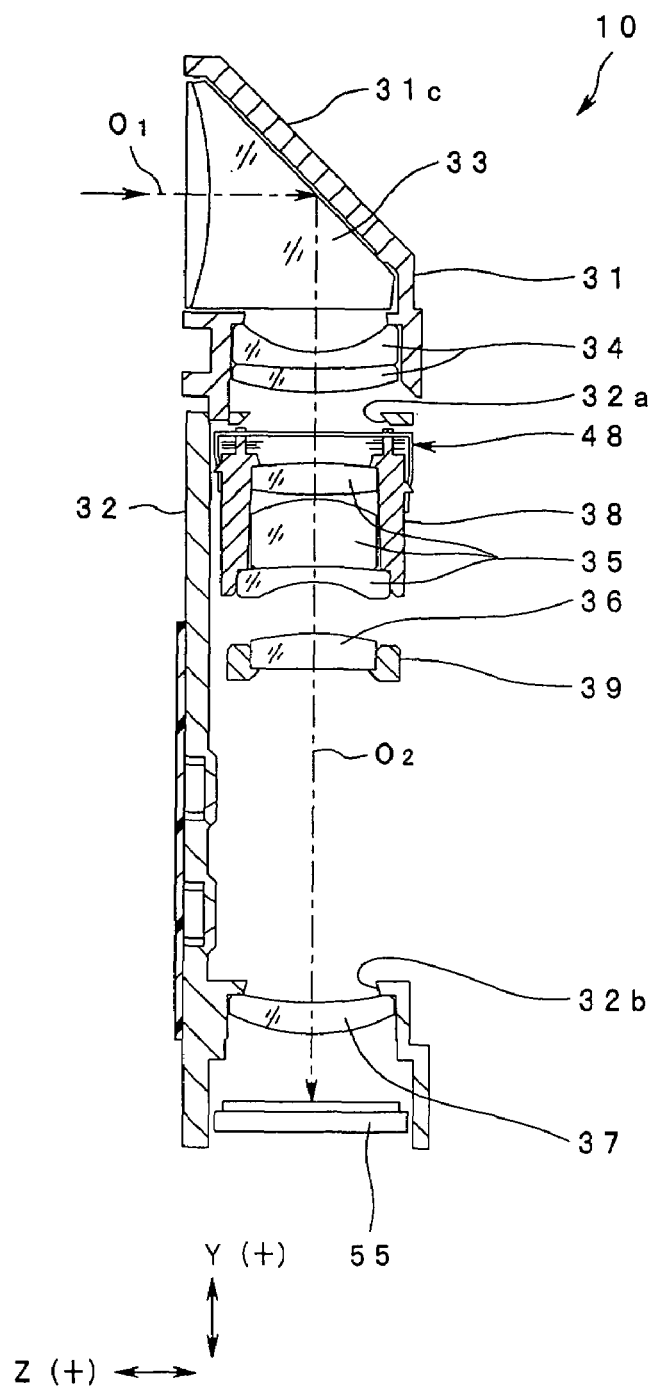
FIG. 8 is a sectional view at the line III-III of FIG. 6.
Figure 9:
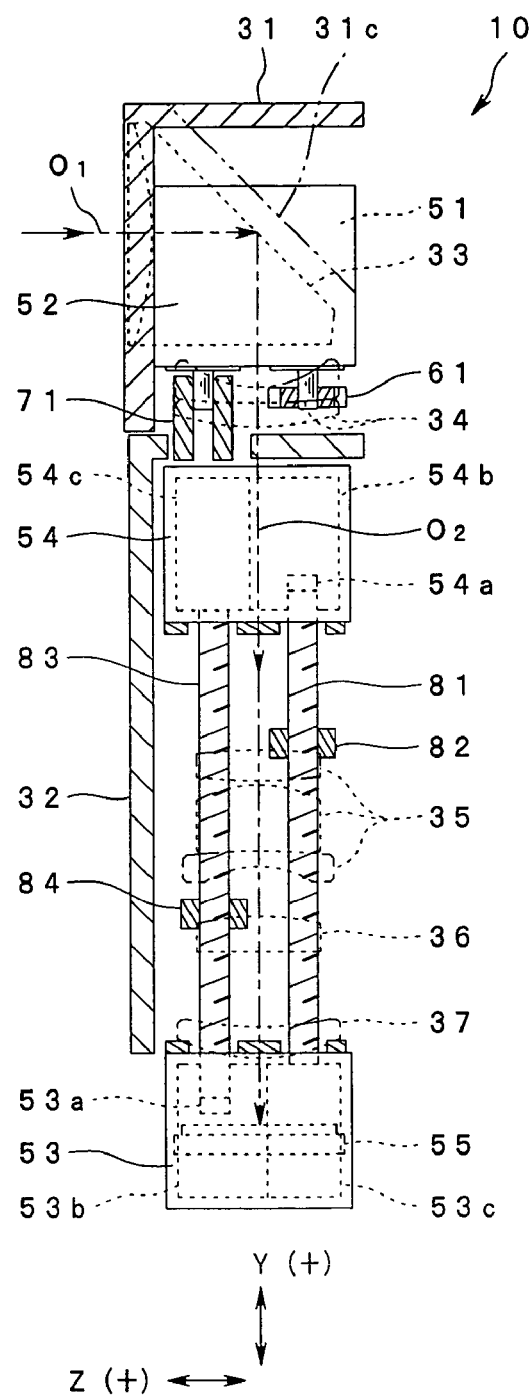
FIG. 9 is a sectional view at the line II-II of FIG. 5.
Figure 10:
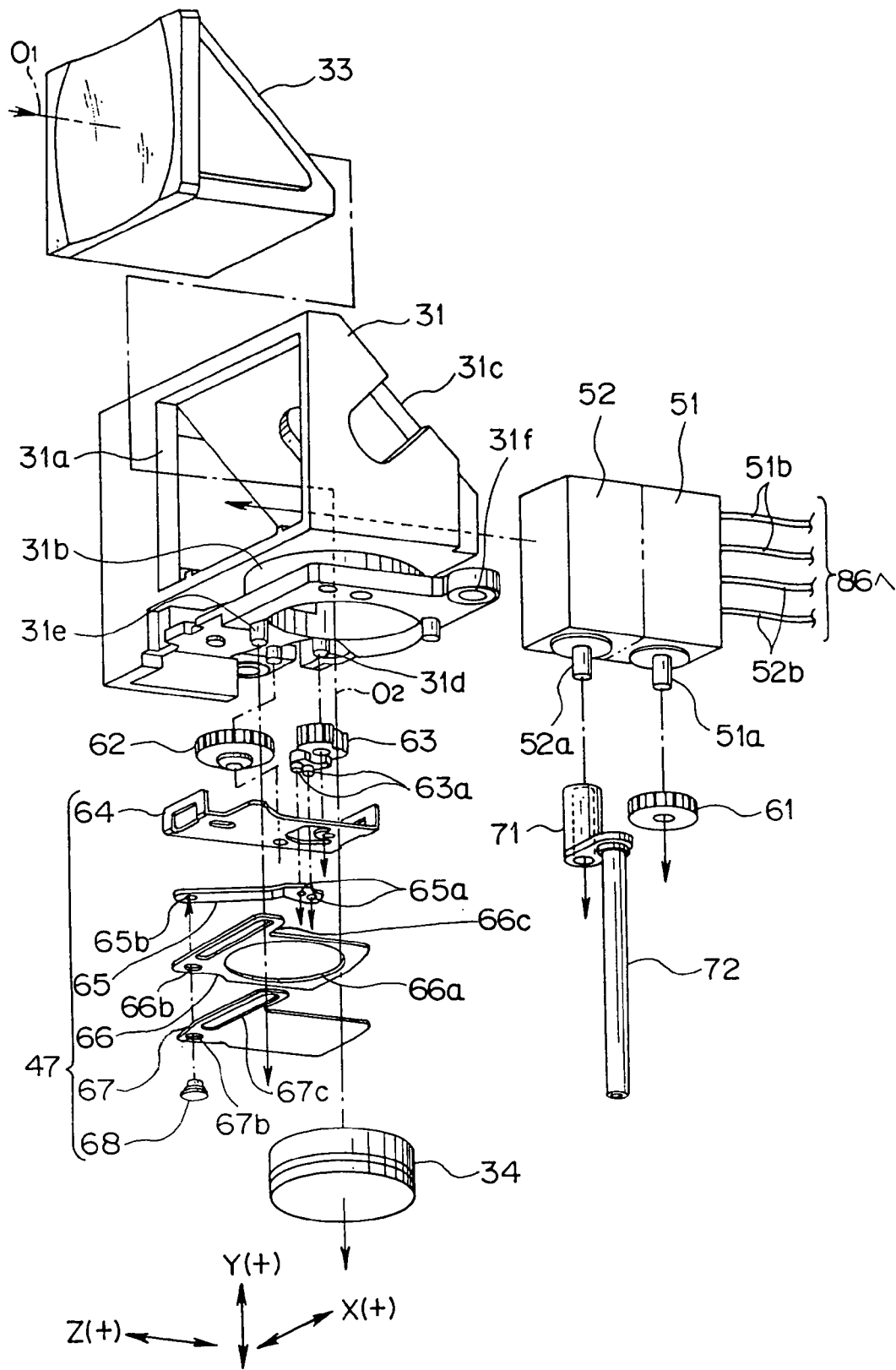
FIG. 10 is an exploded perspective view of the vicinity of a first group frame (ND filter unit) of the lens barrel shown in FIG. 3.
Figure 11:
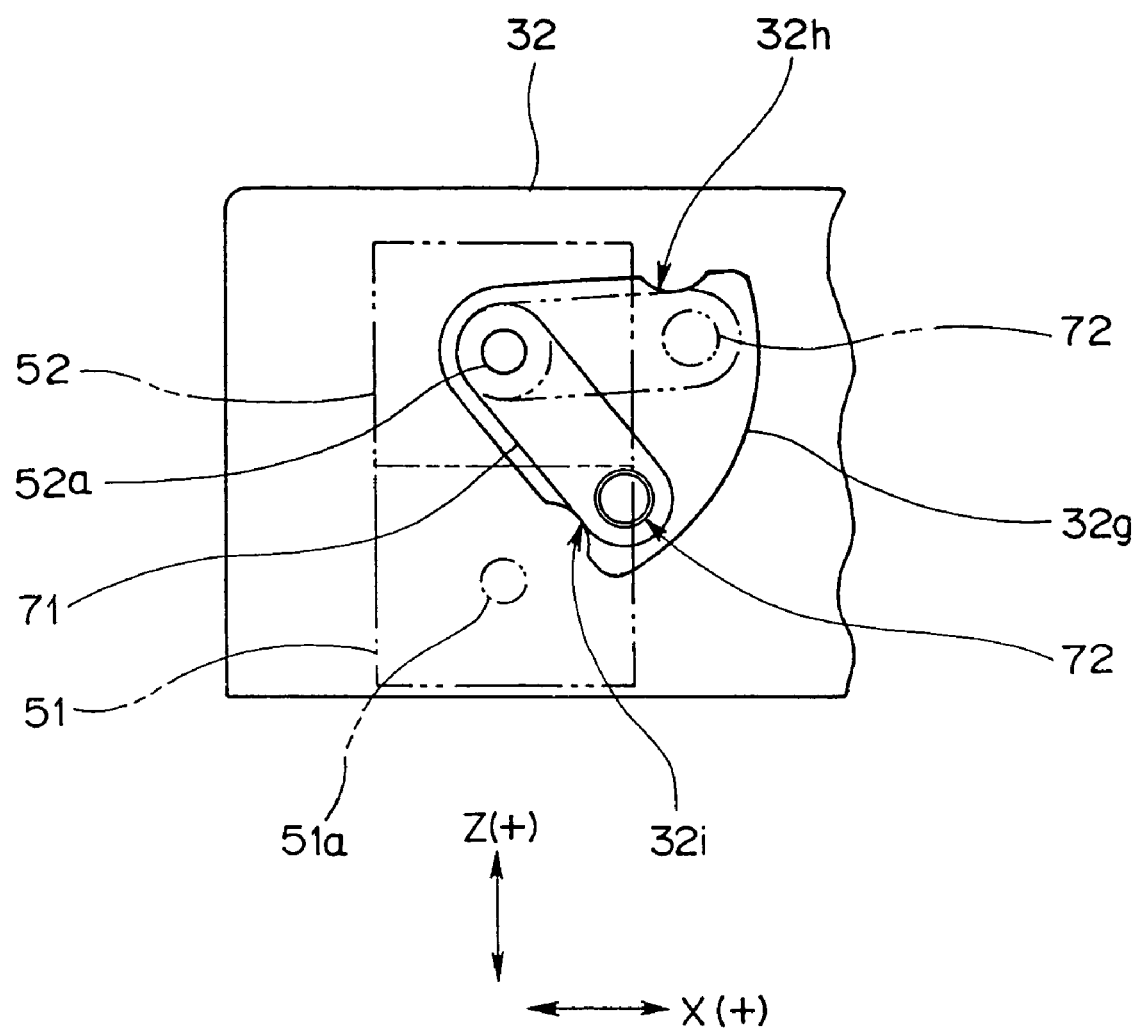
FIG. 11 is a drawing viewed in the direction indicated by arrow C of FIG. 5 showing the rotational range of a shutter drive arm.
Figure 12:
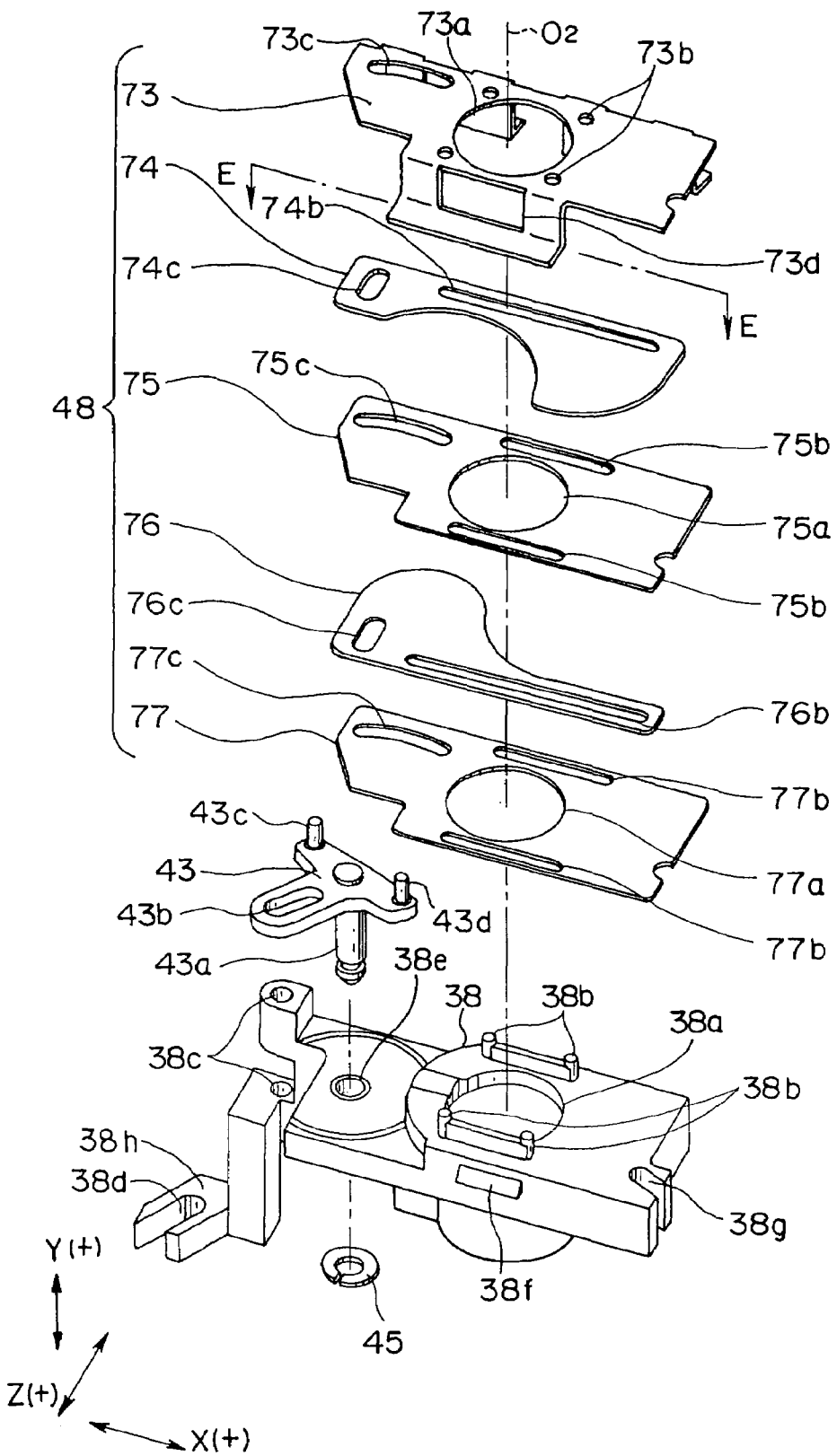
FIG. 12 is an exploded perspective view of the vicinity of a shutter unit of the lens barrel shown in FIG. 3.
Figure 13A:
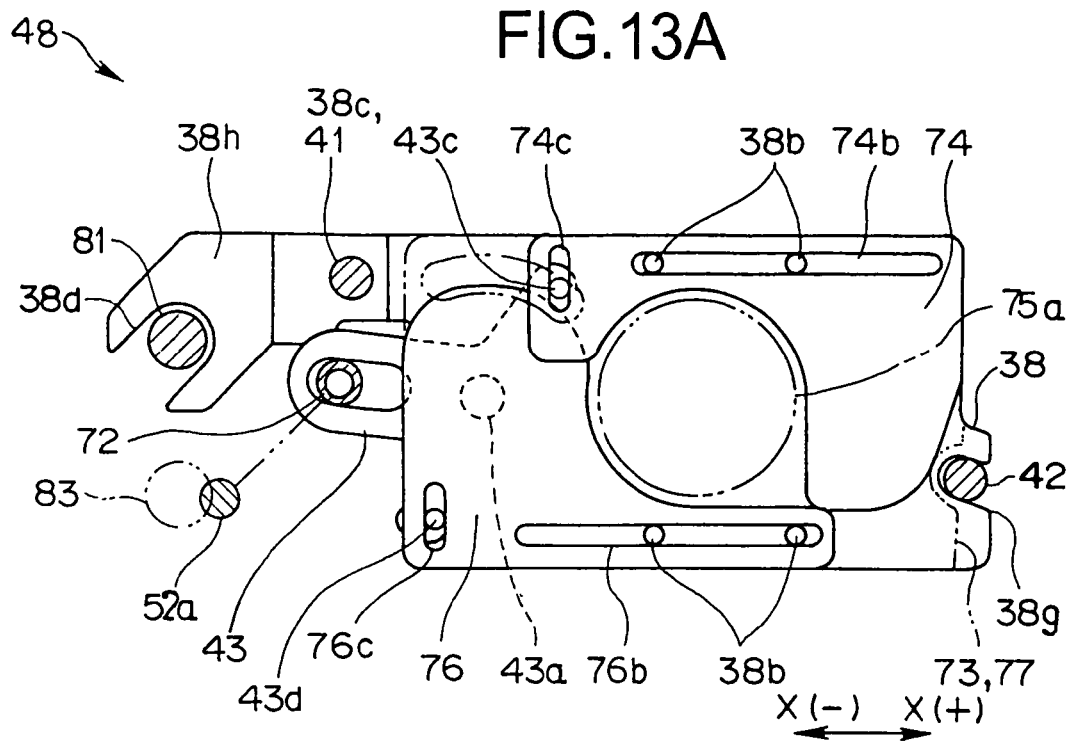
FIG. 13A is a drawing viewed in the direction indicated by arrow E of FIG. 12 showing a shutter open state.
Figure 13B:
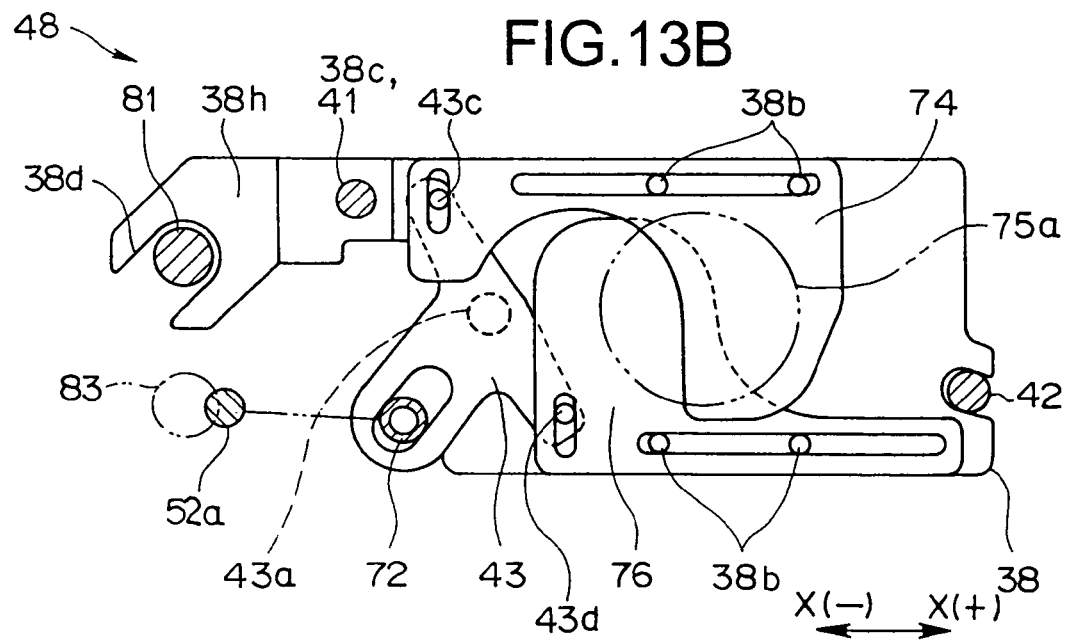
FIG. 13B is a drawing viewed in the direction indicated by arrow E of FIG. 12 showing a shutter close state.
Figure 14A:
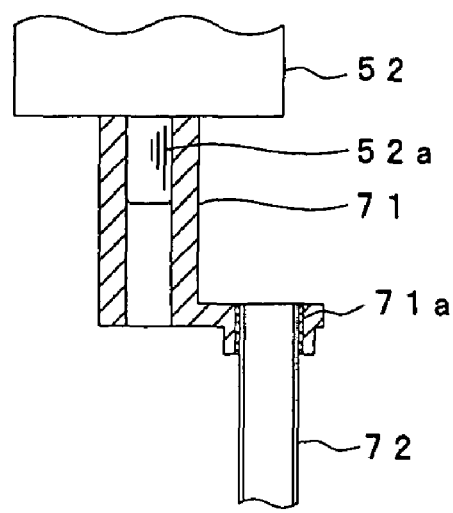
FIG. 14A is an enlarged sectional view of a shutter drive arm incorporated in the lens barrel shown in FIG. 3.
Figure 14B:
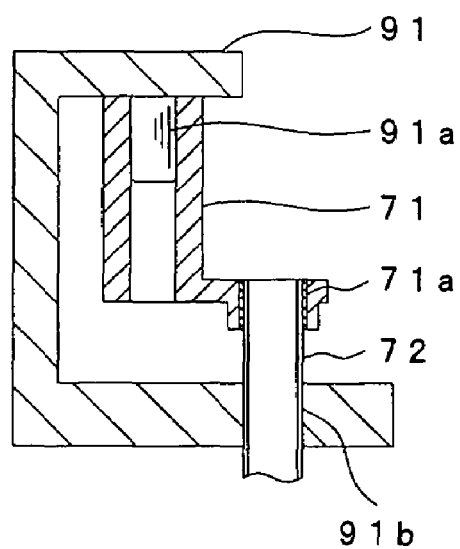
FIG. 14B is an enlarged sectional view of the shutter drive arm incorporated in the lens barrel shown in FIG. 3 in a state mounted on a bonding jig.
Figure 15:
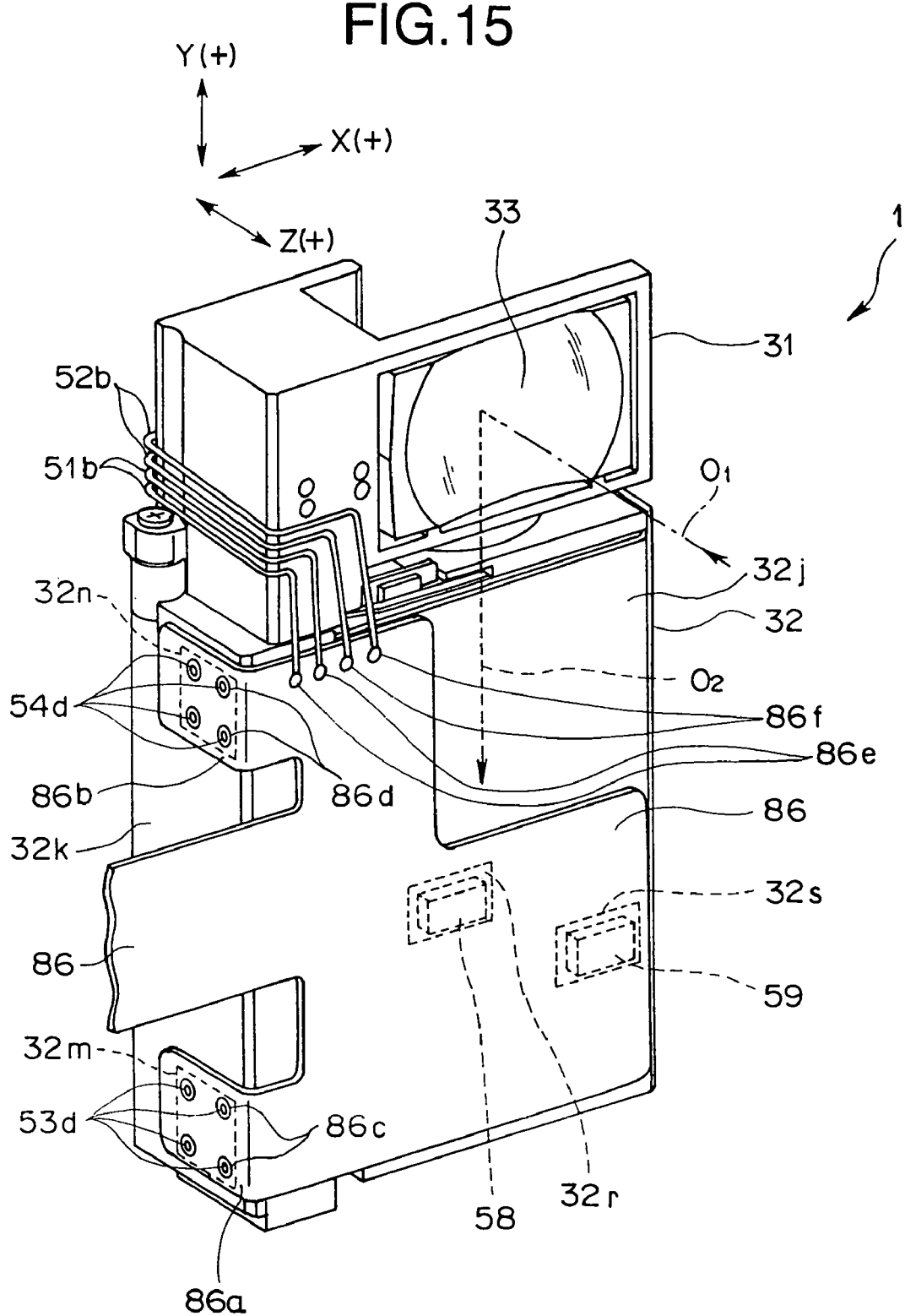
FIG. 15 is a perspective view of a state that connection FPCs are attached to the lens barrel shown in FIG. 3 viewed from the front.
Figure 16:
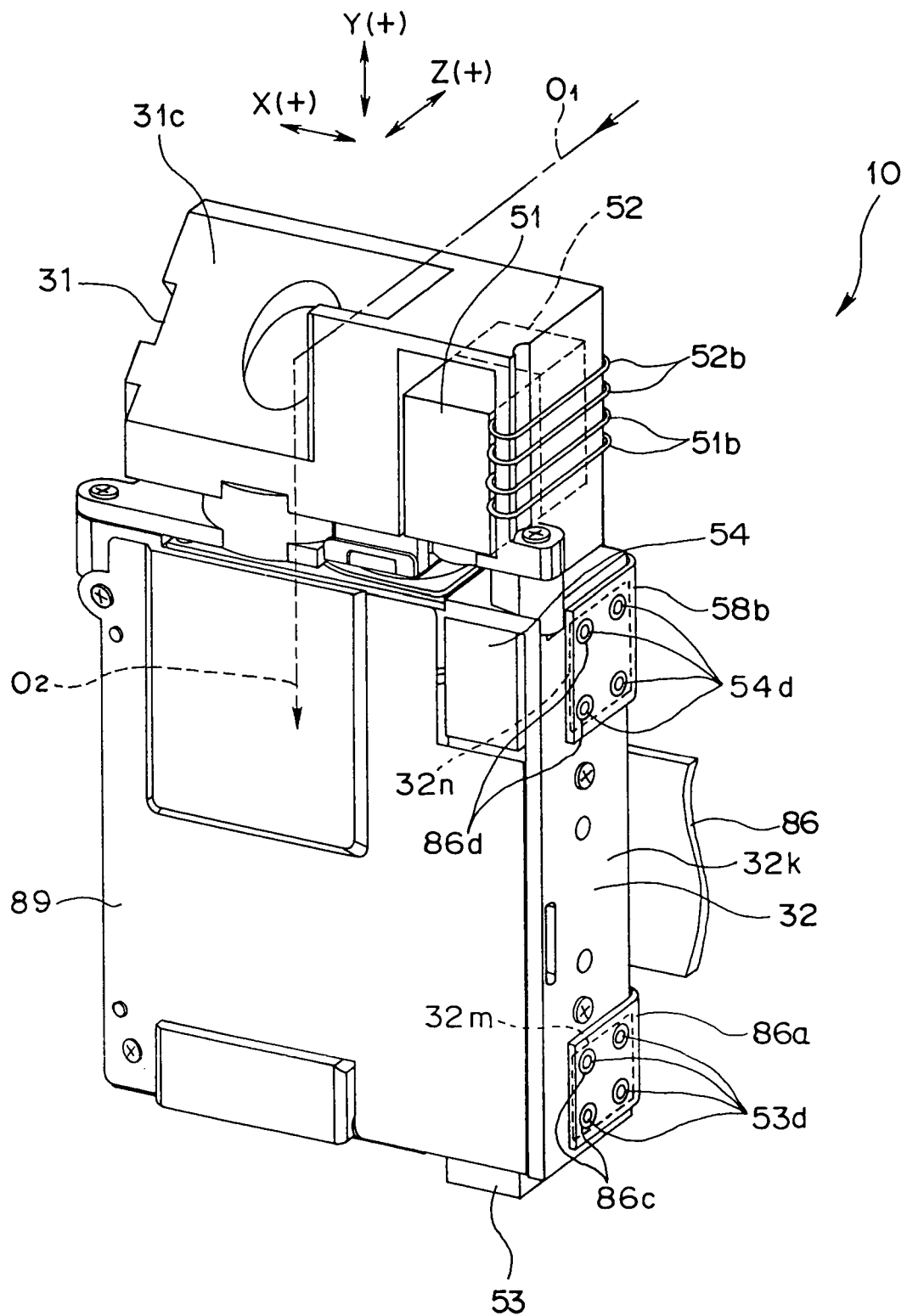
FIG. 16 is a perspective view of a state that the connection FPCs are attached to the lens barrel shown in FIG. 3 viewed from the rear.

FIGS. 3 and 4 are exploded perspective views of the lens barrel viewed from the rear; FIG. 5 is a longitudinal sectional view of the lens barrel in a wide-angle state viewed from the front; FIG. 6 is a longitudinal sectional view of the lens barrel in a telescopic state viewed from the front; FIG. 7 is a sectional view at the line I-I of FIG. 5; FIG. 8 is a sectional view at the line III-III of FIG. 6; and FIG. 9 is a sectional view at the line II-II of FIG. 5. FIG. 10 is an exploded perspective view of the vicinity of a first group frame (ND filter unit); FIG. 11 is a drawing viewed in a direction indicated by arrow C of FIG. 5, showing the rotational range of a shutter-driving arm; FIG. 12 is an exploded perspective view of the vicinity of a shutter unit; FIG. 13A is a drawing viewed in a direction indicated by arrow E of FIG. 12, showing a shutter-open state; FIG. 13B is a drawing viewed in the direction indicated by arrow E of FIG. 12, showing a shutter-close state; FIG. 14A is an enlarged sectional view of the shutter-driving arm; FIG. 14B is an enlarged sectional view showing a state that the shutter-driving arm and a shaft are attached to a jig for adhering and fixing the shaft; FIG. 15 is a perspective view of the lens barrel in a state of mounting a connection FPC viewed from the front; and FIG. 16 is a perspective view of the lens barrel in a state of mounting the connection FPC viewed from the rear.

The lens barrel 10, as shown in FIG. 5, etc., includes a first-group frame 31, which is a first holding frame; and a fixed frame 32, which is a frame member. Members housed within the first-group frame 31 include the prism 33, which is a reflection optical member; a first group lens 34; an ND filter unit 47, which is light-quantity adjusting means; a rotary solenoid (referred to as a solenoid) 51 for an ND filter, which is a filter drive source; a shutter solenoid 52, which is a shutter drive source (sector drive source), and the like. Furthermore, members provided within the fixed frame 32 include a shutter unit 48, which is light-quantity adjusting means (shutter means) provided along the optical axis O2; a second group lens 35, which is a zoom lens group held by a second group frame 38, which is a second holding frame (first movable holding frame) being movable back-and-forth and disposed below the shutter unit 48; further, a third group lens 36, which is a zoom and focus lens group held by a third group frame 39, which is a third holding frame (second movable holding frame) being movable back-and-forth; further, a fourth group lens 37 held by a lower opening 32b of the fixed frame 32; and the CCD 55, which is an image pickup element disposed at a focal position of a subject beam and mounted on a CCD substrate 56; which are arranged in that order. The members provided within the fixed frame 32 further include a suspension shaft 41 fixed and held to the fixed frame 32 at both ends of the suspension shaft 41 laterally extending along the second optical axis O2 (i.e., the Y-direction) and a whirl-stop shaft 42; a first stepping motor 53, which is a first lens drive-source constituting a motor unit for zooming and driving the second group frame 38 back-and-forth; a second stepping motor 54, which is a second lens drive-source constituting the motor unit for zoom and focus driving the third group frame 39 back-and-forth; and further, a compression spring 46 inserted between the second group frame 38 and the third group frame 39. On the back face of the fixed frame 32, a metallic fixed lid 89 is fixed. On the front face of the fixed frame 32, an FPC 86 is arranged, on which connection terminals for various drive sources and electrical connections such as sensors are mounted.

The first-group frame 31 has a contour composed of a rectangular parallelepiped shape part and a triangular prismatic shape part axially extending in the X-direction and having an inclined plane 31c shaped along the external shape of the prism 33, which is accommodated within a part of the rear portion of the first-group frame 31. The first-group frame 31 accommodates the prism, the first group lens, the ND filter unit, and the solenoid therein, and is fixed to the top of the fixed frame 32 by connecting between screw-insertion holes 31f and tapped holes 32f with screws.

The prism 33 is inserted into a front opening 31a of the first-group frame 31, and is fixed to the first-group frame 31. A subject beam entering along the optical axis O1 is bent at an angle of 90° and is reflected along the optical axis O2 (the Y-direction) toward a lower opening 31b by the prism 33.

The first group lens 34 is inserted into and held to the lower portion of the lower opening 31b of the first-group frame 31.

The ND filter unit 47 is assembled to a lower portion of the first-group frame 31, and includes an ND filter 67, which is a light-quantity adjustment member movable in a direction substantially perpendicular to an optical axial plane inclusive of the optical axis O1 and the optical axis O2. The structure thereof will be described in detail later.

The solenoid 51 for the ND filter and the solenoid 52 for the shutter are juxtaposed in a unitized state along the first optical axis O1 on the left of the prism 33 provided within the first group frame 31. Both output shafts 51a and 52a are arranged below the first group frame 31 so as to protrude in the optical axial O2 direction (FIG. 10). To the output shaft 51a of the solenoid 51 for the ND filter, a pinion 61 is fixed. On the other hand, to the output shaft 52a of the solenoid 52 for the shutter, a shutter drive arm 71, which is a drive-power transmitting member, is fixed. At the distal end of an arm of the shutter drive arm 71, a shaft 72 is fixed, which is made of a hollow shaft member having a length predetermined corresponding to a back-and-forth movement position of the second group lens. The pinion 61 and the shutter drive arm 71 are rotated respectively between two rotational positions of an open position and a close position by driving the solenoid in normal and reverse directions with the output shaft 51a or 52a being rotated. The operations of the ND filter unit and the shutter unit due to the pinion 61 and the shaft 72 will be described later.

The second group frame 38 includes an opening 38a formed at the top center, two guide holes 38c passing through the frame along the Y-direction, a whirl-stop notch 38g formed in the other side of the guide holes 38c, a notch 38d for inserting a lead screw, a lever-shaft hole 38e, four stepped pins 38b, and retainer projections 38f formed on both end faces thereof in the Z-direction (FIG. 12). The second group frame 38 is also provided with the shutter unit 48 arranged above the opening 38a and a sector drive lever 43 rotatably fitted into the lever-shaft hole 38e, in addition to the second group lens 35. The second group frame 38 is supported back-and-forth movably along the optical axis O2 by the suspension shaft 41 and the whirl-stop shaft 42 which are slidably fitting into the guide holes 38c and the notch 38g, respectively.

The shutter unit 48 includes first and second sectors 74 and 76, which are two masking members movable to open and close in a direction perpendicular to an optical axial plane inclusive of the optical axis O1 and the optical axis O2, and the structure thereof will be described in detail later.

The third group frame 39 includes two guide holes 39b passing through the frame along the Y-direction, a whirl-stop notch 39c facing the guide holes 39b, and a notch 39d for inserting a lead screw. In the central opening of the third group frame 39, the third group lens 36, which is a zoom and focus lens, is mounted.

A first stepping motor 53 is composed of a motor body, a rotor 53c having a lead screw shaft 81 fixed thereto, a coil unit 53b having a bearing 53a arranged at the distal end for supporting another shaft, and four connection terminals 53d (FIGS. 5 and 9).

The second stepping motor 54 is composed of a motor body, a rotor 54c having a lead screw shaft 83 fixed thereto, a coil unit 54b having a bearing 54a arranged at the distal end for supporting another shaft, and four connection terminals 54d (FIGS. 5 and 9).

The first and second stepping motors 53 and 54, as shown in FIGS. 5 and 9, are fixed to and supported inside a left wall 32k, which is a first external wall of the fixed frame 32, with a motor mounting plate 85 therebetween. That is, the first and second stepping motors 53 and 54 are disposed on the left of the second and third group frames 38 and 39 of the fixed frame 32 at upper and lower positions on a straight line region in parallel with the optical axis O2 below the solenoids 51 and 52, respectively. The first and second stepping motors 53 and 54 are attached at upper and lower ends of the motor mounting plate 85, respectively, in a state that the lead screw shafts extend in the opposite directions, and the rotor 53c/the coil unit 53b and the rotor 54c/the coil unit 54b are disposed along an optical axial plane inclusive of the optical axis O1 and the optical axis O2. The stepping motors are mounted by fixing the motor mounting plate 85 inside the left wall 32k with screws 49 after the positions are set with positioning pins 32p.

In the mounting state of the stepping motors mentioned above, the first stepping motor 53 is located at a lower position with the lead screw shaft 81 directed upward while the second stepping motor 54 is located at an upper position with the lead screw shaft 83 directed downward. The extremities of the lead screw shafts 81 and 83 are fitted into the bearings 54a and 53a of the stepping motors 54 and 53, respectively, and are rotatably supported thereto.

Hence, in the mounting state of the stepping motors mentioned above, the lead screw shafts 81 and 83 are arranged in parallel with an optical axial plane inclusive of the optical axis O1 and the optical axis O2 and also in parallel with the optical axis O2. The lead screw shafts 81 and 83 are juxtaposed in the optical axial direction O2. The solenoids 51 and 52 and the stepping motors 54 and 53 are arranged in regions on one straight line in parallel with the optical axis O2.

To the lead screw shaft 81, a second-group frame drive nut 82 is fitted and screwed while to the lead screw shaft 83, a third-group frame drive nut 84 is fitted and screwed. The lower surface of the screwed second-group frame drive nut 82 is abutted on the upper surface 38h (FIG. 12) of the notch 38d, which is astride inserted to the lead screw shaft 81, of the second group frame 38 by an urging force of the compression spring 46, and is urged upward. The upper surface of the screwed third-group frame drive nut 84 is abutted on the lower surface 39h of the notch 39d, which is astride inserted to the lead screw shaft 83, of the third group frame 39 by the urging force of the compression spring 46, and is urged downward.

In such a manner as described above, by movements of the drive nuts 82 and 84, the second and third group frames 38 and 39 are moved back-and-forth while respective screw backlashes between the drive nuts 82/84 and the lead screw shafts 81/83 are put to one direction of the threads.

Thus, when the lead screw shaft 81 is rotated by the stepping motor 53, the second group frame 38 is moved back-and-forth between the wide-angle position (reset position) shown in FIG. 5 and the telescopic position, along the optical axis O2 via the second-group frame drive nut 82. Similarly, when the lead screw shaft 83 is rotated by the stepping motor 54, the third group frame 39 is moved back-and-forth between the wide-angle position (reset position) shown in FIG. 5 and the telescopic position shown in FIG. 6, along the optical axis O2 via the second-group frame drive nut 82. During resetting processes of the stepping motors 53 and 54, when the second group frame 38 and the third group frame 39 are moved in the resetting direction so as to reach the respective reset positions, arrivals to the reset positions are detected by photo reflectors 58 and 59 (referred to as PRs below), which are detecting means as will be described later, respectively (FIGS. 7 and 15).

In such a manner, during zooming, the second group frame 38 holding the second group lens 35, which is a zoom lens, and the third group frame 39 holding the third group lens 36, which is for zooming and focusing, are driven by driving the stepping motors 53 and 54. At this time, since drive amounts of the second group frame 38 and the third group frame 39 are found from the number of drive steps of the stepping motors 53 and 54 based on the reset positions detected by the PRs 58 and 59 as the references, the variable magnification state of the optical system is calculated from the number of drive steps of the stepping motors 53 and 54.

Then, the focus driving is performed by driving the stepping motor 54 so as to displace the third group frame 39 in the optical axial direction O2.

The ND filter unit 47 is located between the lower surface of the first-group frame 31 and the upper surface of the fixed frame 32, and as shown in the exploded perspective view of FIG. 10, it is composed of an idle gear 62 engaged with the output pinion 61 of the solenoid 51 for the ND filter, an ND filter drive gear 63 engaged with the idle gear 62, a bottom board 64 attached to the first-group frame 31 for holding the gears, a filter drive arm 65 having pin holes 65a and 65b formed at both ends, an ND-filter guard sheet 66 having a central opening 66a, a pin hole 66b, and a hole 66c elongated in the X-direction, the ND filter 67 having a pin hole 67b and a hole 67c elongated in the X-direction, and a caulking pin 68.

The pin hole 65a at one end of the filter drive arm 65 is fitted to a drive pin 63a of the filter drive gear 63, and integrally supported by the filter drive gear 63. The caulking pin 68 is fixed to the pin hole 65b of the filter drive arm 65 by being caulked in a rotatably fitted state into the pin hole 67b of the ND filter 67 and the pin hole 66b of the ND-filter guard sheet 66. The elongated holes 66c and 67c of the ND-filter guard sheet 66 and the ND filter 67 are freely slidably fitted to the guide pin 31e of the first group frame 31, and are supported thereto. On the side of the opening 32a of the fixed frame 32 beneath the lower surface of the ND filter 67, a support sheet 78 having a central hole with an ND filter protection sheet 79 (FIGS. 3 and 4) is arranged. The ND filter 67 is arranged on a plane perpendicular to the optical axis O2 so as to be slidably movable in the X-direction along the plane.

During light-quantity adjustment operation by the ND filter unit 47 structured as described above, when the solenoid 51 for the ND filter is clockwise rotated viewed from the lower portion of FIG. 10, the filter drive arm 65 is clockwise rotated via the filter drive gear 63 viewed from the lower portion of FIG. 10 (approaching drive direction of the ND filter). Then, the ND-filter guard sheet 66 and the ND filter 67 integrally slide in the X(+) direction (i.e., an optical axial plane inclusive of the optical axis O1 and the optical axis O2, that is, a direction perpendicular to the Y-Z plane) so as to move to an approach position covering the opening 32a from a position that the ND filter 67 is slid out of the opening 32a of the fixed frame 32, so that subject light reduced in quantity enters the second group lens 35. Conversely, when the solenoid 51 for the ND filter is counterclockwise rotated viewed from the lower portion of FIG. 10, the ND-filter guard sheet 66 and the ND filter 67 integrally slide in the X(−) direction reversely to the above so as to move to a position that the ND filter 67 is slid out of the opening 32a of the fixed frame 32, so that subject light with entire incident quantity enters the second group lens 35.

The shutter unit 48, as shown in FIG. 12, is a unit mounted above the second group frame 38, and is composed of a shutter lid 73 including a central opening 73a, four support holes 73b, a circular-arc through cut 73c, and retainer holes 73d of both opposite bent-flaps; a first sector 74 including a straight-advance guide hole 74b elongated in the X-direction, an engagement hole 74c elongated in the Z-direction, and a shield portion; a first blade sheet 75 including an opening 75a defining a shutter-opening diameter, mounting elongated holes 75b, and a circular-arc through cut 75c; a second sector 76 including a straight-advance guide hole 76b elongated in the X-direction, an engagement hole 76c elongated in the Z-direction, and a shield portion; a second blade sheet 77 including an opening 77a with a diameter larger than that of the opening 75a, mounting elongated holes 77b, and a circular-arc through cut 77c; and a sector drive lever 43, which is a sector drive member, including a rotational shaft 43a arranged along the Y-direction, a driven elongated hole 43b, and sector drive pins 43c and 43d, which are two engagement shafts.

In the respective mounting elongated holes 75b and 77b, two being provided for each of the first and second blade sheets 74 and 75, one is fitted to the stepped pin 38b for positioning and the other is formed so as to have some backlash.

The rotational shaft 43a of the sector drive lever 43 is passed through the lever-shaft hole 38e of the second group frame 38, and a latch ring 45 is retained at the distal end of the shaft. In a state that the sector drive lever 43 is mounted on the second group frame 38 upwardly, the second blade sheet 77, the second sector 76, the first blade sheet 75, and the first sector 74 are inserted to the stepped pins 38b of the second group frame 38 in that order. At this time, one sector drive pin 43c of the sector drive lever 43 is inserted into the circular-arc through cuts 77c and 75c and the engagement elongated hole 74c in that order from the below while the other sector drive pin 43d is inserted into the engagement elongated hole 76c. Finally, the shutter lid 73 is covered from the above, and the retainer holes 73d are brought into engagement with the retainer projections 38f of the second group frame 38, so that the shutter unit 48 is assembled.

In this state, the sector drive pin 43c is inserted into the circular-arc through cut 73c. Since into the driven elongated hole 43b of the sector drive lever 43, a shaft 72 of the shutter drive arm 71, which will be described later, is slidably fitted, the sector drive lever 43 is rotated by the shutter drive arm 71, so that the sectors 74 and 76 of the shutter unit 48 are driven to slide.

The shaft 72 is fixed to the shutter drive arm 71 at a position spaced from the rotational shaft axis of the shutter drive arm 71 by a predetermined distance in a state extending in a direction parallel to the optical axis O2. The shaft 72 is set to have a length such that even when the second group frame 38 is moved back-and-forth in the optical axial direction O2 in the assembled state, the shaft 72 is always fitted into the driven elongated hole 43b of the sector drive lever 43 to have an engaged state.

As shown in FIG. 14A which is an enlarged sectional view of the shutter drive arm and the shaft, the shaft 72 is inserted into a shaft hole 71a at the distal end of the arm 71, and is bonded and fixed by injecting an adhesive into the insertion clearance. As shown in FIG. 14B, when the shutter drive arm 71 is bonded to the shaft 72, the shutter drive arm 71 is mounted on a holding frame 91a formed on a bonding jig 91 while the shaft 72 is fitted into a shaft holding hole 91b of the jig 91 as well as into the shaft hole 71a.

Between the shaft hole 71a and the shaft 72, there is a clearance adjustable in positional accuracy, and the shaft 72 is supported to the shutter drive arm 71 in a state that the shaft 72 is spaced from the shutter drive arm 71 by a predetermined distance in parallel therewith. In this supported state, an adhesive is injected into the shaft hole 71a so that the shaft 72 is bonded and fixed to the shutter drive arm 71. When the shutter drive arm 71 is assembled to the fixed frame 32, the shaft is spaced from the shutter drive arm 71 by a predetermined distance as well as supported in parallel with the optical axis O2.

The assembled shutter drive arm 71 is located being substantially flush with the second stepping motor 54 with respect to a plane perpendicular to the optical axis O2, while the second stepping motor 54 is arranged at a position keeping out of a swing trajectory of the shaft 72. Simultaneously, the swing trajectory of the shaft 72 is positioned on a region avoiding the position of the suspension shaft 41.

Open/close rotational positions of the shutter drive arm 71, as shown in FIG. 11 which is the drawing viewed in the direction indicated by arrow C in FIG. 5, are defined by restriction projections formed in an opening 32g of the fixed frame 32. That is, the shutter drive arm 71 is inserted into the opening 32g of the fixed frame 32 having two restriction projections 32i and 32h, and when the shutter drive arm 71 is rotated in an open direction (clockwise in FIG. 11), the distal end abuts the restriction projection 32i so that the open rotational position of the shutter drive arm 71 is defined. Also, when the shutter drive arm 71 is rotated in a close direction (counterclockwise in FIG. 11), the distal end abuts the restriction projection 32h so that the close rotational position of the shutter drive arm 71 is defined.

The shutter unit 48 is arranged along the upper surface of the second group frame 38, and moves back-and-forth in the optical axial direction O2 integrally with the second group frame 38. Thus, the first and second sectors 74 and 76 are always held along a plane perpendicular to the optical axis O2, and are moved to slide on the plane.

During the shutter open/close operation of the shutter unit 48 structured as described above, when the shutter unit 48 is put into the shutter open state shown in FIG. 13A from the shutter close state shown in FIG. 13B, if the output shaft 52a of the shutter solenoid 52 is counterclockwise (upward in FIG. 13B) driven, the sector drive lever 43 is clockwise rotated via the shaft 72 of the shutter drive arm 71. By the clockwise rotation of the sector drive lever 43, as shown in FIG. 13A, the first sector 74 and the second sector 76 are driven by the sector drive pins 43c and 43d so as to slide in the X(+) and X(−) directions, respectively (i.e., a direction perpendicular to an optical axial plane inclusive of the optical axis O1 and the optical axis O2), changing to a shutter open state (maximum aperture diameter) which opens the opening 75a of the blade sheet.

Also, when the shutter unit 48 is put into the shutter close state from the shutter open state shown in FIG. 13A, if the output shaft 52a of the shutter solenoid 52 is clockwise (upward in FIG. 13A) driven, the sector drive lever 43 is counterclockwise rotated via the shaft 72 of the shutter drive arm 71. By the counterclockwise rotation of the sector drive lever 43, as shown in FIG. 13B, the first sector 74 and the second sector 76 are driven by the sector drive pins 43c and 43d so as to slide in the X(−) and X(+) directions, respectively (i.e., a direction perpendicular to an optical axial plane inclusive of the optical axis O1 and the optical axis O2), changing to a shutter close state which closes the opening 75a of the blade sheet.

In the lens barrel 10, when component parts, such as lens groups and stepping motors, are assembled, through the opening 32g formed on the rear side of the fixed frame 32, the lens groups and the stepping motors are inserted and assembled. After the completion of the assembling, the opening 32g is covered with a fixed lid 89 made of a metallic plate, and screws, which are inserted into screw-insertion holes 89d and 89e, are mated with tapped holes 32d and 32e formed on the fixed frame so as to close the fixed frame 32 (FIG. 3).

The fixed frame 32 of the lens barrel 10, as shown in FIG. 15, is provided with a front wall 32j which is a second external wall arranged along a plane (the X-Y plane) perpendicular to the thickness direction of the rectangular parallelepiped of the fixed frame. The front wall 32j includes insertion holes 32r and 32s provided for inserting the PR 58 and the PR 59 for detecting reset positions of the second and third frames, respectively. The positions of the insertion holes 32r and 32s are to be positions facing surfaces to be detected when the second and third group frames 38 and 39 are located at reset positions on the movement trajectories.

As shown in FIG. 15, at lower and upper positions of a left wall 32k (on the right in FIG. 16), which is the first external wall being adjacent to the front wall 32j of the fixed frame 32 and arranged along the thickness direction of the rectangular parallelepiped, terminal insertion holes 32m and 32n are formed, respectively. Into the terminal insertion holes 32m and 32n, motor terminals 53d and 54d, four for each terminal, of the first stepping motor 53 and the second stepping motor 54 are inserted, and each part of the terminals is exposed outside the fixed frame. Furthermore, two lead wires 51b of the filter solenoid 51 and two lead wires 52b of the shutter solenoid 52, as shown in FIG. 15, are led out of the left side (the right in FIG. 16) of the first-group frame 31 toward an upper portion of the front wall 32j.

In an upper portion of the FPC 86, solenoid cable connection lands 86e for the ND filter and solenoid cable connection lands 86f for the shutter are provided. In a central portion thereof, the surface-mounting PRs 58 and 59 are mounted. Furthermore, two projections 86a and 86b of the connection FPC 86 are attached by bending surfaces of the front wall 32j toward the left wall 32k of the fixed frame 32. The projections 86a and 86b are provided with solenoid cable connection lands 86c for the first stepping motor and solenoid cable connection lands 86d for the second stepping motor, respectively.

When the connection FPC 86 is attached to the lens barrel 10, the connection FPC 86 is bonded on the surface of the front wall 32j of the fixed frame 32, and the mounted PRs 58 and 59 are inserted into the insertion holes 32r and 32s of the fixed frame 32, respectively. On the other hand, the projections 86a and 86b of the connection FPC 86 are attached to the surfaces of the front wall 32j of the fixed frame 32 and bent toward the left wall 32k, and the motor terminals 53d and 54d are soldered on the motor terminal connection lands 86c and 86d, respectively. Furthermore, the lead wires 51b and 52b of the solenoids 51 and 52 are soldered on the solenoid cable connection lands 86e and 86f of the connection FPC 86, respectively. The connection FPC 86 is led toward the electric substrate of the electrical substrate unit 5 for connection with connectors.

Next, the photographing operation by the electronic camera 1 according to the embodiment structured as described above will be described.

A line switch is turned on by a user operating the power supply button, and the memory card 120 is inserted into the card slot 21. Then, by operating a mode-setting button 27 (not shown), the photographing mode is selected and established with the CPU 170.

Subsequently, in the course of the photographing, images of a subject beam taken in via the prism 33 and the first to fourth group lenses 34 to 37 are converted into electrical image signals by the CCD 55 under the control of the CPU 170 so as to take in the built-in memory 130 as picture signals. The picture signals are displayed on the LCD display board 15 as subject images. When a user performs the first step of the release button 26 after establishing a subject to be shot and an angle of view with zooming operation or the like, the focusing of the third group lens 36 is driven on the basis of contrast information of the picture signals under the control of the CPU 170. The focusing drive and the zooming drive are executed by moving the second group frame 38 and the third group frame 39 to back-and-forth positions along the optical axis O2 with controlling the first and second stepping motors 53 and 54, respectively. On the other hand, based on the picture signals taken in, the photometry of subject light is performed. In the photometry data, if the subject brightness is higher than a predetermined value, the ND filter solenoid 51 is driven so that the ND filter 67 moves to a position covering the opening 32a of the fixed frame.

Consequently, by pushing the second step of the release button 26, a shooting start signal is taken in, and after a lapse of shutter released time based on the photometry data, by driving the shutter solenoid 52, the first and second sectors 74 and 76 are moved to the close positions so as to put the shutter in the close state.

During the shutter opening, the subject beam, taken via the prism 33 therein, passes through the taking lens system, and an image is formed by the beam on an image pickup plane of the CCD 55 so as to have exposure. Under the control of the CPU 170, an image pickup signal within exposure time is produced from the CCD 55, and converted into a picture signal. The picture signal is once stored in the built-in memory 130, and then is recorded in the memory card 120 after a predetermined processing performed by the image processing circuit 140, the shooting completes.

As described above, according to the lens barrel 10 housed in the camera according to the first embodiment, when the light quantity is adjusted at first, the ND filter 67 of the ND filter unit is moved to slide in substantially the X-direction (that is, a direction perpendicular to an optical axial plane inclusive of the optical axis O1 and the optical axis O2), so that the thickness of the lens barrel 10 in the optical axial direction O1 (the Z-direction) can be reduced.

Similarly, the sectors 74 and 76 of the shutter unit can also open and close the shutter by sliding in substantially the X-direction so as to reduce the thickness of the lens barrel 10 in the optical axial direction O1 (the Z-direction).

Also, the ND filter unit 47 and the shutter unit 48 are placed on different plane regions in the optical axial direction O2. That is, the ND filter unit 47 is placed in a lower portion of the first group frame 31 while the shutter unit 48 is arranged on the upper surface of the second group frame 38 located below the ND filter unit 47 movably to back-and-forth. Hence, the arrangement of the lens barrel in the optical axial direction O2 is simplified, so that the height of the lens barrel 10 in the Y-direction can be reduced.

The solenoid 51 for driving the ND filter arranged on the left of the prism 33 of the first group frame 31 and the solenoid 52 for driving the sector are arranged along the optical axis O1 in parallel with each other. Furthermore, below the solenoids and on the left of the optical axis O2 of the fixed frame 32, the first and second stepping motors 53 and 54 are arranged for driving the second and third group frames back-and-forth. That is, on a straight line region that is located on one side of the positions of the shutter unit 48 and the second and third group frames 38 and 39 and also on the left of the optical axis O2 in parallel therewith, the solenoids 51 and 52 and the stepping motors 53 and 54 are arranged, so that a dead space is extremely reduced in the lens barrel 10. Furthermore, since the bearings and the rotors of the stepping motors 53 and 54 are juxtaposed in the optical axial direction O1 while being displaced from each other in the optical axial direction O2, the lead screw shafts 81 and 83, which are the output shafts of the stepping motors, can be efficiently arranged in parallel with the optical axis O2. Thus, entire the lens barrel 10 is compactly combined, achieving the miniaturization.

Also, since the shaft 72 fixed to the swinging end of the shutter drive arm 71 moves within a rotational region avoiding the suspension shaft 41 while the second stepping motor is located outside the rotational region of the shaft, the lens barrel 10 can also be compactly combined from this point.

Also, the shaft 72 fixed to the swinging end of the shutter drive arm 71 has a comparatively long length extending in the optical axial direction O2, and it is made of a hollow shaft. Hence, an inertial moment of the shutter drive arm 71 about a rotational shaft is not excessive, enabling the first and second sectors 74 and 76 to be driven at a high speed via the shaft 72 for the high speed shutter opening and closing.

According to the lens barrel 10 housed in the camera according to the embodiment, the motor unit composed of the first and second stepping motors 53 and 54 are fixedly arranged along the left wall 32k of the fixed frame 32 while the PRs 58 and 59 for detecting positions of the second and third group frames 38 and 39 are arranged on the front wall 32j of the fixed frame 32, so that the thickness of the lens barrel can be effectively reduced.

Since the terminals of the motor unit are arranged outside the left wall 32k of the fixed frame 32 while there is provided the opening formed on the front wall 32j adjacent to the left wall 32k for inserting the PRs 58 and 59 for detecting positions, the connection FPC 86 can be reduced in size. Also, since the connection FPC 86 is arranged outside the fixed frame 32, the connection FPC 86 cannot move within the lens barrel, so that the operation of the lens barrel is not disturbed and the miniaturization of the lens barrel is achieved.

Moreover, regarding the shutter unit 48, since the shutter solenoid 52, which is the drive source thereof, is placed in the fixed first-group frame 31, any movable FPC does not exist in the lens barrel, so that the operation of the lens barrel is not disturbed and the miniaturization of the lens barrel is also achieved from this point.

Figure 17:
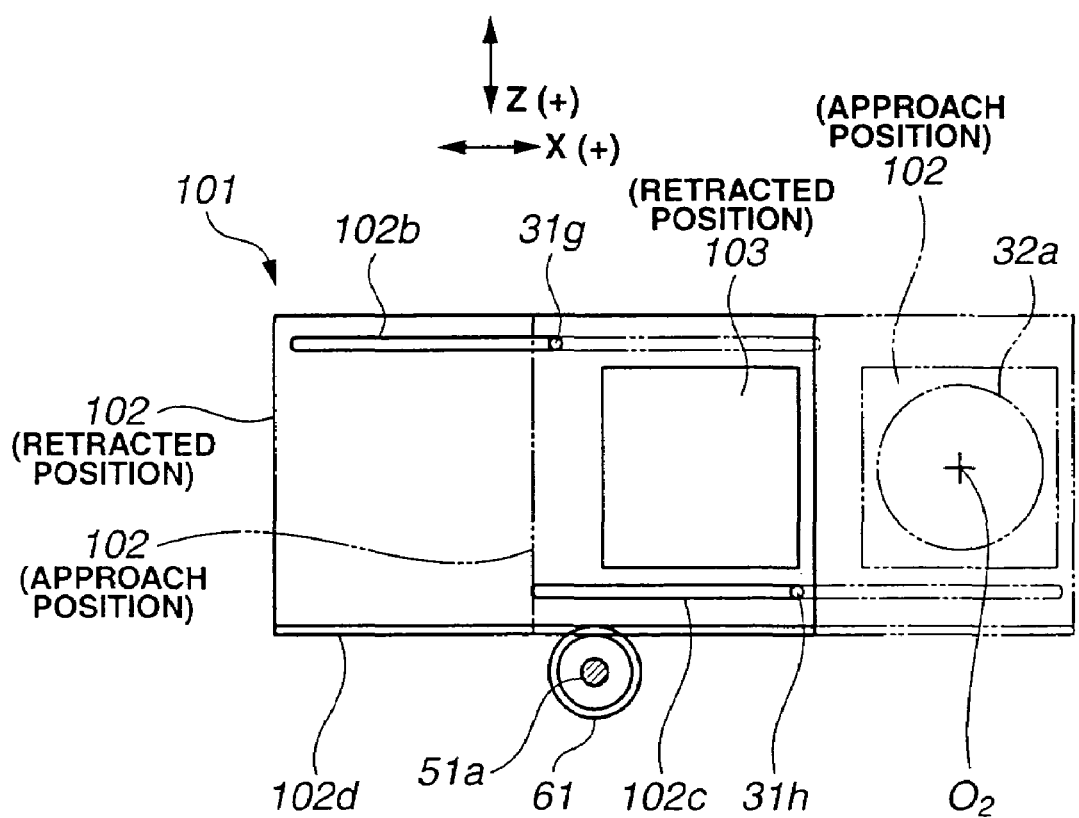
FIG. 17 is a plan view of a modification of an ND filter unit incorporated in the lens barrel shown in FIG. 3.

A modification of the ND filter unit 47 incorporating the lens barrel 10 will now be described with reference to FIG. 17 which is a plan view to the modification of the ND filter unit. A modified ND filter unit 101 is composed of a slidable ND filter frame 102 and an ND filter 103 held to the ND filter frame 102.

The ND filter frame 102 has a shape longitudinal in the X-direction, and on the right thereof, the ND filter 103 is held. Furthermore, the ND filter frame 102 is provided with straight guide grooves 102b and 102c, which are extending in the Z-direction along both sides of the ND filter frame 102 sandwiching the ND filter 103 and being displaced from each other in the Z-direction, and with a rack 102d arranged along one end face of the frame in the Z-direction.

Into the guide grooves 102b and 102c, guide pins 31g and 31h are freely slidably inserted, respectively, the guide pins 31g and 31h being arranged at positions adjacent to the first-group frame 31, spaced from each other in the Z-direction, and displaced from each other in the X-direction. The rack 102d is mated with the output pinion 61 of the ND filter solenoid 51.

In the ND filter unit 101, when the output pinion 61 of the ND filter solenoid 51 is rotated in a filter approaching direction, the ND filter frame 102 slides in the X(+) direction (i.e., a direction perpendicular to an optical axial plane inclusive of the optical axis O1 and the optical axis O2) so that the ND filter 103 is moved at an approaching position covering the opening 32a of the fixed frame. Conversely, when the output pinion 61 is rotated in a filter retracting direction, the ND filter frame 102 slides in the X(-) direction so that the ND filter 103 is moved to a position slid out of the opening 32a of the fixed frame.

When the above modified ND filter unit 101 is incorporated, the number of component elements including the drive units is reduced and the occupied space is reduced as well, so that an inexpensive lens barrel capable of being compactly combined is provided.

In addition, two modifications of the shutter drive arm 71 applied to the lens barrel 10 will be described using FIGS. 18A and 18B which are longitudinal sectional views of respective shutter drive arms.

Figure 18A:
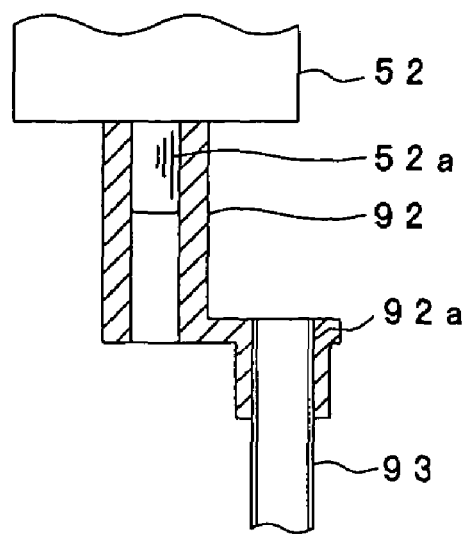
FIG. 18A is a longitudinal sectional view of one modification of the shutter drive arm incorporated in the lens barrel shown in FIG. 3.

In a shutter drive arm 92, which is one of the modifications, as shown in FIG. 18A, a shaft fitting hole 92a provided at the arm distal end of the shutter drive arm 92 is set comparatively long in length. Into the shaft fitting hole 92a, a hollow shaft 93 is fitted and fixed by bonding.

According to this modification, since the shaft 93 is firmly held by the shaft fitting hole 92a with a long fitting length, and also the parallel between the shaft 93 and the solenoid output shaft 52a fitting to the shutter drive arm 92 can be maintained in high accuracy, the driving of the shutter unit 48 can be securely performed in high accuracy.

Figure 18B:
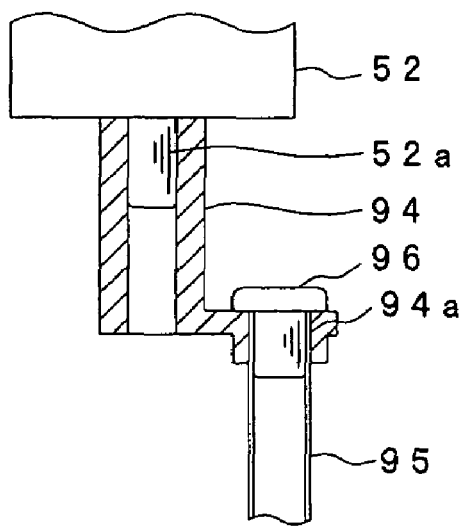
FIG. 18B is a longitudinal sectional view of another modification of the shutter drive arm incorporated in the lens barrel shown in FIG. 3.

In a shutter drive arm 94, which is the other one of the modifications, as shown in FIG. 18B, into a shaft fitting hole 94a at the arm distal end of the shutter drive arm 94, a hollow shaft 95 is fitted, and, further, into the internal surface of the hollow shaft 95, a shaft slant-prevention pin 96 is press-fitted from the solenoid or fixed by bonding.

According to the modified shutter drive arm 94, since the shaft 93 is firmly held by the shutter drive arm 94, the driving of the shutter unit 48 can be securely performed.

As described above, in the lens barrel according to the first embodiment or the modified embodiments, by adopting a structure that the light-quantity adjusting member is moved in a direction substantially perpendicular to an optical axial plane inclusive of the first optical axis and the second optical axis, the lens barrel can be reduced in size and thickness. Also, on an optical axial plane perpendicular to the second optical axis, the shutter means is provided for opening and closing the exposure opening while the shielding member is moved in a direction substantially perpendicular to an optical axial plane inclusive of the first optical axis and the second optical axis, so that the lens barrel can be reduced in size and thickness. Furthermore, a plurality of actuators composed of shutter drive sources and lens drive sources are arranged substantially in parallel with the second optical axis and also in one side of the shutter means, so that the lens barrel can be further reduced in size and thickness. Moreover, by adopting a structure that the ND filter is moved in a direction substantially perpendicular to an optical axial plane inclusive of the first optical axis and the second optical axis, the lens barrel can be reduced in size and thickness. Furthermore, the ND filter and the shutter means are located at positions different from each other along the second optical axis, so that the lens barrel can be further reduced in size and thickness.

Also, in the lens barrel according to the first embodiment or the modifications, the lens barrel having a variable magnification optical system is constituted such that movable lens groups are arranged along the second optical axis, the shutter means is provided on a plane perpendicular to the second optical axis for opening and closing the exposure opening, and further, the shielding member of the shutter means is moved in a direction substantially perpendicular to an optical axial plane inclusive of the first optical axis and the second optical axis. Thus, the thickness of the lens barrel can be reduced. Furthermore, by adopting a structure that the ND filter is moved in a direction substantially perpendicular to an optical axial plane inclusive of the first optical axis and the second optical axis, the thickness of the lens barrel can be further reduced. Moreover, the shutter drive source and the filter drive source are juxtaposed in the first optical axial direction while the drive sources for the first and second lenses are arranged in parallel with the first optical axis and also are substantially linearly displaced from each other in the second optical axial direction, so that the lens barrel can be further reduced in size and thickness.

Furthermore, in the lens barrel according to the first embodiment or the modified embodiments described above, an inertial moment of the power transmission member is not excessive so that the sectors can be driven at a high speed via the shaft for high speed operation of the shutter. Also, the lens drive source is arranged below the sector drive source while two lead screws provided in the lens drive source are arranged in parallel with each other, so that the lens barrel can be compactly combined, achieving the miniaturization. The shaft of the power transmission member is spaced from the swinging center and extended in parallel with the second optical axis, so that even the displacement of the second holding frame is large, the shutter unit, the shutter drive source, and the second holding frame can be arranged efficiently in space. Moreover, an inertial moment of the power transmission member is not excessive so that the sectors can be driven at a high speed via the shaft for high speed operation of the shutter.

In the lens barrel according to the first embodiment, the motor unit is fixed along the first external wall of the frame member; and further, the detecting means is attached to the second external wall adjacent to the first external wall, so that the thickness of the lens barrel can be reduced. The motor itself is arranged in the frame member, so that the failure possibility thereof is low. Since on the first and second external walls adjacent to the frame member, the terminals of the motor unit and the detecting means are located, the FPC can be reduced in size. Since the FPC is arranged outside the frame member, the operation of the lens barrel is not disturbed thereby and the miniaturization of the lens barrel is also achieved. Furthermore, since on the fixed first holding frame, the shutter drive source is arranged, the FPC for the shutter drive source cannot be moved within the lens barrel, so that the operation of the lens barrel is not disturbed thereby. Since the shutter drive source is also arranged at a position adjacent to the motor unit, the thickness of the lens barrel can be reduced. Also, by attaching the motor unit on the first external wall, which is an external wall of the frame member in the thickness direction of the rectangular parallelepiped shape, the thickness of the lens barrel can be reduced. By attaching the motor unit on the first external wall, which is an external wall of the frame member in the thickness direction of the rectangular parallelepiped shape, and further attaching the detecting means on the second external wall adjacent to the first external wall, the thickness of the lens barrel can be reduced. Moreover, on the first and second external walls, the connection surface of the detecting means is arranged, so that the FPC can be compactly combined. Since to the shutter drive source fixed to the first holding frame, the FPC is connected, the FPC cannot move within the lens barrel, so that the operation of the lens barrel is not disturbed thereby. Also, the occupied space of the shaft of the motor unit is reduced, enabling the lens barrel to be miniaturized.

Next, an electronic camera (camera) according to a second embodiment of the present invention will be described.

Figure 19:
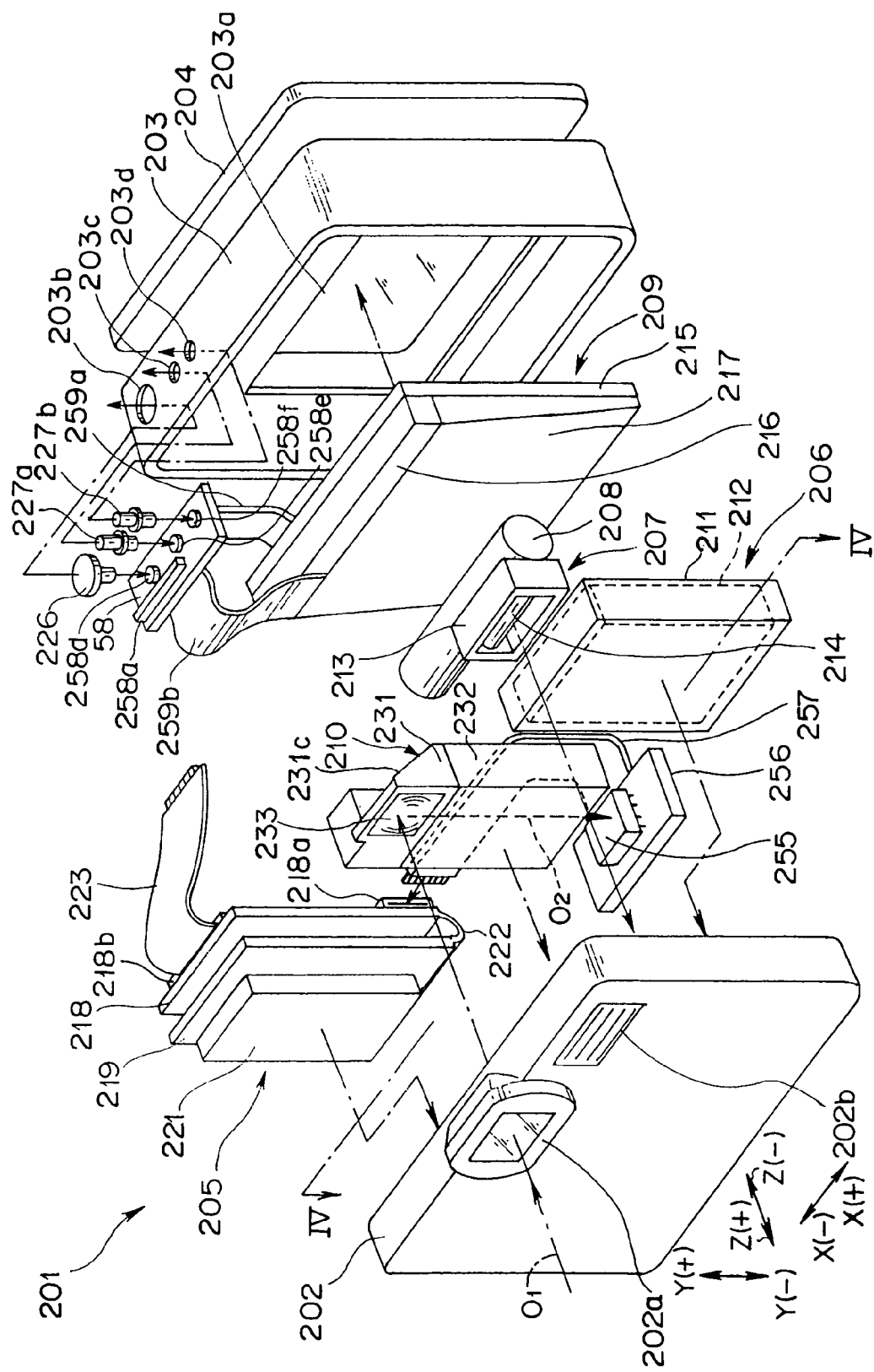
FIG. 19 is an exploded perspective view of an electronic camera according to a second embodiment of the present invention.

FIG. 19 is an exploded perspective view of the electronic camera according to the second embodiment.

As shown in FIG. 19, an electronic camera 201 according to the embodiment is a so-called digital camera, and is composed of front and rear covers 202 and 203 as external members, a lens barrel 210 accommodated in the front and rear covers 202 and 203 as a component unit, an electric substrate unit 205, a power supply unit 206, a stroboscopic unit 207, a stroboscope-charging capacitor 208, an LCD unit 209 as a display unit, and a switch substrate 258.

The front cover 202 is provided with a shooting window 202a slightly upwardly protruded from the front surface for taking in a subject beam and a stroboscopic emitting window 202b arranged thereon.

The rear cover 203 is provided with a two-step release button 226, a power switch button 227a, and a mode setting button 227b respectively inserted into button openings 203b, 203c, and 203d on the upper surface as operation members operated by a user. On the back surface of the rear cover 203, an LCD opening window 203a is provided. On the back side of the LCD opening window 203a, a transparent plate 204 is bonded as a transparent member so as to form the LCD window.

The lens barrel 210 arranged in the front cover 202 has a substantially rectangular parallelepiped contour of which front surface is arranged along the X-Y plane, a longitudinal axis is aligned along the Y-direction, and a thickness in the Z-direction is comparatively thin, when the lens barrel 10 is mounted on the camera. The lens barrel 210 includes a first holding member 231 as a frame member having an inclined surface 231c (FIG. 21) formed in an upper portion for accommodating a prism 233 which is a reflection optical member forming a bending optical system for taking in a subject beam proceeding along the first optical axis O1 (Z-direction) therein and a fixed frame 232 as a frame member fixed to the first holding member 231 for accommodating a taking lens system.

In the lens barrel 210, the taken subject beam in the first optical axial direction O1 is reflected by the prism 233 to the second optical axial direction O2, and an image by the beam is formed on an image pickup plane of a CCD 255, which is an image pickup element, via a taking lens system (will be described later), so as to be converted to an image signal of a subject image. The detail of this will be described later.

The CCD 255 is mounted on a CCD substrate 256, which is an image pickup element electric substrate arranged in a lower portion of the fixed frame 232. To the CCD substrate 256, a CCD-connection FPC 257, which is a flexible printed circuit for connecting image pickup elements (referred to as an FPC below), is connected. The CCD-connection FPC 257 is connected to a control main printed circuit board 218 which will be described later.

The electric substrate unit 205 includes the main printed circuit board 218 and a sub-printed circuit board 219, which are two control electric substrates for mounting control elements of an electric circuit of the electronic camera which will be described later. The main printed circuit board 218 and the sub-printed circuit board 219 are connected together with a flexible printed circuit (referred to as an FPC below) 222 and are accommodated in the front cover 202 in a two-ply state.

On the main printed circuit board 218, a connector 218a, to which the CCD-connection FPC 257 is connected in addition to electric components for a control circuit (will be described later), and a connector 218b, to which a switch-substrate connection FPC 223 is connected, are mounted.

On the outside of the sub-printed circuit board 219, a recording media slot 221 is mounted. The recording media slot 221 is connected to the main printed circuit board 218 via the connection FPC 222.

The power supply unit 206 is composed of a battery case 211 and a camera power-supply battery 212 accommodated in the battery case 211, and has a rectangular parallelepiped contour with a plane extending on the X-Y plane and a comparatively thin thickness in the Z-direction.

The stroboscopic unit 207 is composed of a stroboscope body 213 and a stroboscopic emission tube 214 supported inside a reflector of the stroboscope body 213.

The LCD unit 209 includes an LCD display board 215, which is a liquid crystal display board having a display plane arranged along the X-Y plane, an illumination light source 216 arranged at an upper position of the LCD display board 215 and extending in the X-direction, and a light-guide plate 217 disposed under the illumination light source 216 and substantially covering a non-display plane of the LCD display board 215.

The illumination light source 216 is composed of a fluorescent electroluminescence tube or an LED chip, and includes a connection FPC 259b to be connected to the switch substrate 258 with a connector.

The light-guide plate 217 is a member with uneven thicknesses in the Y-direction, wherein an upper portion adjacent to the illumination light source 216 is thick while a lower portion is thinner.

The LCD display board 215 is provided with a connection FPC 259a connected to the switch substrate 258 with a connector.

Figure 27:
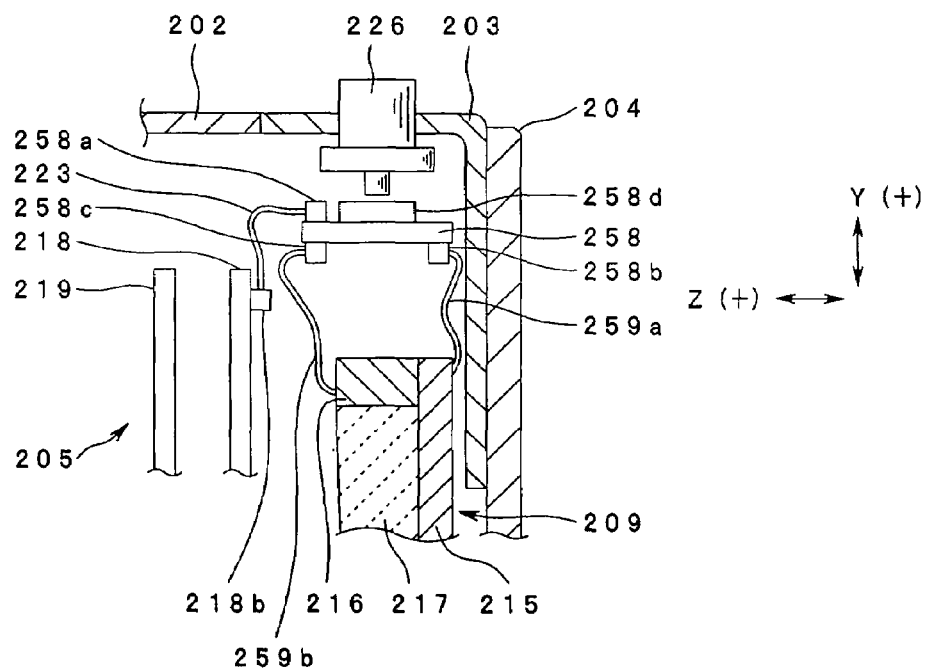
FIG. 27 is an enlarged view of F portion of FIG. 24.

The switch substrate 258 is provided with plural switching means mounted thereon that are a release switch 258d on/off operated by the release button 226, a power switch 258e on/off operated by the power switch button 227a, and a mode-setting switch 258f on/off operated by the mode-setting button 227b. Furthermore, on the switch substrate 258, a connector 258b to be connected by a connection FPC 259a adjacent to the LCD display board 215 and a connector 258c to be connected by a connection FPC 259b adjacent to the illumination light source 216 are mounted in addition to a connector 258a to be connected by a connection FPC 223. This switch substrate 258 also serves as a relay substrate connecting to the main printed circuit board of the LCD unit 209 as will be described later (FIG. 27).

In a state that these component units are respectively accommodated in the front and rear covers 202 and 203, there are provided the lens barrel 210 at the inner center of the front cover 202, the power supply unit 206 on the right and adjacent to the lens barrel 210, and the electric substrate unit 205 on the left and adjacent to the lens barrel 210. Furthermore, the stroboscopic unit 207 is fixed on the power supply unit 206, and the stroboscope-charging capacitor 208 is fixed in a state of approaching the rear of the upper inclined surface 231c of the lens barrel 210 from the rear of the stroboscopic unit of the stroboscopic unit 207.

On the other hand, the LCD unit 209 is fixed inside the rear cover 203 in a state that the display surface of the LCD display board 215 faces the opening 203a. Simultaneously, the switch substrate 258 is fixed at a position inside the rear cover 203 on the upper left of the LCD unit 209 and in the upper rear of the electric substrate unit 205 as well.

The front cover 202, having the lens barrel 210, the electric substrate unit 205, and the power supply unit 206 accommodated therein, is combined with the rear cover 203, having the LCD unit 209 and the switch substrate 258 fixed thereto; the connection FPC 223 is connected to the connector 258a on the switch substrate 258; and further these units are connected together with screws, so that the entire components are integrated electrically and as well as mechanically so as to complete the electronic camera 201.

In the assembling state mentioned above, an incident opening of the prism 233 in the lens barrel 210 is arranged to face the shooting window 202a of the front cover 202 while the emission unit of the stroboscopic unit 207 is positioned to face the rear of a stroboscopic emission window 202b. Moreover, the LCD display board 215 of the LCD unit 209 is located to face the LCD opening window 203a of the rear cover 203.

The assembling state in the front and rear covers will be described later more in detail with reference to FIG. 23.

An electric circuit of the electronic camera 201 according to the embodiment will now be described with reference to the block diagram of FIG. 20. The configuration of the electric circuit of the electronic camera 201 according to the embodiment is similar to that of the electronic camera 101 according to the first embodiment, so that same reference characters will be used to designate same components common thereto.

In the electronic camera 201 according to the embodiment, the CPU 170 is housed therein as controlling means, and the entire control elements of the electronic camera 201 are controlled by the CPU 170. First, a subject image passing through the photographing optical system 111 is converted into an electric signal at the CCD 255, which is an image pickup element, under the control of the CPU 170. The electric signal converted by the CCD 255 is converted into a digital image signal by the A/D conversion circuit 114 after being converted into an analogue image signal by the image pickup circuit 113. The photographing optical system 111 includes the prism, first to fourth group lenses, the ND filter, and the shutter of the lens barrel 210, which will be described later.

Then, this digital image signal is recorded in the recording media card (memory card) 120 as a recording medium such as a flash memory card and a smart memory card being detachably attached as an external memory via the interface (I/F) 121. The recording media card 120 is detachably attached to the media slot 221.

The electric circuit of the electronic camera 201 is provided with the built-in memory 130 with a high processing speed and the image processing circuit 140. The built-in memory 130 is incorporated in a random access memory (RAM), for example, and used in an operation memory in each image processing or in a high-speed buffer of temporary image storing means. The image processing circuit 140 executes the conversion to RGB signals, the conversion of the number of pixels, and compression/decompression of data, based on the image data digitized by the A/D conversion circuit 114.

Furthermore, the aforementioned LCD display board 215 for displaying images (liquid crystal display) is mounted on the electronic camera 201, and on the LCD display board 215, confirmation of images stored in the memory card 120 and subject images to be pictured are displayed. The images displayed on the LCD display board 215 are images of the image information from the built-in memory 130, which are displayed by converting them into video images in the video output circuit 152 after the images of image information are once entered in the video memory 151. The video output circuit 152 also can produce video images on an external display via the video-output external terminal 153.

The CPU 170 captures a pick-up start signal of the release switch 258d due to operation of the release button 226, performs picking up of an image by the CCD 255, and establishes a photographing mode by operating the mode setting button 227b so as to grab setting signals of various modes of the mode setting switch 258f of the operation unit 173. This established mode is displayed on the LCD 172. On the basis of the control by the CPU 170, in the case of insufficient quantity of light during picking up an image of a subject, the stroboscopic emission tube 214 of the stroboscope unit 207 is turned on so as to shoot the subject with the stroboscope.

Moreover, to the CPU 170, first and second stepping motors 253 and 254, which are drive sources for focus-driving and zoom-driving the photographing optical system, are connected with the driver 171 therebetween, so that lenses are driven by these motors.

Also, to the CPU 170, an ND filter solenoid 251 for driving an ND filter unit 247, and a shutter solenoid 252 for driving a shutter unit 248, which are subject light-quantity adjustment devices are connected with the driver 171 therebetween, so that the light-quantity adjustment is executed with the solenoids.

To the CPU 170, photo reflectors (referred to as PRs below) 286 and 287, which are detecting units for detecting a reset position in the back-and-forth movement of the photographing optical system, are also connected, so that the reset position of the photographing optical system 111 is detected during reset driving.

The external interface (external I/F) 161 is connected to the external input-output terminal 160 so as to perform data I/O operations to and from an external instrument. To the external input-output terminal 160, a personal computer is connected, for example, so as to transfer images stored in the memory card 120 to the personal computer. Alternatively, image data are entered therein from the personal computer.

To control elements of the electronic camera 201, electric power is supplied from the battery 212 of the power supply unit 206 via the power supply 180 for driving the elements. The battery 212 is chargeable under the control of the power supply 180.

Figure 20:
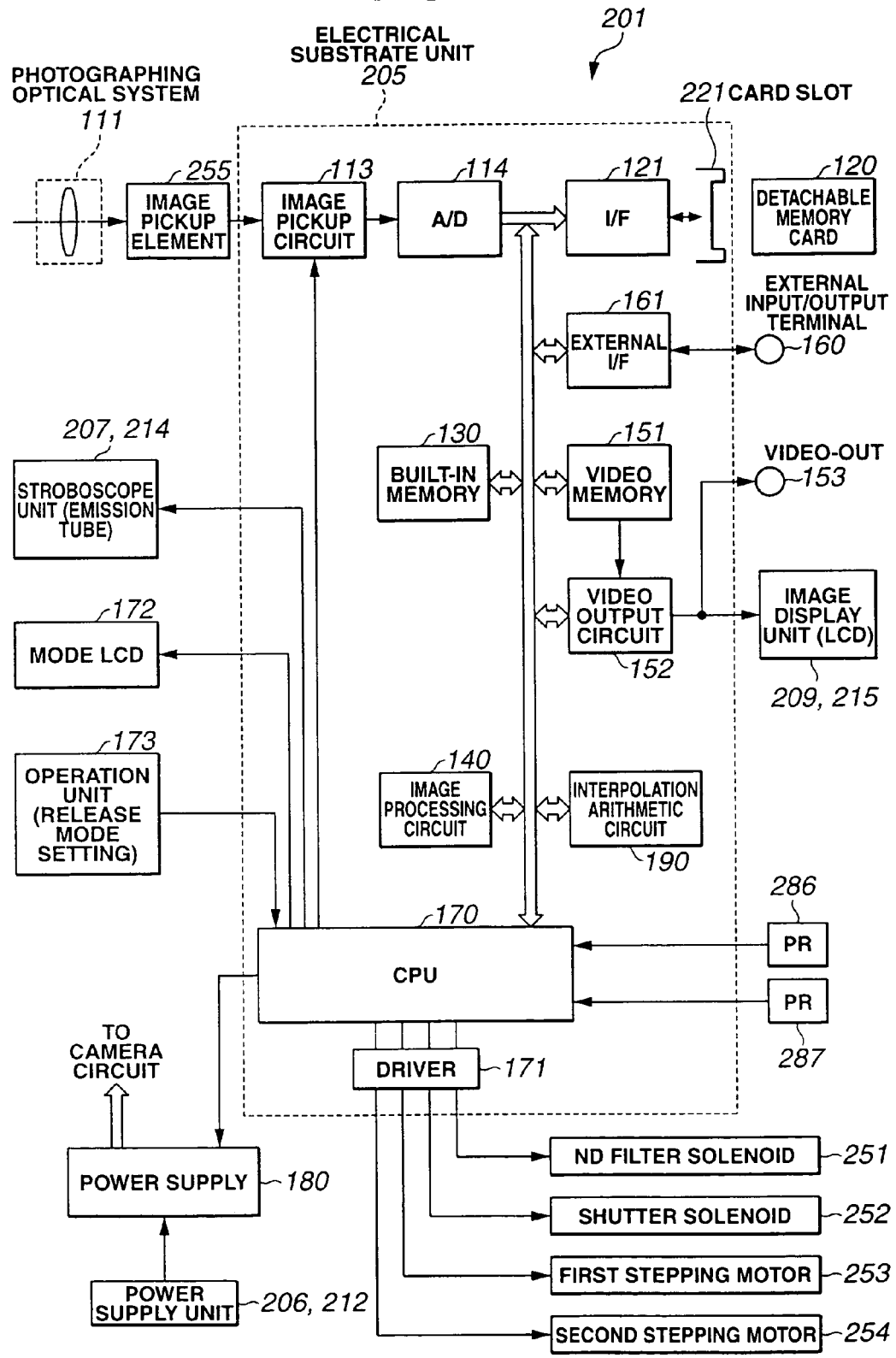
FIG. 20 is a block diagram of an electric circuit of the electronic camera shown in FIG. 19.

In addition, principal electrical components of the electric substrate unit 205 indicated within the closing dotted line in the block diagram of FIG. 20 are to be mounted on the main printed circuit board 218 and the sub-printed circuit board 219 of the electric substrate unit 205.

Next, the structure of the lens barrel 210 will be described with reference to FIG. 21, which is an exploded perspective view of the lens barrel, FIG. 22, which is a sectional view along the X-Y plane of the lens barrel, and FIG. 25, which is a sectional view at the line VI-VI of FIG. 23 which will be described later.

Figure 21:
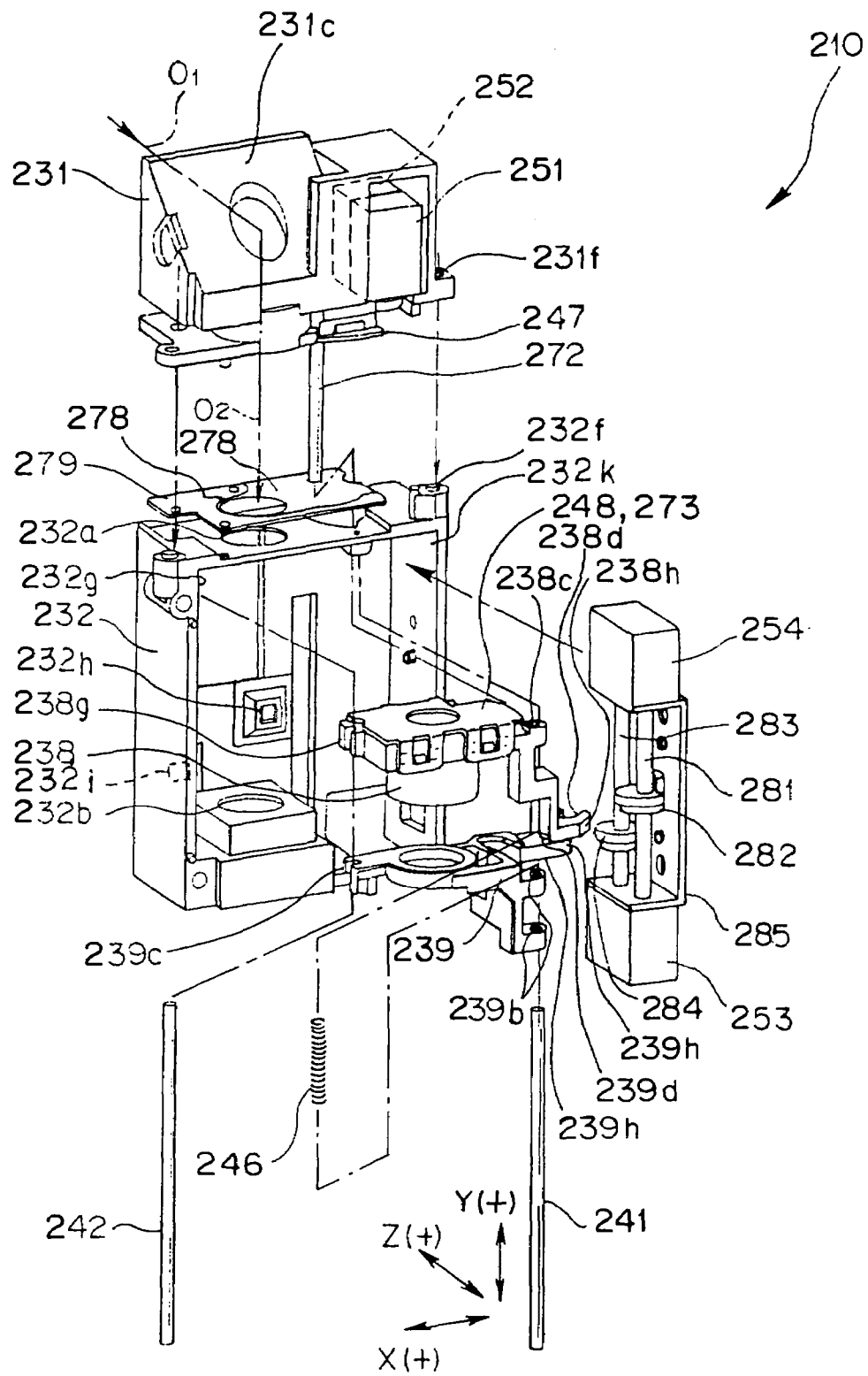
FIG. 21 is an exploded perspective view of the lens barrel of the electronic camera shown in FIG. 19 viewed from the rear.
Figure 22:
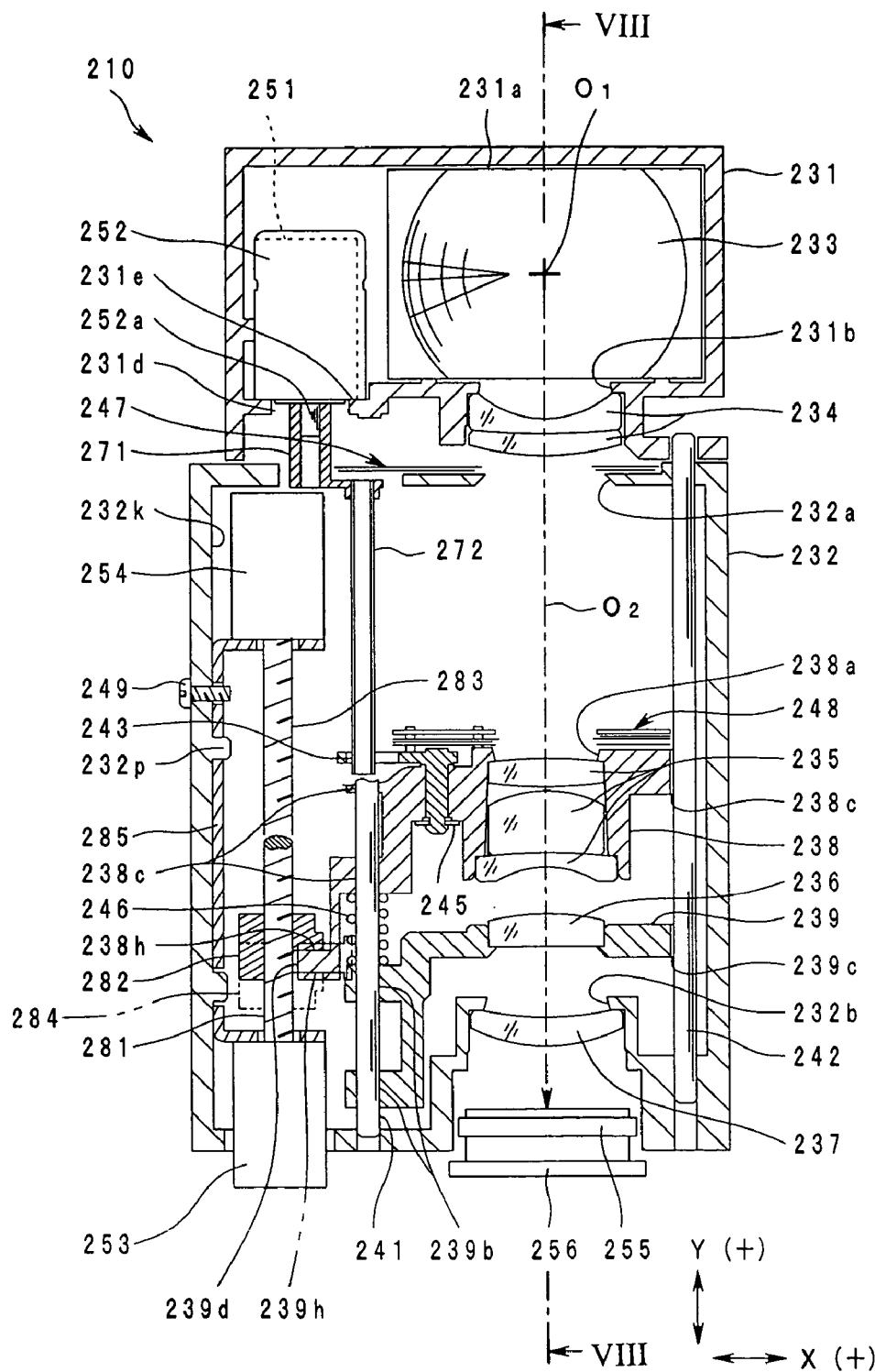
FIG. 22 is a longitudinal sectional view of the lens barrel of the electronic camera shown in FIG. 19.
Figure 25:
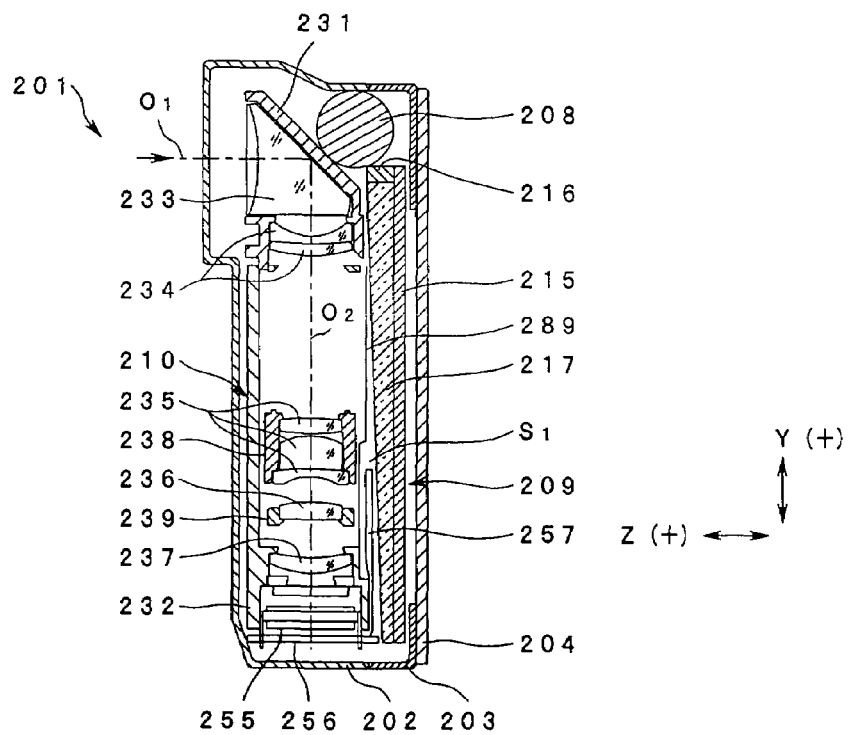
FIG. 25 is a sectional view at the line VI-VI of FIG. 23, in which the lens barrel is shown with a section at the line VIII-VIII of FIG. 22.

The lens barrel 210, as shown in FIGS. 21, 22, and 25, includes a first group frame 231 as a first holding frame and a fixed frame 232 as a frame member. The first group frame 231 is provided with a prism 233 as a reflection optical member, a first group lens 234, an ND filter unit 247 as light-quantity adjusting means, an ND filter rotary solenoid (referred to as a solenoid below) 251 as a filter drive source, and a shutter solenoid 252 as a shutter drive source (sector drive source), which are housed therein.

Components provided within the fixed frame 232 include a support sheet 278 having a central hole 278a with an ND filter protection sheet 279 arranged adjacent to an opening 232a of the fixed frame 232 so as to face the ND filter 247; a shutter unit 248, which is light-quantity adjusting means (shutter means) provided along the optical axis O2; a second group lens 235, which is a zoom lens group held by a second group frame 238, which is a second holding frame (first movable holding frame) being movable back-and-forth and disposed below the shutter unit 248; further, a third group lens 236, which is a zoom and focus lens group held by a third group frame 239, which is a third holding frame (second movable holding frame) being movable back-and-forth; further, a fourth group lens 237 held by a lower opening 232b of the fixed frame 232; and the CCD 255, which is an image pickup element disposed at a focal position of a subject beam and mounted on a CCD substrate 256; which are arranged in that order. In addition, as shown in FIG. 25, the CCD 255 and the CCD substrate 256 disposed in a lower portion of the lens barrel 210 are arranged in a state that planar portions thereof slightly protrude in the rear of the fixed frame 232 (in the Z(−) direction) along a direction orthogonal to the second optical axis O2.

The members provided within the fixed frame 232 further include a suspension shaft 241 fixed to the fixed frame 232 at both ends of the suspension shaft 241 laterally extending along the second optical axis O2 (i.e., the Y-direction) and a whirl-stop shaft 242; a first stepping motor 253, which is a first lens drive-source constituting a motor unit for zoom driving the second group frame 238 back-and-forth; a second stepping motor 254, which is a second lens drive-source constituting the motor unit for zoom and focus driving the third group frame 239 back-and-forth; and further, a compression spring 246 inserted between the second group frame 238 and the third group frame 239. On the back face of the fixed frame 232, an opening 232g is formed for assembling parts. The opening 232g is covered with a metallic fixed lid 289 (FIG. 25). On the front face of the fixed frame 232, an FPC (not shown) is arranged, on which the RPs 286 and 287 are mounted for respectively inserting into sensor openings 232h and 232i.

The first holding frame 231 has a contour composed of a rectangular parallelepiped shape part at the left side and a triangular shape part at the right side. The triangular shape part extends in the X-direction and having an inclined plane 231c shaped along the external shape of the prism 233, which is accommodated within part of the rear portion of the first holding frame 231. The first holding frame 231 accommodates the prism 233, the first group lens 234, the ND filter unit 247, and the solenoids 251 and 252 therein, and is fixed to the top of the fixed frame 232 by connecting between screw-insertion holes 231f and tapped holes 232f with screws.

The prism 233 is inserted into a front opening of the first-group frame 231, and is fixed thereto. A subject beam entering along the optical axis O1 is bent at an angle of 90° and is reflected along the second optical axis O2 (the Y-direction) toward a lower opening 231b by the prism 233.

The first group lens 234 is inserted into and held to the lower portion of the lower opening 231b of the first-group frame 231.

The ND filter unit 247 is assembled to a lower portion of the first-group frame 231, and includes an ND filter, which is a light-quantity adjustment member movable in a direction substantially perpendicular to an optical axial plane inclusive of the optical axis O1 and the optical axis O2.

The solenoid 251 for the ND filter and the solenoid 252 for the shutter are juxtaposed along the first optical axis O1 on the left of the prism 233 provided within the first group frame 231 in a unitized state. The ND filter solenoid 251 drives the ND filter via its output shaft. On the other hand, to the output shaft of the shutter solenoid 252, a shutter drive arm 271, which is a drive-power transmitting member, is fixed. A sector of the shutter unit 248 is driven by a shaft 272 fixed to the shutter drive arm 271, which will be described later.

The second group frame 238 includes an opening 238a formed at the top center, two guide holes 238c passing through the frame along the Y-direction, a whirl-stop notch 238g formed in the other side of the guide holes 238c, and a notch 238d for inserting a lead screw. The second group frame 238 is also provided with the shutter unit 248 arranged above the opening 238a in addition to the second group lens 235 as a zoom lens. The second group frame 238 is supported back-and-forth movably along the optical axis O2 by the suspension shaft 241 and the whirl-stop shaft 242 slidably fitting into the guide holes 238c and the notch 238g, respectively.

The shutter unit 248 includes two sectors, which are masking members movable to open and close in a direction perpendicular to an optical axial plane inclusive of the optical axis O1 and the optical axis O2, and the sectors are driven to open and close by a sector drive lever 243 which is driven by the shaft 272 of the shutter drive arm.

The third group frame 239 includes two guide holes 239b passing through the frame along the Y-direction, a whirl-stop notch 239c formed opposite from the guide holes 239b, and a notch 239d for inserting a lead screw. At the central opening of the third group frame 239, the third group lens 236, which is a zoom and focus lens, is mounted.

The first stepping motor 253 is provided with a lead screw shaft 281 as an output shaft and a bearing unit for supporting a lead screw shaft 283 which is another shaft. The second stepping motor 254 includes a lead screw shaft 283 as an output shaft and a bearing unit for supporting a lead screw shaft 283 which is another shaft.

The first and second stepping motors 253 and 254 are supported inside a left wall 232k (on the right in FIG. 21) of the fixed frame 232 with a motor mounting plate 285 therebetween, which are fixed to the left wall 232k with a screw 249 after being positioned inside the left wall 232k with positioning pins 232p. That is, the first and second stepping motors 253 and 254 are disposed on the left (on the right in FIG. 21) of the second and third group frames 238 and 239 of the fixed frame 232 at upper and lower positions on a straight line region in parallel with the optical axis O2 below the solenoids 251 and 252, respectively, in a state that the lead screw shafts extends in the opposite directions. In the mounting state of the stepping motors mentioned above, the first stepping motor 253 is located at a lower position with the lead screw shaft 281 directed upward while the second stepping motor 254 is located at an upper position with the lead screw shaft 283 directed downward.

Hence, in the mounting state of the stepping motors mentioned above, the lead screw shafts 281 and 283 are arranged in parallel with an optical axial plane inclusive of the optical axis O1 and the optical axis O2 and also in parallel with the optical axis O2. The lead screw shafts 281 and 283 are juxtaposed in the optical axial direction O2. The solenoids 251 and 252 and the stepping motors 254 and 253 are arranged in regions on one straight line in parallel with the optical axis O2.

To the lead screw shaft 281, a second-group frame drive nut 282 is fitted and screwed while to the lead screw shaft 283, a third-group frame drive nut 284 is fitted and screwed. The lower surface of the screwed second-group frame drive nut 282 is abutted on the upper surface 238h of the notch 238d, which is astride inserted to the lead screw shaft 281, of the second group frame 238 by an urging force of the compression spring 246, and is urged upward. The upper surface of the screwed third-group frame drive nut 284 is abutted on the lower surface 239h of the notch 239d, which is astride inserted to the lead screw shaft 283, of the third group frame 239 by the urging force of the compression spring 246, and is urged downward. In such a manner, by movements of the drive nuts 282 and 284, the second and third group frames 238 and 239 are moved back-and-forth while respective screw backlashes between the drive nuts 282/284 and the lead screw shafts 281/283 are moved in one direction.

Thus, when the lead screw shaft 281 is rotated by the stepping motor 253, the second group frame 238 is moved back-and-forth between the wide-angle position (reset position) and the telescopic position, along the optical axis O2 via the second-group frame drive nut 282. Similarly, when the lead screw shaft 283 is rotated by the stepping motor 254, the third group frame 239 is moved back-and-forth between the wide-angle position (reset position) and the telescopic position along the optical axis O2 via the second-group frame drive nut 284. During resetting processes of the stepping motors 253 and 254, when the second group frame 238 and the third group frame 239 are moved in the resetting direction so as to reach the respective reset positions, arrivals to the reset positions are detected by the PRs 286 and 287 (FIG. 20).

The arrangement of the component units between the front and rear covers 202 and 203 of the electronic camera 201 will now be described in detail with reference to FIGS. 23 to 28.

Figure 23:
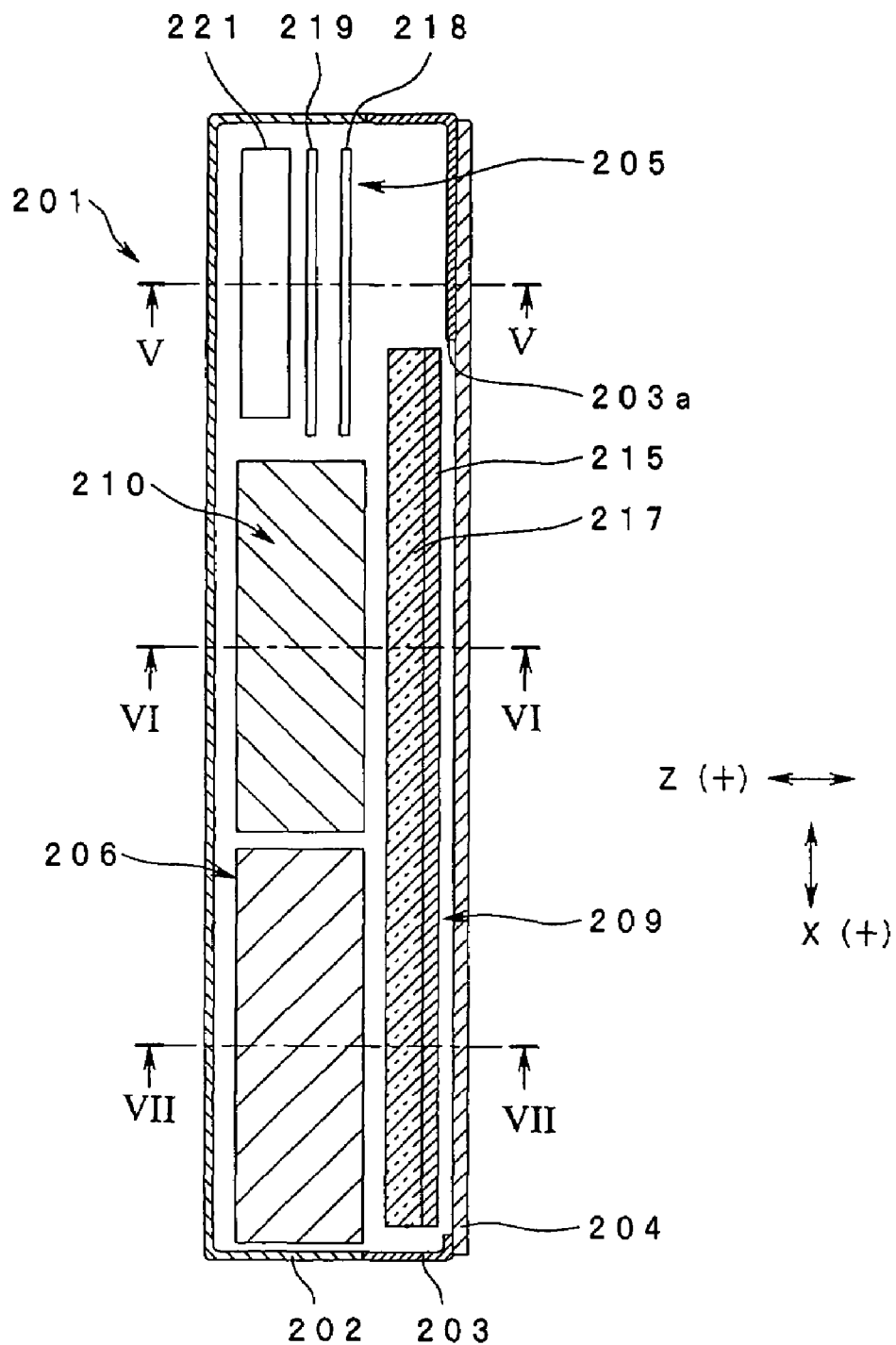
FIG. 23 is a sectional view at the line IV-IV of FIG. 19 showing an arrangement of the electronic camera in cross-section.
Figure 24:
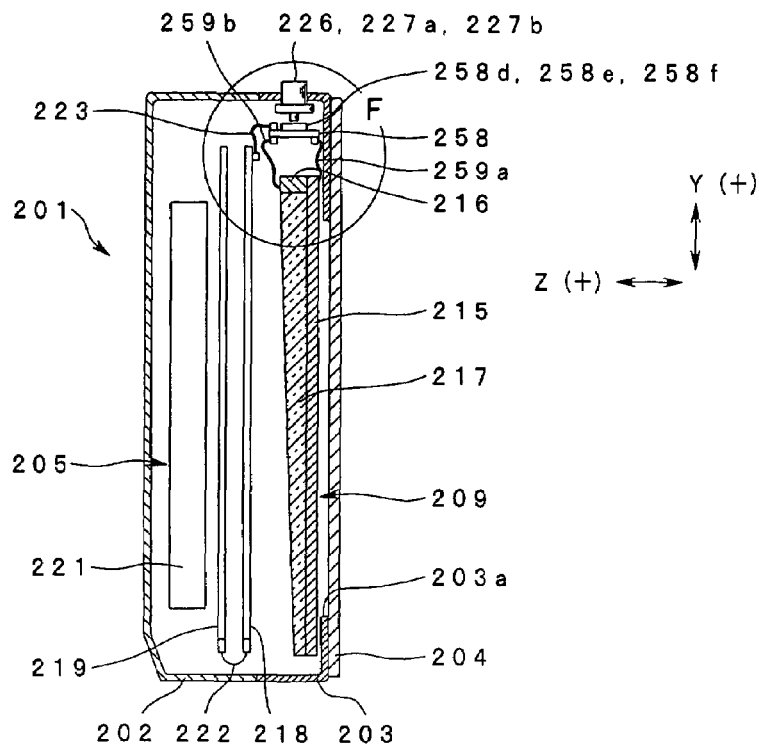
FIG. 24 is a sectional view at the line V-V of FIG. 23.
Figure 26:
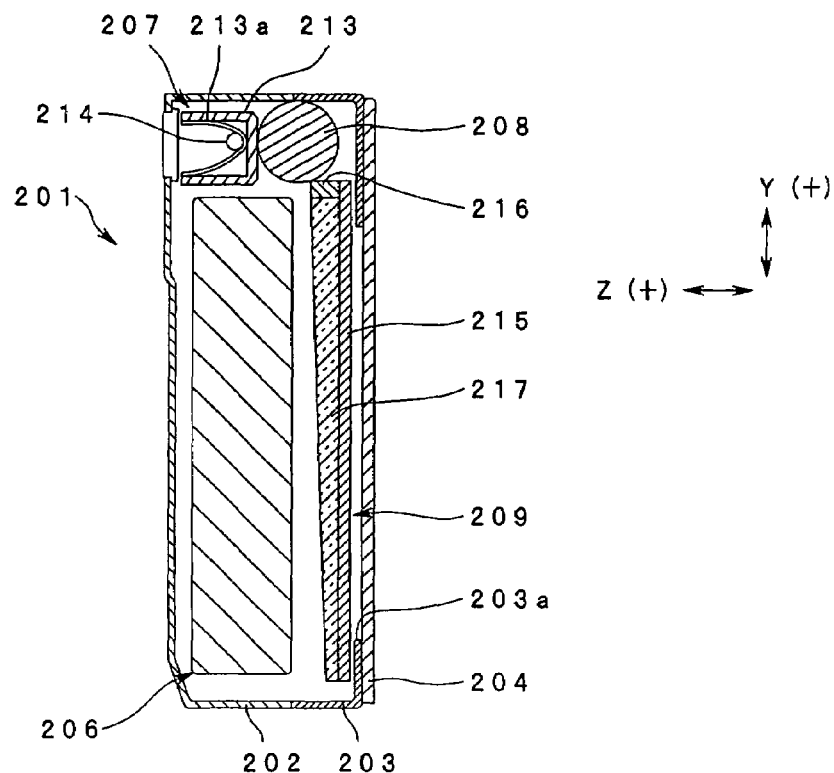
FIG. 26 is a sectional view at the line VII-VII of FIG. 23.
Figure 28:
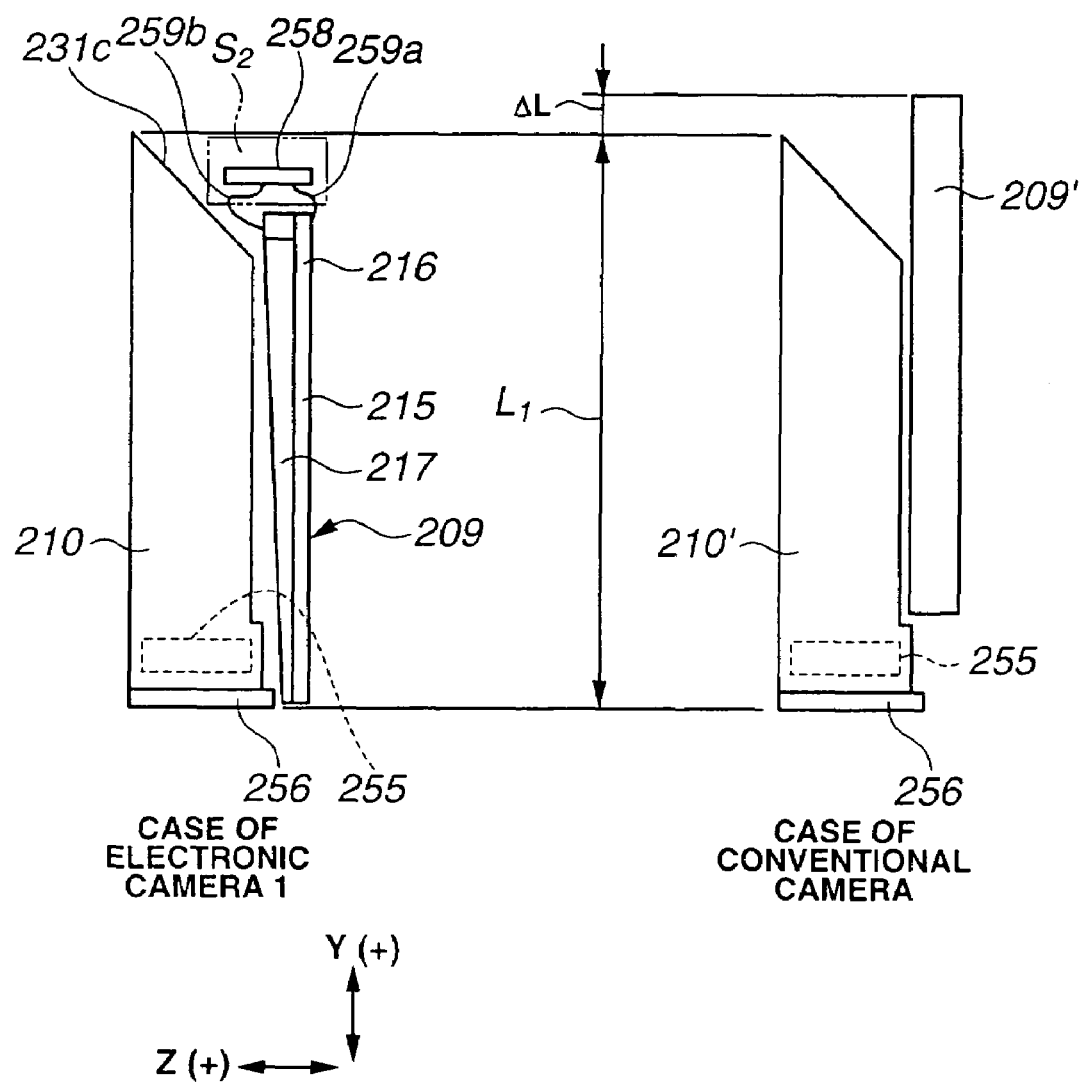
FIG. 28 is a comparative drawing between an occupied space around the lens barrel and an LCD unit of the electronic camera shown in FIG. 19 and an occupied space around a lens barrel and an LCD unit of a conventional electronic camera.

FIG. 23 is a sectional view at the line IV-IV of FIG. 19 showing the arrangement of component units of the electronic camera on the X-Z cross-section; FIG. 24 is a sectional view at the line V-V of FIG. 23 showing a longitudinal sectional view around an electric substrate unit, an LCD unit, and a switch substrate; FIG. 25 is a VI-VI sectional view of FIG. 23 showing a longitudinal section of the arrangement around the lens barrel and the LCD unit, the lens barrel in FIG. 23 showing VIII-VIII section of FIG. 22; FIG. 26 is a sectional view at the line VII-VII of FIG. 23, showing a longitudinal section around a power supply unit, the LCD unit, and a stroboscopic unit; FIG. 27 is an enlarged view of section F of FIG. 24, showing the arrangement around the switch substrate; and FIG. 28 is a drawing showing the comparison between the electronic camera according to the embodiment and a conventional electronic camera with regard to the arrangement occupancy around the lens barrel and the LCD unit.

In the electronic camera 201 according to the embodiment, as shown in FIG. 23, on X-Z cross-section, the lens barrel 210 is arranged at the center adjacent to the front cover 202, and the electric substrate unit 205 and the power supply unit 206 are arranged on both sides of the lens barrel 210. The LCD unit 209 is located at a position facing the opening 203a of the rear cover 203 and in the rear of the region including the power supply unit 206, the lens barrel 210, and part of the electric substrate unit 205.

The respective thicknesses in the Z-direction, i.e., the thicknesses of occupied spaces, of the power supply unit 206, the lens barrel 210, and the lens barrel 210 are substantially the same in size (FIG. 23). The occupied area of the LCD display board 215 of the LCD unit 209 on the X-Y plane equals projection area of the power supply unit 206 and the lens barrel 210 in the Z-direction, and part of a projection area of the electric substrate unit 205 in the Z-direction added to that. The respective heights in the Y-direction of the lens barrel 210 except the inclined surface 231c, the power supply unit 206, and the LCD unit 209 are substantially the same.

On the other hand, in the arrangement on the Y-Z cross-section of the electric substrate unit 205 and the LCD unit 209, as shown in FIG. 24, which is a V-V sectional view of FIG. 23, and FIG. 27, which is an enlarged view of F-section of FIG. 24, the switch substrate 258 is arranged above the LCD unit 209 and in the diagonally upward rear of the electric substrate unit, and switch groups 258d, 258e, and 258f of the switch substrate 258 are located directly below the release buttons 226, 227a, and 227b. On the switch substrate 258, as described above, the switch groups are mounted, and the switch substrate 258 also serves as a relay substrate for the LCD unit 209.

That is, in a state that the switch substrate 258 and the main printed circuit board 218 are connected together with the connector 258a provided in the switch substrate 258 therebetween, the release switch 258d, the power switch 258e, and the mode-setting switch 258f, which are provided on the switch substrate 258, are to obviously be a connected state to the main printed circuit board 218. Simultaneously, a signal line and a drive power-supply line of the LCD display board 215 and the LCD illumination light source 216, which are connected with the connection FPCs 259a and 259b therebetween, are connected to the main printed circuit board 218 using the switch substrate 258 as a relay substrate.

Hence, while the long connection FPC for connecting the LCD display board 215 of the LCD unit 209 and the illumination light source 216 to the main printed circuit board 218 is not required, the connection FPCs 259a and 259b for connecting the LCD display board 215 and the illumination light source 216 to the switch substrate 258 are reduced in length, and further the connection FPC 223 for connecting the switch substrate 258 to the main printed circuit board 218 is also reduced in length. Thereby, the possibility that the FPC is damaged is reduced, permitting easy connecting operation. The reduction in length of the connection FPC substantially inhibits the influence of noise on each signal. Furthermore, during assembling, the LCD unit 209 and the switch substrate 258 can be unitized so as to assemble them as one unit. Meanwhile, since there is no member on an upper region above the main printed circuit board 218 and the sub-printed circuit board 219 of the electric substrate unit 205, the electric substrate unit can occupy a sufficient area. Moreover, since the LCD unit 209 and the switch substrate 258 are assembled to the rear cover 203 side by collecting together, it is very easy to separate between the lens barrel 210, the power supply unit 206, and the electric substrate unit 205 which are disposed adjacent to the front cover 202, improving repair work efficiency.

In the arrangement on the Y-Z cross-section of the lens barrel 210 and the LCD unit 209, as shown in FIG. 25, which is a VI-VI sectional view of FIG. 23 (the lens barrel showing a VIII-VIII cross-section of FIG. 22), the LCD unit 209 is arranged behind the lens barrel 210. Specifically, the LCD unit 209 is arranged in tight contact on the front surface of the LCD display board 215 in a state that the illumination light source 216 is arranged thereon, the LCD display board 215 is arranged on the rear, and the light-guide plate 217 having vertically uneven thicknesses is arranged so that the thicker portion is arranged adjacent to the illumination light source 216 while the thinner portion is downward arranged.

The lower portion of the LCD unit 209 is in a retracted state to the rear. In the portion retracted to the rear, protruding portions of the CCD 255 and the CCD substrate 256, which are at the bottom of the lens barrel 210, are located. In this state, the lower surface of the CCD substrate 256 is substantially flush with that of the LCD unit 209, so that there is no dead space on the bottom surface of the front cover 202 and the rear cover 203. Furthermore, into an FPC insertion path S1 of a clearance formed by the back face of the lens barrel 210 and the LCD display board 215 above the protruding portions of the CCD 255 and the CCD substrate 256, the CCD-connection FPC 257 is inserted for connecting the CCD substrate 256 to the main printed circuit board 218.

In the arrangement on the Y-Z cross-section of the power supply unit 206, the LCD unit 209, and the stroboscopic unit 207, as shown in FIG. 26, which is a VII-VII sectional view of FIG. 23, the power supply unit 206 and the LCD unit 209 are arranged in a state overlapping with each other, and the stroboscopic unit 207 having the stroboscopic emission tube 214 and a reflector 213a is arranged thereon. Furthermore, the stroboscope-charging capacitor 208 is arranged in a space with a trapezoidal section formed above the LCD unit 209 and along the X-direction formed in a region extending from the rear of the stroboscopic unit 207 to the rear of the upward inclined surface 231c of the lens barrel.

By adopting the above-mentioned arrangement of the component unit members, the lower surface of the lens barrel 210 is substantially flush with that of the LCD unit 209 so as to eliminate a dead space on the lower surface of the front and rear covers 202 and 203; a small clearance between the lens barrel 210 and the LCD unit 209 is efficiently used by inserting the CCD-connection FPC 257 thereinto; and further, the stroboscope-charging capacitor 208 is arranged in a space formed by the lens barrel 210 and the LCD unit 209. By adopting such arrangement, the thickness in the Z-direction of the electronic camera 201 according to the second embodiment can be established thinner, and also the vertical height of the electronic camera 201 can be suppressed, achieving compactification of the camera.

When the arrangement of the electronic camera 201 according to the second embodiment on the Y-Z plane around the lens barrel is compared with that of a conventional electronic camera, as shown in a plan view of FIG. 28, in the conventional electronic camera, the LCD unit 209' has been necessary to be upward displaced from the lens barrel 210' with a height L by an offset ΔL so as to avoid the protruding portion around the CCD 255 and the CCD substrate 256 below the lens barrel 210'. Hence, in the conventional electronic camera, instead of increasing the thickness in the Z-direction, the height of the camera in the Y-direction must be increased by the offset ΔL because of the upward displacement of the LCD unit 209'.

Whereas, in the electronic camera 201 according to the second embodiment, as shown in FIG. 28, the lens barrel 210 is arranged close to the LCD unit 209 without upward offsetting the LCD unit 209 by locating the protruding portion around the CCD 255 below the lens barrel 210 at the lower thin-thickness portion of the LCD unit 209. Thus, the electronic camera can be simultaneously miniaturized in contour size and thickness without increasing the thickness in the Z-direction as well as the height in the Y-direction.

Furthermore, the LCD unit 209 is not necessary to be displaced upward, and a space S2 formed on the LCD unit 209 can be efficiently used by arranging the switch substrate 258, which is also a relay substrate for the LCD unit 209, therein. Meanwhile, accommodating work of the connection FPCs 259a and 259b around the switch substrate 258 becomes easy while noise is suppressed by reducing the length of the connection FPC.

On the other hand, the LCD unit 209 and the switch substrate 258 adjacent to the rear cover 203 are easy to be separated from the lens barrel 210, the power supply unit 206, and the electric substrate unit 205 adjacent to the front cover 202, so that disassembling during repair is quite easy, improving repair work efficiency.

A modification with regard to the arrangement of the switch substrate 258 of the electronic camera 201 can be made such that the switch substrate is arranged on the X-Z plane extending over the LCD unit 209 and the electric substrate unit 205. In this modification, the mounting area of the switch substrate can be increased.

As described above, according to the camera of the second embodiment of the present invention, the display unit can be arranged close to the lens barrel for miniaturization by arranging the thin-thickness portion of the light-guide plate on the image pickup element-side of the lens barrel, which is the protruding portion of the lens barrel. Furthermore, by inserting the connection FPC for connecting between the image pickup element and the electrical substrate unit into a clearance between the light-guide plate and the lens barrel, the camera can be further miniaturized in size and especially in thickness. Moreover, since the display unit and the electrical substrate unit are connected together with the switch substrate arranged opposite to the image pickup element therebetween, a relay-only substrate for directly connecting to the electrical substrate unit can be eliminated, so that the mounting area of the electrical substrate unit can be increased. Furthermore, since the switch substrate is arranged above the display unit, the distance between both the units is reduced, so that the connection becomes easy and assembling efficiency is improved while noise can be suppressed. Furthermore, by attaching the display unit, the operation member, and the switch substrate to the external member, which is a single member, the connection between the switch substrate and the display unit can be simplified. Also, by only disconnecting between the switch substrate and the electrical substrate, the external member can be separated from the camera and the electrical connection can be cancelled, improving work efficiency during assembling or repair.

An electronic camera (camera) according to a third embodiment of the present invention will now be described.

Figure 30:
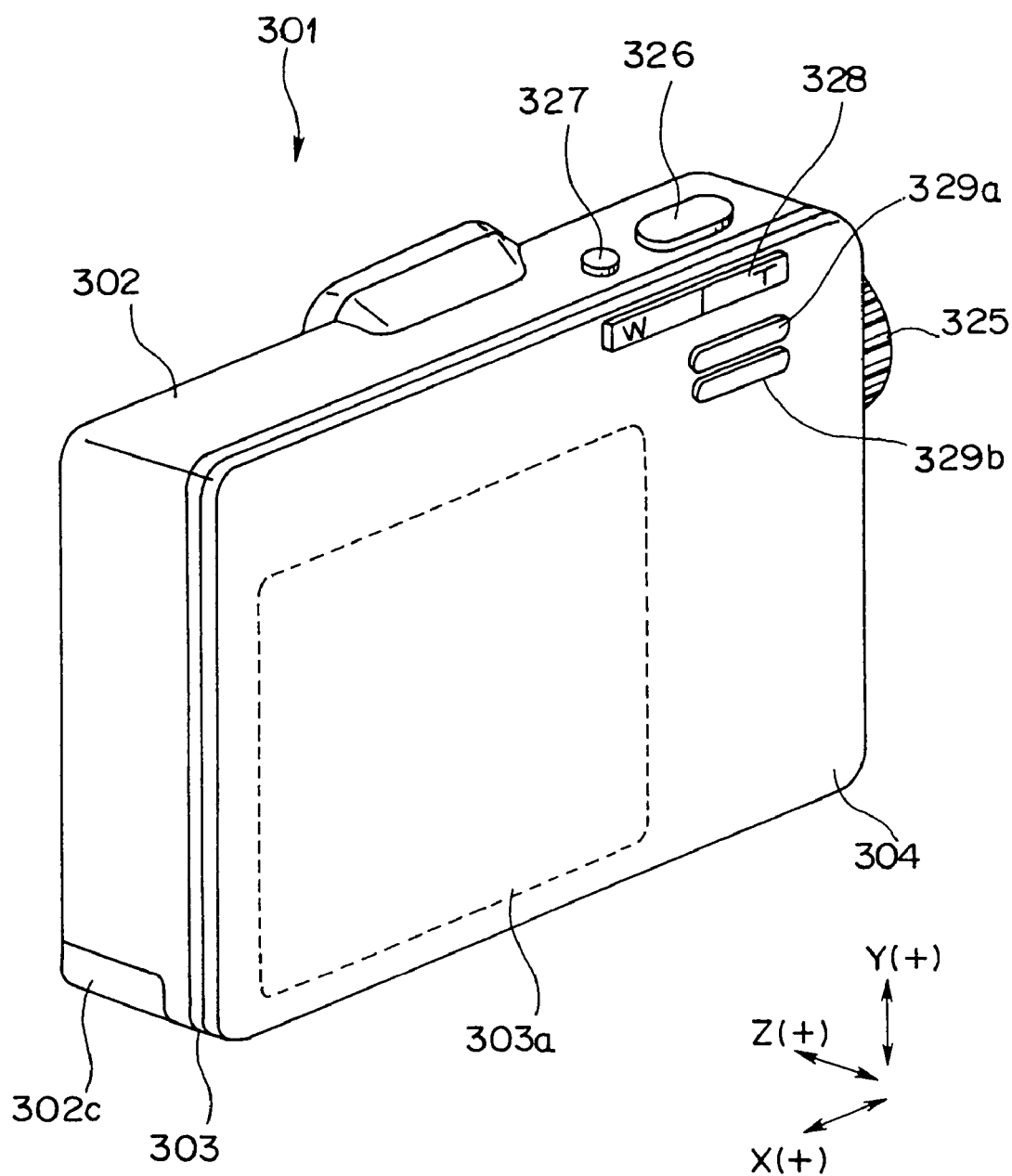
FIG. 30 is an external perspective view of the electronic camera shown in FIG. 29 viewed from the rear.
Figure 31:
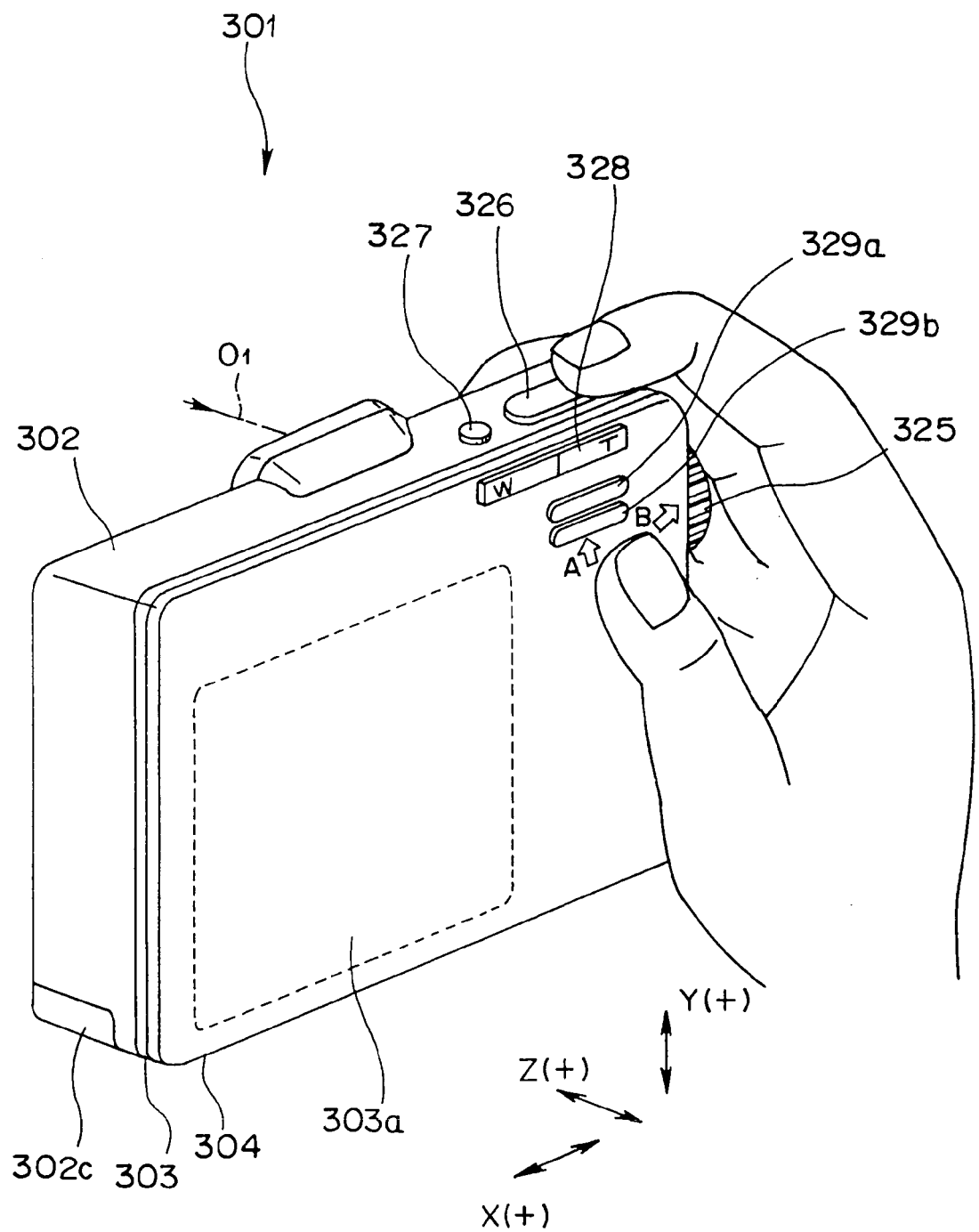
FIG. 31 is a perspective view of the electronic camera shown in FIG. 29 showing an appearance viewed from the rear when the electronic camera is held by a right hand.

FIG. 29 is a perspective view of the electronic camera according to the third embodiment showing an appearance viewed from the front; FIG. 30 is a perspective view of the electronic camera showing an appearance viewed from the rear; and FIG. 31 is a perspective view of the electronic camera showing an appearance viewed from the rear when the electronic camera is held by a right hand.

As shown in FIG. 29, an electronic camera 301 is a so-called digital camera and includes front and rear covers 302 and 303 as external members, a transparent plate 304 fixed on the back face of the front cover 302, the front and rear covers including, as principal component units described later with reference to FIG. 33, a lens barrel 310, an electric substrate unit 305, a power supply unit 306, a stroboscopic unit 307, a stroboscope-charging capacitor 308, an LCD unit 309 as displaying means, and a metallic reinforcing member 324.

On the front face of the front cover 302, a shooting window 302a and a stroboscopic emission window 302b are provided. On the upper part of the front cover 302, a release button 326 as an operation member and a power switch button 327 are arranged. On the left part of the front cover 302, a mode select dial 325 as a rotationally operable operation member and a card slot lid 302d operable to open and close are arranged. Furthermore, on the bottom part, a battery lid 302c and a connector opening (not shown) for a cradle connector 393 are arranged.

On the back face of the rear cover 303, an LCD opening window 303a is provided. On the back face of the rear cover 303, the transparent plate 304 is bonded, and the LCD opening window 303a can be observed through the transparent plate 304.

On the upper back face of the transparent plate 304, as shown in FIG. 30, a zoom lever 328 for operating a change-over switch between a telescopic angle and a wide angle is provided. Below the zoom lever 328, a menu switch operating button 329a and an OK switch operating button 329b for confirming an input are arranged.

As shown in FIG. 31, in the electronic camera 301 according to the third embodiment, the front cover 302, the rear cover 303, and a left portion (right in FIG. 31) of the transparent plate 304 are designated as a grip portion. In a state that the grip portion is held by a right hand, while displacing a thumb tip in direction A or direction B, the telescopic angle and the wide angle are switched by operating the zoom lever 328 or the menu selection and the OK operation can be performed by operating the menu switch operating button 329a and the OK switch operating button 329b, respectively. Furthermore, by rotationally operating the mode select dial 325 with a thumb or an index finger, the mode can be selected. Moreover, by operating the power switch button 327 or the release button 326 with a right index finger, the on-off operation of the power switch and the release operation can be performed.

As described above, according to the arrangement of the operating buttons on the front and rear covers as the external members of the electronic camera 301, around the upper camera grip portion on the left (right in FIG. 31), the power switch button 327, the release button 326, the mode select dial 325, the zoom lever 328, the menu switch operating button 329a, and the OK switch operating button 329b as switch operation buttons are collectively arranged, so that each button can be easily operated with a gripped hand.

Also, by arranging these operation units around the upper camera grip portion in such a manner, in the electronic camera 301, an LCD display board 315, which will be described later, can occupy a wide-range display board on the camera back face, enabling the display board to be easily observed.

An electrical circuit of the electronic camera 301 according to the third embodiment will now be described with reference to the block diagram of FIG. 32. The configuration of the electric circuit of the electronic camera 301 according to the third embodiment is similar to that of the electronic camera 101 according to the first embodiment, so that the same reference characters will be used to designate the same components common thereto.

In the electronic camera 301 according to the embodiment, the CPU 170 is housed therein as controlling means, and the entire control elements of the electronic camera 301 are controlled by the CPU 170. First, a subject image passing through the photographing optical system 111 is converted into an electric signal at a CCD 355, which is an image pickup element, under the control of the CPU 170. The electric signal converted by the CCD 355 is converted into a digital image signal by the A/D conversion circuit 114 after being converted into an analogue image signal by the image pickup circuit 113. Then, this digital image signal is stored in the recording media card (memory card) 120 as a recording medium such as a flash memory card and a smart memory card being detachable as an external memory via the interface (I/F) 121. The recording media card 120 is detachable from a media slot 321. The photographing optical system 111 includes the prism, first to fourth group lenses, the ND filter, and the shutter of the lens barrel 310, which will be described later.

The electric circuit of the electronic camera 301 is provided with the built-in memory 130 with a high processing speed and the image processing circuit 140. The built-in memory 130 is incorporated in a random access memory (RAM), for example, and used in an operation memory in each image processing or in a high-speed buffer of temporary image storing means. The image processing circuit 140 executes the conversion to RGB signals, the conversion of the number of pixels, and compression/decompression of data, based on the image data digitized by the A/D conversion circuit 114.

Furthermore, the aforementioned LCD display board 315 for displaying images (liquid crystal display) is mounted on the electronic camera 301, and on the LCD display board 315, confirmation of images stored in the memory card 120 and subject images to be pictured are displayed. The images displayed on the LCD display board 315 are images of the image information from the built-in memory 130, which are displayed by being converted into video images in the video output circuit 152 after entering in the video memory 151. The video output circuit 152 also can produce video images on an external display via the video-output external terminal 153.

The CPU 170 taken in a shooting start signal due to operation of the release button 326, performs image picking-up by the CCD 355, and establishes image picking-up modes by operating the mode select dial 325, the menu switch operating button 329a, and the OK switch operating button 329b so as to grab setting signals of various modes of the operation unit 173. This established mode is displayed on the LCD 172. On the basis of the control by the CPU 170, in the case of insufficient quantity of light during photographing a subject, the stroboscopic emission tube 314 of the stroboscope unit 307 is turned on so as to shoot the subject with the stroboscope.

Moreover, to the CPU 170, first and second stepping motors 353 and 354, which are drive sources for focus-driving and zoom-driving the photographing optical system, are connected with the driver 171 therebetween, so that lenses are driven by these motors.

Also, to the CPU 170, an ND filter solenoid 351 for driving an ND filter unit, and a shutter solenoid 352 for driving a shutter unit, which are subject light-quantity adjustment devices are connected with the driver 171 therebetween, so that the light-quantity adjustment is executed with the solenoids.

To the CPU 170, photo reflectors (referred to as PRs below) 386 and 387, which are detecting units for detecting a reset position in the back-and-forth movement of the photographing optical system, are also connected, so that the reset position of the photographing optical system 111 is detected during reset driving.

The external interface (external I/F) 161 is connected to the external input-output terminal 160 so as to perform data I/O operations to and from an external instrument. To the external input-output terminal 160, a personal computer is connected, for example, so as to forward images stored in the memory card. 120 to the personal computer. Alternatively, image data are taken therein from the personal computer.

To control elements of the electronic camera 301, electric power is supplied from a battery 312 of the power supply unit 306 via the power supply 180 for driving the elements. The battery 312 is chargeable under the control of the power supply 180.

Figure 32:
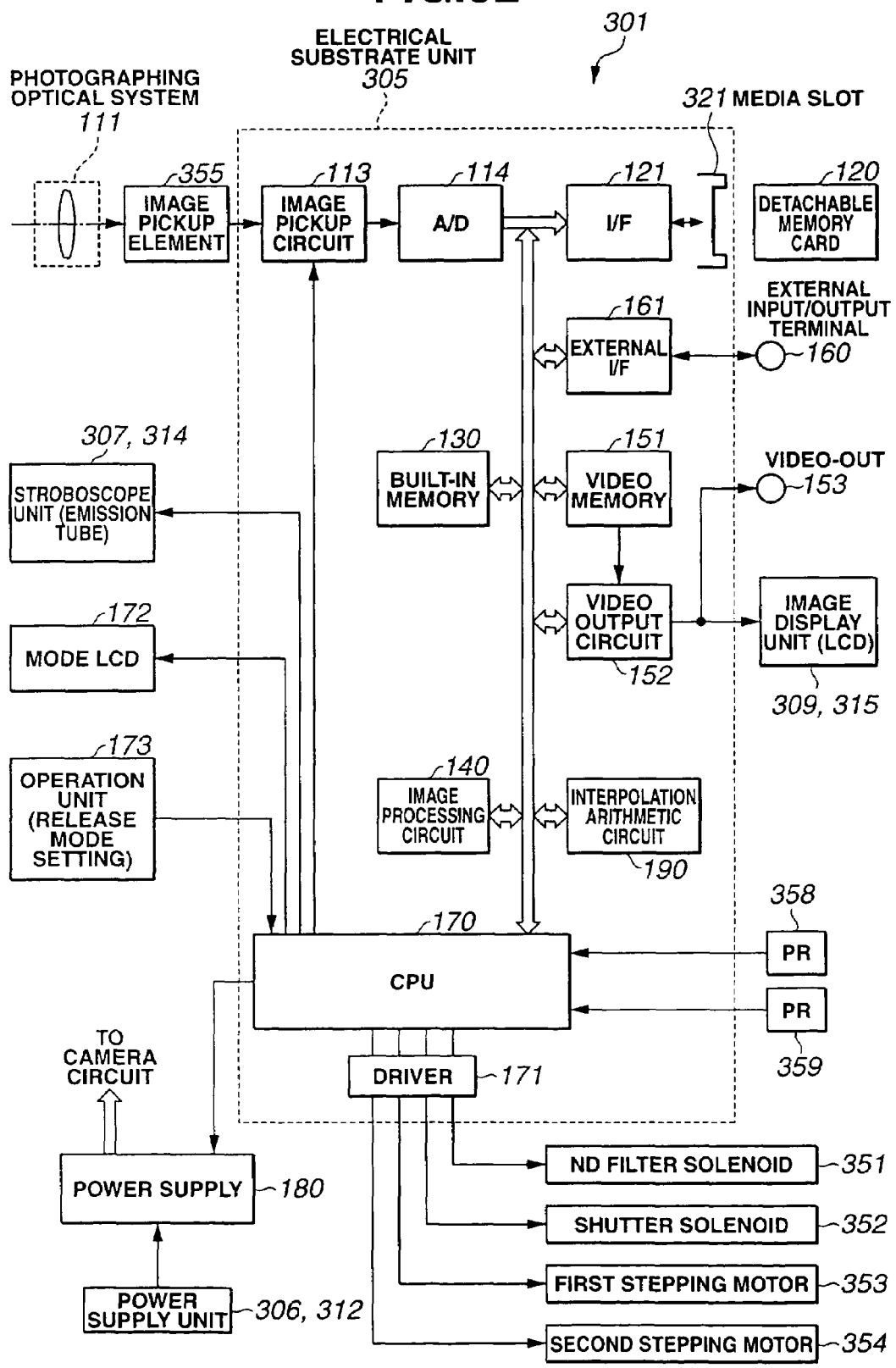
FIG. 32 is a block diagram of an electric circuit of the electronic camera shown in FIG. 29.

In addition, principal electrical components of the electric substrate unit 305 shown in the block diagram of FIG. 32 are to be mounted on first to third substrates 318 to 320 of the electric substrate unit 305.

In the electronic camera 301 according to the embodiment, principal component units accommodated between the front cover 302 and the rear cover 303, as shown in an exploded perspective view of each component unit accommodated in the electronic camera according to the embodiment of FIG. 33, are the lens barrel 310, the electric substrate unit 305, the power supply unit 306, the stroboscopic unit 307, the stroboscope-charging capacitor 308, the LCD unit 309 as displaying means, and a metallic reinforcing plate 324. The component units will be described below with reference to FIG. 33, etc.

The lens barrel 310 has a substantially rectangular parallelepiped contour, wherein the front surface is arranged along an X-Y plane, a longitudinal axis is aligned along the Y-direction, and a thickness in the Z-direction is comparatively thin, when the lens barrel 310 is mounted on the camera. The longitudinal direction in contour of the lens barrel 310 is to be aligned along the optical axis O2.

In an upper portion of the lens barrel 310, there are provided a first holding member 331, which is a holding frame for accommodating a prism 333 as a reflection optical member constituting a bending optical system for taking in a subject beam incident along the first optical axis O1 (the Z-direction) thereinto, and a fixed frame 332 as a frame member to be fixed to the first holding member 331 for accommodating a photographing lens system. In the rear of the first holding member on the lens barrel, an inclined surface 331c (FIG. 34) is provided for forming a triangular prism.

In the lens barrel 310, the taken subject beam along the first optical axis O1 is reflected by the prism 333 in a direction of the second optical axis O2, and an image by the beam is formed on an image pickup surface of the CCD 355, which is an image pickup element, via a photographing lens system (will be described later) so as to be converted to an image signal of a subject image. The detailed internal structure of the lens barrel 310 will be described later.

The CCD 355 is mounted on a CCD substrate 356 as an image-pickup-element electrical substrate disposed in the lower portion of the fixed frame 332. To the CCD substrate 356, a CCD connection FPC 357 as an image-pickup-element connection flexible printed circuit board (referred to as an FPC below) is connected. The CCD connection FPC 357 includes a connector 359 which is connected to the first substrate 318 which will be described later.

The electric substrate unit 305 is composed of three control electric substrates of the first substrate 318, the second substrate 319, and the third substrate 320 for mounting electric components within the electric substrate unit shown in the electric circuit of FIG. 32, which will be described later. The first substrate 318, the second substrate 319, and the third substrate 320 are connected together with FPCs 322 and 323 (FIG. 47), and are accommodated in the camera along the X-Y plane in the Z-direction in a three-ply state (FIG. 48). On the first substrate 318, in addition to that the electric components for the control circuit are mounted; a CCD connection FPC 357 is connected for connecting the CCD, and further, an LCD connection FPC 358 is connected via the connector 359 for connecting the LCD (FIG. 47). Also, on the third substrate 320, the recording media slot 321 is mounted, and below the third substrate 320, a cradle connector substrate 392 connected via an FPC 391 therebetween is arranged. On the connector substrate 392, a cradle connector 393 is mounted.

The power supply unit 306 is composed of a battery case 311 and a camera power-supply battery 312 accommodated in the battery case 311, and has a rectangular parallelepiped contour with a plane extending on the X-Y plane and a comparatively thin thickness in the Z-direction.

The stroboscopic unit 307 is composed of a stroboscope body 313 and a stroboscopic emission tube 314 supported inside a reflector 313a of the stroboscope body 313 (FIG. 46).

The LCD unit 309 includes an LCD display board 315, which is a liquid crystal display board having a display plane arranged along the X-Y plane, an illumination light source 316 arranged at an upper position of the LCD display board 315 and extending in the X-direction, and a light-guide plate 317 disposed under the illumination light source 316 and substantially covering a non-display plane of the LCD display board 315.

The illumination light source 316 is composed of a fluorescent electroluminescence tube or an LED chip group.

The light-guide plate 317 is a member with uneven thicknesses in the Y-direction, wherein an upper portion adjacent to the illumination light source 316 is thick while a lower portion is thinner.

The LCD display board 315 is connector-connected to the first substrate 318 with the connection connector 359 of the connection FPC 358 therebetween together with the illumination light source 316.

The reinforcing plate 324 is a metallic member, and is fixed on the front wall of the battery case 311 of the power supply unit 306 as well as on the front wall of the lens barrel 310 with screws or the like. In an upper bent portion of the reinforcing plate 324, the stroboscope body 313 of the stroboscopic unit 307 is retained.

Next, the structure of the lens barrel 310 will be described in detail with reference to FIGS. 34 to 40A and 40B.

FIG. 34 is an exploded perspective view of the lens barrel viewed from the rear; FIG. 35 is a longitudinal sectional view of the lens barrel in the wide angle state viewed from the front; FIG. 36 is a sectional view at the line IX-IX of FIG. 35; FIG. 37 is a sectional view at the line X-X of FIG. 35; FIG. 38 is an exploded perspective view of the vicinity of a first group frame of the lens barrel (ND filter unit); FIG. 39 is an exploded perspective view of the vicinity of a second group frame (shutter unit); FIG. 40A is a drawing viewed in the direction indicated by arrow G of FIG. 39 showing a shutter-open state; and FIG. 40B is a drawing viewed in the direction indicated by arrow G of FIG. 39 showing a shutter-close state.

The lens barrel 310, as shown in FIGS. 34 and 35, includes a first group frame 331 as a first holding frame wherein part of the upper portion is structured to have a trianglar prism shape and a fixed frame 332 as a frame member having a rectangular parallelepiped contour. The first group frame 331 is provided with a prism 333 as a reflection optical member, a first group lens 334, an ND filter unit 347 as light-quantity adjusting means, an ND filter rotary solenoid (referred to as a solenoid below) 351 as a filter drive source (light-quantity adjusting drive source), and a shutter solenoid 352 as a shutter drive source (light-quantity adjusting drive source) and the like, which are housed therein.

The components provided within the fixed frame 332 include a shutter unit 348, which is light-quantity adjusting means (shutter means) provided along the optical axis O2; a second group lens 335, which is a zoom lens group held by a second group frame 338, which is a second holding frame being movable back-and-forth and disposed below the shutter unit 348; further, a third group lens 336, which is a zoom lens group held by a third group frame 339, which is a third holding frame being movable back-and-forth; further, a fourth group lens 337 held by a lower opening 332b of the fixed frame 332; and the CCD 355, which is an image pickup element disposed at a focal position of a subject beam and mounted on the CCD substrate 356; which are arranged in that order. The members provided within the fixed frame 332 further include a suspension shaft 341 fixed to the fixed frame 332 at both ends of the suspension shaft 341 laterally extending along the second optical axis O2 (i.e., the Y-direction) and a whirl-stop shaft 342; the first stepping motor 353, which is a first lens drive-source for zoom and focus driving the second group frame 338 back-and-forth; the second stepping motor 354, which is a second lens drive-source for zoom and focus driving the third group frame 339 back-and-forth; and further, a compression spring 346 inserted between the second group frame 338 and the third group frame 339. On the back face of the fixed frame 332, an opening 332g is formed for assembling parts. The opening 332g is covered with a metallic fixed lid 389.

The first holding frame 331 has a contour composed of a rectangular parallelepiped shape part and a triangular prism shape part extending in the X-direction and having an inclined plane 331c shaped along the external shape of the prism 333, which is accommodated within part of the rear portion of the first holding frame 331. The first holding frame 331 accommodates the prism 333, the first group lens 334, the ND filter unit 347, and the solenoids 351 and 352 therein, and is fixed to the top of the fixed frame 332 by connecting screw-insertion holes 331f and tapped holes 332f with screws.

The prism 333 is inserted into a front opening 331a of the first-group frame 331, and is fixed thereto. A subject beam entering along the optical axis O1 is bent at an angle of 90° and is reflected along the second optical axis O2 (the Y-direction) toward a lower opening 331b by the prism 333.

The first group lens 334 is inserted into and held to the lower portion of the lower opening 331b of the first-group frame 331.

The ND filter unit 347 is assembled to a lower portion of the first-group frame 331, and includes an ND filter 367, which is a light-quantity adjustment member movable in a direction substantially perpendicular to an optical axial plane inclusive of the optical axis O1 and the optical axis O2.

The solenoid 351 for the ND filter and the solenoid 352 for the shutter are juxtaposed in a unitized state along the first optical axis O1 on the left of the prism 333 provided within the first group frame 331. The respective output shafts 351a and 352a are arranged below the first group frame 331 so as to protrude in the optical axial direction O2 (FIG. 38). To the output shaft 351a of the ND filter solenoid 351, a pinion 361 is fixed. On the other hand, to the output shaft 352a of the shutter solenoid 352, a shutter drive arm 371, which is a drive-power transmitting member, is fixed. At an arm end of the shutter drive arm 371, a shaft 372 is fixed, which is made of a hollow shaft member having a length predetermined corresponding to a back-and-forth movement position of the second group lens. The pinion 361 or the shutter drive arm 371 is rotated between two rotational positions of an open position and a close position by driving the solenoid in normal and reverse directions so as to rotate the output shaft 351a or 352a. The structure and operation of the ND filter unit 347 and the shutter unit 348 driven by the pinion 361 and the shaft 372 will be described later.

The second group frame 338 includes an opening 338a formed at the top center, two guide holes 338c passing through the frame along the Y-direction, a whirl-stop notch 338g formed opposite the guide holes 338c, a notch 338d for inserting a lead screw, a lever-shaft hole 338e, four stepped pins 338b, and retainer projections 338f formed on both end faces in the Z-direction (FIG. 39). The second group frame 338 is also provided with the shutter unit 348 arranged above the opening 338a in addition to the second group lens 335 which is a zoom lens. Into the lever-shaft hole 338e, a sector drive lever 343 is rotatably fitted. The second group frame 338 is supported back-and-forth movably along the optical axis O2 by the suspension shaft 341 and the whirl-stop shaft 342 slidably fitting into the guide holes 338c and the notch 338g, respectively.

The shutter unit 348 includes first and second sectors 374 and 376, which are two masking members movable to open and close in a direction perpendicular to an optical axial plane inclusive of the optical axis O1 and the optical axis O2, and the structure thereof will be described in detail later.

The third group frame 339 includes two guide holes 339b passing through the frame along the Y-direction, a whirl-stop notch 339c formed opposite with the guide holes 339b, and a notch 339d for inserting a lead screw. In the central opening of the third group frame 339, the third group lens 336, which is a zoom and focus lens, is mounted.

The first stepping motor 353 is composed of a motor body, a rotor 353c having a lead screw shaft 381 fixed thereto, and a coil unit 353b having a bearing 353a arranged at the distal end for supporting another shaft (FIG. 37).

The second stepping motor 354 is composed of a motor body, a rotor 354c having a lead screw shaft 383 fixed thereto, and a coil unit 354b having a bearing 354a arranged at the distal end for supporting another shaft (FIG. 37).

The first and second stepping motors 353 and 354, as shown in FIGS. 34 and 35, are fixed to and supported inside a left wall 332k with a motor mounting plate 385 therebetween. That is, the first and second stepping motors 353 and 354 are disposed on the left of the second and third group frames 338 and 339 of the fixed frame 332 at upper and lower positions on a straight line region in parallel with the optical axis O2 below the solenoids 351 and 352, respectively. The first and second stepping motors 353 and 354 are attached at upper and lower ends of the motor mounting plate 385, respectively, in a state that the lead screw shafts extend in the opposite directions, and the rotor 353c/the coil unit 353b and the rotor 354c/the coil unit 354b are disposed along an optical axial plane inclusive of the optical axis O1 and the optical axis O2. The stepping motors 353 and 354 are mounted by fixing the motor mounting plate 385 inside the left wall 332k with screws 349 after the positions are set with positioning pins 332p.

In the mounting state of the stepping motors mentioned above, the first stepping motor 353 is located at a lower position with the lead screw shaft 381 directed upward while the second stepping motor 354 is located at an upper position with the lead screw shaft 383 directed downward. The extremities of the lead screw shafts 381 and 383 are oppositely fitted into the bearings 354a and 353a of the stepping motors 354 and 353, respectively, and are rotatably supported thereto.

Hence, in the mounting state of the stepping motors 353 and 354 mentioned above, the lead screw shafts 381 and 383 are arranged in parallel with an optical axial plane inclusive of the optical axis O1 and the optical axis O2 and also in parallel with the optical axis O2. The lead screw shafts 381 and 383 are juxtaposed in the optical axial direction O2. The solenoids 351 and 352 and the stepping motors 354 and 353 are arranged on one straight line region adjacent to the left wall of the lens barrel 310 in parallel with the optical axis O2.

To the lead screw shaft 381, a second-group frame drive nut 382 is fitted and screwed while to the lead screw shaft 383, a third-group frame drive nut 384 is fitted and screwed. The lower surface of the screwed second-group frame drive nut 382 is abutted on the upper surface 338$h$ (FIG. 39) of the notch 338$d$, which is astride inserted to the lead screw shaft 381, of the second group frame 338 by an urging force of the compression spring 346, and is urged upward. The upper surface of the screwed third-group frame drive nut 384 is abutted on the lower surface 339$h$ of the notch 339$d$, which is astride inserted to the lead screw shaft 383, of the third group frame 339 by the urging force of the compression spring 346, and is urged downward (FIG. 35). In such a manner as described above, by movements of the drive nuts 382 and 384, the second and third group frames 338 and 339 are moved back-and-forth while respective screw backlashes between the drive nuts 382/384 and the lead screw shafts 381/383 are moved in one direction.

Thus, when the lead screw shaft 381 is rotated by the stepping motor 353, the second group frame 338 is moved back-and-forth between the wide-angle position (reset position) and the telescopic position shown in FIG. 35, along the optical axis O2 via the second-group frame drive nut 382. Similarly, when the lead screw shaft 383 is rotated by the stepping motor 354, the third group frame 339 is moved back-and-forth between the wide-angle position (reset position) and the telescopic position shown in FIG. 35 along the optical axis O2 via the third-group frame drive nut 384. During the resetting process by the stepping motors 353 and 354, when the second group frame 338 and the third group frame 339 are moved in the resetting directions so as to reach the respective reset positions, arrivals to the reset positions are detected by the PRs 386 and 387 (FIG. 32), respectively, so that the resetting process is completed.

In the lens barrel 310, when component parts, such as lens groups and stepping motors, are assembled, through the opening 332$g$ formed on the back face of the fixed frame 332, the lens groups and the stepping motors are inserted and assembled. After the completion of the assembling, the opening 332$g$ is covered with a metallic fixed lid (not shown) which is fixed to the fixed frame 332 with screws so as to close the fixed frame 332.

The fixed frame 332 of the lens barrel 310, as shown in FIG. 34, is provided with a front wall arranged along a plane (the X-Y plane) perpendicular to the thickness direction of the rectangular parallelepiped of the fixed frame. The front wall includes insertion holes 332$h$ and 332$i$ provided for inserting the PR 386 and the PR 387 for detecting reset positions of the second and third frames, respectively. The positions of the insertion holes 332$h$ and 332$i$ are to be positions facing surfaces to be detected when the second and third group frames 338 and 339 are located at reset positions on the movement trajectories.

The ND filter unit 347 is located between the lower surface of the first-group frame 331 and the upper surface of the fixed frame 332, and as shown in the exploded perspective view of FIG. 38, it is composed of an idle gear 362 engaged with the output pinion 361 of the solenoid 351 for the ND filter, an ND filter drive gear 363 engaged with the idle gear 362, a bottom board 364 attached to the first-group frame 331 for holding the gears, a filter drive arm 365 having pin holes 365$a$ and 365$b$ formed at both ends, an ND-filter guard sheet 366 having a central opening 366$a$, a pin hole 366$b$, and a hole elongated in the X-direction 366$c$, the ND filter 367 having a pin hole 367$b$ and a hole elongated in the X-direction 367$c$, and a caulking pin 368.

The pin hole 365$a$ at one end of the filter drive arm 365 is fitted to a drive pin 363$a$ of the filter drive gear 363, and integrally supported by the filter drive gear 363. The caulking pin 368 is caulked and fixed to the pin hole 365$b$ of the filter drive arm 365 in a rotatably fitted state into the pin hole 367$b$ of the ND filter 367 and the pin hole 366$b$ of the ND-filter guard sheet 366. The elongated holes 366$c$ and 367$c$ of the ND-filter guard sheet 366 and the ND filter 367 are freely slidably fitted to the guide pin 331$e$ of the first group frame 331, and the ND-filter guard sheet 366 and the ND filter 367 are supported thereto. The ND filter 367 is arranged on a plane perpendicular to the optical axis O2 so as to be slidable in the X-direction along the plane. Adjacent to the opening 332$a$ of the fixed frame 332 on the lower surface of the ND filter 367, a support sheet 378 having a central hole 378$a$ with an ND filter protection sheet 379 is arranged (FIG. 34).

During light-quantity adjustment operation by the ND filter unit 347 structured as described above, when the solenoid 351 for the ND filter is clockwise rotated viewed from the lower portion of FIG. 38, the filter drive arm 365 is clockwise rotated via the filter drive gear 363 viewed from the lower portion of FIG. 38 (approaching direction of the ND filter). Then, the ND-filter guard sheet 366 and the ND filter 367 integrally slide in the X(+) direction (i.e., an optical axial plane inclusive of the optical axis O1 and the optical axis O2, that is, a direction perpendicular to the Y-Z plane) so as to move to an approach position covering the opening 332$a$ from a position that the ND filter 367 is slid out of the opening 332$a$ of the fixed frame 332, so that subject light reduced in quantity enters the second group lens 335. Conversely, when the solenoid 351 for the ND filter is counterclockwise rotated viewed from the lower portion of FIG. 38, the ND-filter guard sheet 366 and the ND filter 367 integrally slide in the X(−) direction reversely to the above so as to move to a position that the ND filter 367 is slid out of the opening 332$a$ of the fixed frame 332, so that subject light with entire incident quantity enters the second group lens 335.

The shutter unit 348, as shown in FIG. 39, is a unit mounted above the second group frame 338, and is composed of a shutter lid 373 including a central opening 373$a$, four support holes 373$b$, a circular-arc through cut 373$c$, and retainer holes 373$d$ of both opposing bent flaps; a first sector 374 including a straight-advance guide hole 374$b$ elongated in the X-direction, an engagement hole 374$c$ elongated in the Z-direction, and a shield portion; a first blade sheet 375 including an opening 375$a$ defining a shutter-opening diameter, mounting elongated holes 375$b$, and a circular-arc through cut 375$c$; a second sector 376 including a straight-advance guide hole 376$b$ elongated in the X-direction, an engagement hole 376$c$ elongated in the Z-direction, and a shield portion; a second blade sheet 377 including an opening 377$a$ with a diameter larger than that of the opening 375$a$, mounting elongated holes 377$b$, and a circular-arc through cut 377$c$; and a sector drive lever 343, which is a sector drive member, including a rotational shaft 343$a$ arranged along the Y-direction, a driven elongated hole 343$b$, and sector drive pins 343$c$ and 343$d$, which are two engagement shafts. In the respective mounting elongated holes 375$b$ and 377$b$, two being provided for each of the first and second blade sheets 375 and 377, one is fitted to the stepped pin 338b for positioning and the other is formed so as to have some backlash.

The rotational shaft 343a of the sector drive lever 343 is passed through the lever-shaft hole 338e of the second group frame 338, and a latch ring 345 is retained at the distal end of the shaft. In a state that the sector drive lever 343 is mounted, on the second group frame 338 upwardly, the second blade sheet 377, the second sector 376, the first blade sheet 375, and the first sector 374 are inserted to the stepped pins 338b of the second group frame 338 in that order. At this time, one sector drive pin 343c of the sector drive lever 343 is inserted into the circular-arc through cuts 377c and 375c and the engagement elongated hole 374c in that order from the below while the other sector drive pin 343d is inserted into the engagement elongated hole 376c. Finally, the shutter lid 373 is covered from above, and the retainer holes 373d are brought into engagement with the retainer projections 338f of the second group frame 338, so that the shutter unit 348 is assembled. In this state, the sector drive pin 343c is inserted into the circular-arc through cut 377a. Since into the driven elongated hole 343b of the sector drive lever 343, a shaft 372 of the shutter drive arm 371, which will be described later, is freely slidably fitted, the sector drive lever 343 is rotated by the shutter drive arm 371, so that the sectors 374 and 376 of the shutter unit 348 are driven to slide.

The shaft 372 is fixed to the shutter drive arm 371 at a position spaced from the rotational shaft axis of the shutter drive arm 371 by a predetermined distance in a state extending in a direction parallel to the optical axis O2. The shaft 372 is set to such a length that even when the second group frame 338 is moved back-and-forth in the optical axial direction O2 in the assembled state, the shaft 372 is always fitted into the driven elongated hole 343b of the sector drive lever 343 to have an engaged state.

The assembled shutter drive arm 371 is located being substantially flush with the second stepping motor 354 with respect to a plane perpendicular to the optical axis O2, while the second stepping motor 354 is arranged at a position keeping out of a swing trajectory of the shaft 372. Simultaneously, the swing trajectory of the shaft 372 is positioned on a region avoiding the position of the suspension shaft 341.

The shutter unit 348 is arranged along the upper surface of the second group frame 338, and moves back-and-forth in the optical axial direction O2 integrally with the second group frame 338. Thus, the first and second sectors 374 and 376 are always held along a plane perpendicular to the optical axis O2, and are moved to slide on the plane.

During the shutter open/close operation of the shutter unit 348 structured as described above, when the shutter unit 348 is put into the shutter open state shown in FIG. 40A from the shutter close state shown in FIG. 40B, if the output shaft 352a of the shutter solenoid 352 is counterclockwise (upward in FIG. 40B) driven, the sector drive lever 343 is clockwise rotated via the shaft 372 of the shutter drive arm 371. By the clockwise rotation of the sector drive lever 343, as shown in FIG. 40A, the first sector 374 and the second sector 376 are driven by the sector drive pins 343c and 343d so as to slide in the X(+) and X(−) directions, respectively (i.e., a direction perpendicular to an optical axial plane inclusive of the optical axis O1 and the optical axis O2), changing to a shutter open state (maximum aperture diameter) in which the opening 375a of the blade sheet is open.

Also, when the shutter unit 348 is put into the shutter close state from the shutter open state shown in FIG. 40A, if the output shaft 352a of the shutter solenoid 352 is clockwise (upward in FIG. 40A) driven, the sector drive lever 343 is counterclockwise rotated via the shaft 372 of the shutter drive arm 371. By the counterclockwise rotation of the sector drive lever 343, as shown in FIG. 40B, the first sector 374 and the second sector 376 are driven by the sector drive pins 343c and 343d so as to slide in the X(−) and X(+) directions, respectively (i.e., a direction perpendicular to an optical axial plane inclusive of the optical axis O1 and the optical axis O2), changing to a shutter close state in which the opening 375a of the blade sheet is closed.

The accommodated state of the component units between the front and rear covers 302 and 303 will now be described with reference to FIGS. 41 to 49.

FIG. 41 is a drawing of the electronic camera according to the embodiment viewed from the front showing the arrangement of the component units accommodated inside with dotted lines; FIG. 42 is a drawing of units of the component units accommodated inside the camera during accommodation viewed from the left front; FIG. 43 is a drawing of a blocked state of the component units accommodated inside the camera during accommodation viewed from the right front; FIG. 44 is a sectional view at the line XI-XI of FIG. 41 showing arrangement of the component units on the X-Z plane; FIG. 45 is a sectional view at the line XII-XII of FIG. 44 showing arrangement of the component units on the Y-Z plane along the second optical axis O2; FIG. 46 is a sectional view at the line XIII-XIII of FIG. 44 showing arrangement of the stroboscope unit, the power supply unit, and the LCD unit on the Y-Z plane; FIG. 47 is a development of the electrical substrate unit; FIG. 48 is a drawing showing an accommodated state of the lens barrel and the electrical substrate unit on the XI-XI section of FIG. 41; and FIG. 49 is a sectional view at the line XIV-XIV of FIG. 48 showing a connection state of lead wire between the lens barrel and the third substrate of the electrical substrate unit.

In the electronic camera 301 according to the embodiment, the lens barrel 310 is first arranged at the center of the inside of the front cover 302, the power supply unit 306 is arranged on the right adjacent to the lens barrel 310, and the electrical substrate unit 305 is arranged on the left adjacent to the lens barrel 310. Furthermore, the stroboscope unit 307 is fixed on the power supply unit 306, and the capacitor 308 for charging a stroboscope is fixed in a state that the capacitor 308 approaches the rear of the upper inclined surface 331c of the lens barrel 310 from the rear of the stroboscope unit 307.

On the other hand, the LCD unit 309 is arranged and fixed inside the rear cover 303 in a state that a screen of the LCD display board 315 is corresponded to the position of the LCD opening 303a.

The front cover 302 having the lens barrel 310, the electrical substrate unit 305, and the power supply unit 306 accommodated therein and the rear cover 303 having the LCD unit 309 fixed thereto are combined together, so that the electronic camera 301 is completed by joining the front and rear covers with screws.

In the accommodation state mentioned above, an incident opening 331a of the prism 333 of the lens barrel 310 is arranged so as to oppose the shooting window 302a of the front cover 302, and an emission part of the stroboscope unit 307 is arranged behind the stroboscopic emission window 302b. Also, as shown in FIGS. 41, 44, 45, and 46, the occupied space of the LCD display board 315 of the LCD unit 309 on the X-Y plane substantially equals projection areas of the battery unit 306 and the lens barrel 310 in the Z-direction. Also, the combined total thickness of the battery unit 306, the lens barrel 310, and the LCD unit 309 in the Z-direction is substantially the same as the total thickness of the overlapped first to third substrates 318, 319, and 320 of the electrical substrate unit 305 in the Z-direction. In the thickness space of the lens barrel 310 in the Z-direction, a plurality of substrates, such as the second and third substrates 319 and 320, are overlapped. If the LCD unit 309 is not arranged behind the lens barrel 310, the electrical substrate unit may be allocated in the thickness space of the lens barrel 310 in the Z-direction.

As shown in FIG. 45, the CCD 355 and the CCD substrate 356 are arranged in a lower portion of the lens barrel 310 so as to slightly protrude in the rear. On the other hand, the LCD unit 309 is arranged so as to face the lens barrel 310 by downward directing the thin-thickness portion of the light-guide plate 317. Also, the CCD-connection FPC 357 is inserted into an FPC insertion path S1 of a small clearance formed between the back face of the lens barrel 310 and the thin-thickness portion of the light-guide plate 317.

Hence, the lens barrel 310 and the LCD unit 309 can be arranged in a state that the bottom surfaces of both the units are substantially flush with each other without producing a dead space between them. By arranging bottom surfaces of the lens barrel 310 and the LCD unit 309 so as to substantially agree with that of the lens barrel 310, as mentioned above, on the LCD unit 309 and the power supply unit 306, which have substantially the same height, the stroboscopic unit 307 and the stroboscope-charging capacitor 308 can be arranged. Furthermore, the capacitor 308 can be arranged by advancing its distal end to the rear surface of the upper inclined surface 331c of the lens barrel 310 as well as above the LCD unit 309.

The LCD display board 315 can have sufficiently large display space corresponding to the total areas of the lens barrel 310 and the power supply unit 306 on the X-Y plane, so that an electronic camera easy for observing a photographing screen and a menu screen can be provided.

Moreover, since the power supply unit 306, the capacitor 308, and the stroboscope unit 307 can be arranged together as mentioned above, electrical power loss can be suppressed.

In the electric substrate unit 305, as described above, the first to third substrates 318 to 320 are connected together with the FPCs 322 and 323 (FIG. 47), and are arranged on the left side of the lens barrel 310 in a three-ply state while the electric substrate unit 305 is arranged entirely over the Y-direction, which is a longitudinal direction of the lens barrel 310, as shown in FIGS. 44 and 48.

Thus, the arrangement space of the electric substrate unit 305 groups together without affecting the arrangement of other component units, contributing to miniaturizing of the camera.

As shown in FIG. 49, when the connection lead wires 351b and 352b for the ND filter solenoid 351 arranged on the left wall of the first group frame 331 and the shutter solenoid 352 of the lens barrel 310, and also the connection lead wires 353b and 354b for the first and second stepping motors 353 and 354 arranged on the left wall of the fixed frame 332 of the lens barrel 310 are connected to the third substrate 320, since the third substrate 320 is located on the left side of the lens barrel 310 as mentioned above, the above-mentioned lead wires can be reduced in length, so that wiring work is easy and the arrangement of component units cannot be thereby restricted. Also, electric noise due to the lead wire is suppressed.

Furthermore, since the ND filter solenoid 351, the shutter solenoid 352, and the first and second stepping motors 353 and 354 to be connected to the electric substrate unit 305 with lead wires are entirely fixed within the lens barrel 310, the lead wires are also fixed and supported. Hence, unlike conventional cameras, an unstable structure in which movable connection FPCs are routed in the lens barrel is not necessary, so that the possibility of wire breaking is extremely reduced.

In the electronic camera 301, the solenoids 351 and 352 or the stepping motors 353 and 354 and the electric substrate unit 305 are connected together with lead wires; however, those are not limited to the lead wires but connection FPCs may be used so as to have the same advantage.

Digital cameras generally have ICs with a high integration density for miniaturization, and high-speed processing is performed with these ICs. By the high integration density as well as by the high-speed processing, the temperature rises very much during using. On the other hand, for a power supply battery, a rechargeable secondary cell is used. At the high temperature, a lithium-ion battery, for example, is deteriorated in performance reducing a battery life, so that the temperature due to heat produced by the ICs deteriorates the battery.

Whereas, according to the embodiment, since the electrical substrate unit and the power supply unit are arranged with the lens barrel therebetween, heat produced by electrical components mounted on the electrical substrate unit cannot be transferred to the power supply unit, so that the battery can be prevented from being deteriorated.

According to the camera of the third embodiment of the present invention described above, the electrical substrates are superimposed one on another and arranged laterally adjacent to the lens barrel structured in a substantially rectangular parallelepiped contour, so that the camera can be reduced in thickness. Also, the drive sources are arranged in the lens barrel adjacent to the electrical substrate unit, so that connection between them is simplified. Furthermore, the entire electrical substrate unit is arranged within a total thickness range of the lens barrel and the displaying means, the space inside the camera is effectively used, resulting in reduction in size and thickness of the camera.

Also, according to the camera of the third embodiment of the present invention, since the electrical substrate unit and the power supply unit are arranged with the lens barrel therebetween, excessive increase of the camera size in length, width, and thickness can be avoided, so that a compact and thin-thickness camera can be provided. Furthermore, by arranging the electrical substrate unit along a longitudinal direction of the whole lens barrel, a space for electrical components can be secured. Also, by intensively arranging the power supply unit, the stroboscope unit, and the stroboscope capacitor, electric power loss can be suppressed. A substantially triangular space behind the holding frame formed in accordance with the shape of the reflection optical member can be efficiently used by arranging the stroboscope capacitor therein. Furthermore, by locating a grip portion of the camera at a vicinity of the electric substrate unit, the grip portion can be formed at a position separated from the display means and the lens barrel, so that a camera easy to hold can be provided.

What is claimed is:

1. A camera including a lens barrel having a reflection optical member for reflecting a light beam incident along a first optical axis from a subject so as to reflect the light beam toward a second optical axis intersecting the first optical axis, the lens barrel comprising:

a lens group arranged along the second optical axis;
a holding frame for holding the lens group movably along the second optical axis; and
shutter means moving integrally with the holding frame and including a shielding member movable between a position masking an exposure opening on a plane substantially perpendicular to the second optical axis and a position opening the exposure opening,
wherein the shielding member is linearly moved in a direction substantially perpendicular to an optical axial plane inclusive of the first optical axis and the second optical axis, said light-quantity adjusting member being movable in a second plane parallel to the first optical axis and orthogonal to the second optical axis.

2. A camera including a lens barrel having a reflection optical member for reflecting a light beam incident along a first optical axis from a subject so as to reflect the light beam toward a second optical axis intersecting the first optical axis, the lens barrel comprising:
a lens group arranged along the second optical axis;
a holding frame for holding the lens group movably along the second optical axis; and
shutter means moving integrally with the holding frame and including a shielding member movable between a position masking an exposure opening on a plane substantially perpendicular to the second optical axis and a position opening the exposure opening,
wherein the shielding member is moved in a direction substantially perpendicular to an optical axial plane inclusive of the first optical axis and the second optical axis; the lens barrel further comprising:
a shutter drive source for driving the shielding member; and
a lens drive source for displacing the lens group along the second optical axis,
wherein the shutter drive source and the lens drive source are located on one side of the shutter means, and are arranged on a straight line region being substantially parallel with the second optical axis.

3. The camera according to claim 1, wherein the lens barrel further comprises an ND filter movable between a position entering a photographing optical path and a position displaced from the optical path opening in a plane perpendicular to the second optical axis, and
wherein the ND filter moves in a direction substantially perpendicular to an optical axial plane inclusive of the first optical axis and the second optical axis.

4. The camera according to claim 3, wherein the ND filter is arranged on a plane displaced from where the shutter means is located along the second optical axis.

5. A camera including a lens barrel having a variable magnification optical system composed of a plurality of lens groups, the lens barrel comprising:
a reflection optical member for reflecting a light beam incident along a first optical axis from a subject so as to reflect the light beam toward a second optical axis intersecting the first optical axis;
first and second movable lens groups arranged along the second optical axis
a first movable holding frame for holding the first lens group movably along the second optical axis;
a second movable holding frame for holding the second lens group movably along the second optical axis; and
shutter means moving integrally with the first movable holding frame along the second optical axis and including a shielding member is movable between a position masking an exposure opening on a plane substantially perpendicular to the second optical axis and a position opening the exposure opening,
wherein the shielding member is linearly moved in a direction substantially perpendicular to an optical axial plane inclusive of the first optical axis and the second optical axis said light-quantity adjusting member being movable in a second plane parallel to the first optical axis and orthogonal to the second optical axis.

6. The camera according to claim 5, wherein the lens barrel further comprising an ND filter movable between a position entering a photographing optical path and a position displaced from the optical path opening in a plane perpendicular to the second optical axis, and
wherein the ND filter moves in a direction substantially perpendicular to a plane inclusive of the first optical axis and the second optical axis.

7. The camera according to claim 5, wherein the lens barrel further comprises an ND filter movable between a position entering a photographing optical path and a position displaced from the optical path opening in a plane perpendicular to the second optical axis, and
wherein the ND filter moves in a direction substantially perpendicular to a plane inclusive of the first optical axis and the second optical axis, the lens barrel further comprising:
a shutter drive source for driving the shielding member;
a filter drive source for driving the ND filter; and
a lens driving unit for displacing the first movable holding frame and the second movable holding frame along the second optical axis,
wherein the shutter drive source and the filter drive source are juxtaposed in the first optical axial direction, and the lens driving units include a shaft respectively juxtaposed in the first optical axial direction, each unit driving one of the first and second movable holding frames, and
wherein the two shafts are arranged at positions displaced substantially linearly in the second optical axial direction from the shutter drive source and the filter drive source.

8. A camera including a lens barrel having a plurality of lens groups, the lens barrel comprising:
a frame member;
a holding frame for holding one of the plurality of lens groups movably relative to the frame member;
a sector arranged movable integrally with the holding frame in an optical axial direction of the plurality of lens groups, the sector being movable between a position masking an opening of the lens groups and a position displaced from the opening;
a drive source disposed in the frame member for driving the sector;
a drive power transmission member driven by drive power from the drive source for driving to open and close the sector; and
a shaft extended from the drive power transmission member to drive the sector regardless of the position of the holding frame in the optical axial direction,
wherein the shaft comprises a hollow member.

9. The camera according to claim 8, wherein the holding frame holds the lens group, and is displaced relative to the frame member in the optical axial direction in accordance with a variable magnification operation.

10. A camera including a lens barrel having a plurality of lens groups, the lens barrel comprising:
a holding frame for movably holding one of the plurality of lens groups in an optical axial direction;

a sector arranged movable integrally with the holding frame in the optical axial direction of the plurality of lens groups, the sector being movable between a position masking an opening of the lens groups and a position displaced from the opening;

an engagement unit disposed in the sector to be transmitted by drive power;

a sector drive lever arranged in the holding frame and having an engagement shaft engaging with the engagement unit;

a drive source arranged in a member changing its position relative to the holding frame for driving to open and close the sector;

a drive power transmission member swung by the drive source for transmitting the drive power to the sector drive lever; and a shaft arranged at a position spaced from the swinging center of the transmission member for engaging with the sector drive lever, wherein the shaft comprises a hollow member.

11. A camera including a lens barrel, the lens barrel comprising:

a reflection optical member for reflecting a light beam incident along a first optical axis from a subject so as to reflect the light beam toward a second optical axis intersecting the first optical axis;

a first holding frame for holding the reflection optical member;

a sector drive source arranged in the first holding frame and on one side of the reflection optical member;

a drive power transmission member arranged in the first holding frame, the drive power transmission member being swung by the drive source about an axis parallel to the second optical axis direction as a swinging center;

a shaft arranged at a position spaced from the swinging center of the drive power transmission member and extending in the second optical axial direction;

a plurality of lens groups movably arranged along the second optical axis;

a second holding frame changing its position relative to the first holding frame in the second optical axial direction and holding one of the plurality of lens groups;

first and second sectors arranged integrally and movable with the second holding frame, the first and second sectors being movable between a position masking an optical path opening of a light beam from a subject and a position displaced from the optical path opening;

engagement holes respectively formed in the first and second sectors; and a sector drive member arranged in the second holding frame and having an engagement shaft engaging with the engagement hole, the sector drive member being swung so as to open and to close the first and second sectors by the swinging movement of the drive power transmission member transmitted via the shaft, wherein the shaft comprises a hollow member.

12. The camera according to claim 11, wherein the lens barrel further comprises a lens drive source for driving the plurality of lens groups and arranged along the second optical axis and substantially below the sector drive source, wherein the lens drive source and the shaft are arranged at positions overlapping with each other in the second optical axial direction while the lens drive source is arranged at a position on a plane perpendicular to the second optical axis and thereby avoiding a swinging trajectory of the shaft.

13. A camera including a lens barrel, the lens barrel comprising:

a reflection optical member for reflecting a light beam incident along a first optical axis from a subject so as to reflect the light beam toward a second optical axis intersecting the first optical axis;

a first holding frame for holding the reflection optical member;

a sector drive source arranged in the first holding frame and on one side of the reflection optical member;

a drive power transmission member arranged in the first holding frame, the drive power transmission member being swung by the sector drive source about an axis parallel to the second optical axis as a swinging center;

a plurality of lens groups movably arranged along the second optical axis; a second holding frame changing its position relative to the first holding frame in the second optical axial direction and holding one of the plurality of lens groups;

a third holding frame changing its position relative to the first holding frame in the second optical axial direction and holding another of the plurality of lens groups;

first and second sectors arranged integrally and movable with the second holding frame, the first and second sectors being movable between a position masking an optical path opening of a light beam from a subject and a position displaced from the optical path opening by the driving force of the drive power transmission member; and a lens drive source having first and second lead screws for driving the second holding frame and the third holding frame in the second optical axial direction, wherein the lens drive source is arranged substantially below the sector drive source while the first and second lead screws are arranged substantially in parallel with the second optical axis, and the swinging center of the drive power transmission member is arranged in a vicinity of a region between axial extensions of the first and second lead screws.

14. The camera according to claim 13, wherein the lens barrel further comprises:

engagement holes bored in the sectors;

a sector drive member arranged in the second holding frame and having an engagement shaft engaging with the engagement hole, the sector drive member being swung so as to open and to close the first and second sectors by a drive force from the drive power transmission member; and a shaft extending from the drive power transmission member toward the lens drive source in a direction substantially in parallel with the second optical axis to transmit the drive force from the drive power transmission member to the sector driving member regardless of the position of the second holding frame in the second optical axial direction, wherein the shaft is arranged at a position spaced by a predetermined distance from the swinging center of the drive power transmission member so as to avoid interference with the lens drive source.

15. The camera according to claim 14, wherein the shaft comprises a hollow member.

16. A camera including a lens barrel, the lens barrel comprising:
- a reflection optical member for reflecting a light beam incident along a first optical axis from a subject so as to reflect the light beam toward a second optical axis intersecting the first optical axis;
- a first holding frame for holding the reflection optical member;
- a plurality of lens groups arranged along the second optical axis;
- a second holding frame for movably holding one of the plurality of lens groups along the second optical axis;
- a frame member for movably containing the second holding frame and to which the first holding frame is fixed;
- a motor unit arranged on one side of the second holding frame for driving, as a drive source, the second holding frame, the motor unit being fixed inside a first external wall of the frame member formed substantially in parallel with an optical axial plane formed by the first optical axis and the second optical axis; and
- a detector for detecting the position of the second holding frame, the detector being arranged on a second external wall of the frame member formed adjacent to the first external wall in a direction substantially perpendicular to the optical axial plane.

17. The camera according to claim 16, wherein the lens barrel further comprises:
- an insertion hole formed in the first external wall; and
- a motor terminal disposed in the motor unit so as be exposed from the insertion hole,
- wherein a connection part of the detector is arranged on an external surface of the frame member, and extends to a flexible printed circuit board arranged to cover part of the first external wall and part of the second external wall, the connection part connecting the motor terminal and the detector.

18. The camera according to claim 17, wherein the lens barrel further comprises:
- a shutter arranged integrally with the second holding frame and movable in the second optical axial direction;
- a shutter drive source fixed to the first holding frame,
- wherein the shutter drive source is connected to the flexible printed circuit board.

19. The camera according to claim 18, wherein the shutter drive source is arranged adjacent to the motor unit with regard to the second optical axis.

20. The camera according to claim 16, wherein the frame member has a substantially rectangular parallelepiped contour, and the first external wall is an external wall extending in a thickness direction of the rectangular parallelepiped.

21. A camera including a lens barrel structured to have a substantially rectangular parallelepiped contour, the lens barrel comprising:
- a reflection optical member for reflecting a light beam incident along a first optical axial direction, which is a thickness direction of the lens barrel, from a subject so as to reflect the light beam toward a second optical axis intersecting the first optical axis and also being along the longitudinal direction of the lens barrel;
- a first holding frame for holding the reflection optical member;
- a plurality of lens groups arranged along the second optical axis;
- a second holding frame for movably holding one of the plurality of lens groups along the second optical axis;
- a third holding frame for movably holding another of the plurality of lens groups along the second optical axis;
- a frame member structured in a substantially rectangular parallelepiped contour for movably containing the second and third holding frames therein;
- a motor unit arranged for driving the second and third holding frames, the motor unit being fixed inside a first external wall of the frame member formed substantially in parallel with an optical axial plane formed by the first optical axis and the second optical axis, and having motors, each composed of a drive unit, a shaft rotated by the output of the drive unit, and a bearing unit, the motors being arranged to face each other so that the shafts are arranged in parallel with each other, and each shaft is supported by the bearing unit of the other motor; and
- a detector arranged substantially perpendicularly to the optical plane for detecting positions of the second and third holding frames, the detector being arranged on a second external wall of the frame member formed adjacent to the first external wall and at a position facing moving trajectories of the second and third holding frames.

22. The camera according to claim 21, wherein the lens barrel further comprises:
- an insertion hole formed in the first external wall; and
- a motor terminal disposed in the motor unit so as be exposed from the insertion hole,
- wherein a connection part of the detector is arranged on an external surface of the frame member, and extends to a flexible printed circuit board arranged to cover part of the first external wall and part of the second external wall, the connection part connecting the detector motor terminal and the detector.

23. The camera according to claim 22, wherein the lens barrel further comprises:
- a shutter arranged integrally with the second holding frame and movably in the second optical axial direction; and
- a shutter drive source fixed to the first holding frame,
- wherein the shutter drive source is connected to the flexible printed circuit board.

24. The camera according to claim 22, wherein shafts of the motor unit are juxtaposed in a direction extending toward the first external wall.

25. A camera including a lens barrel having a plurality of lens groups, the lens barrel comprising:
- a frame member;
- a holding frame for holding one of the plurality of lens groups movable relative to the frame member;
- a sector arranged to move integrally with the holding frame in an optical axial direction of the plurality of lens groups, the sector being movable between a position masking an opening of the lens groups and a position displaced from the opening;
- a drive source disposed in the frame member for driving the sector;
- a drive power transmission member driven by drive power from the drive source for driving to open and close the sector; and
- a shaft extended from the drive power transmission member to be able to drive the sector regardless of the position of the holding frame in the optical axial direction,
- wherein the shaft comprises a hollow member.

* * * * *